United States Patent [19]
Kizu et al.

[11] Patent Number: 5,758,013
[45] Date of Patent: May 26, 1998

[54] DIGITAL MAGNETIC RECORDING/ REPRODUCING APPARATUS AND CASSETTE DIGITAL MAGNETIC RECORDING/REPRODUCING APPARATUS

[75] Inventors: Shigeo Kizu; Hidenari Ikeda; Masahiro Nakashika, all of Fukaya; Yasuyoshi Nishikawa, Fujisawa; Toshinobu Murakami, Fukaya; Keisuke Ogi, Tokyo; Fumihiko Murakami, Yokohama, all of Japan

[73] Assignee: Kabushiki Kaisha Toshiba, Kawasaki, Japan

[21] Appl. No.: 650,547

[22] Filed: May 20, 1996

Related U.S. Application Data

[63] Continuation of Ser. No. 214,768, Mar. 18, 1994, abandoned.

[51] Int. Cl.$^6$ ........................................ H04N 5/91
[52] U.S. Cl. ........................ 386/123; 360/22; 386/35
[58] Field of Search ...................... 360/22, 33.1, 39, 360/55, 48, 53, 64; 358/335; 386/35, 123

[56] References Cited

U.S. PATENT DOCUMENTS

| | | | |
|---|---|---|---|
| 4,330,795 | 5/1982 | Foerster et al. | 386/123 |
| 5,229,862 | 7/1993 | Takahashi et al. | 358/335 |
| 5,394,275 | 2/1995 | Iketani et al. | 386/35 |
| 5,473,478 | 12/1995 | Nakashika . | |
| 5,499,145 | 3/1996 | Azuma et al. | 386/123 |
| 5,541,782 | 7/1996 | Kobayashi et al. | 386/123 |

FOREIGN PATENT DOCUMENTS

| | | |
|---|---|---|
| 59-116913 | 7/1984 | Japan . |
| 1-175472 | 7/1989 | Japan . |

OTHER PUBLICATIONS (SMPTE) Society of Motion Picture and Television Engineers, An Experimental Digital 1.2 GBPS VCT for 1125/60 HDTV Signals, Shinichi Makino, Toshiba Corporation, Minatoku, Tokyo, Presented at the 135 SMPTE Technical Conference –Oct. 29–Nov. 2, 1993, Los Angeles Convention Center, Los Angeles, Calif. pp. 1–8, Reprint No. 135–16.

(SMPTE) Society of Motion Picture and Television Engineers, An Experimental Digital 1.2 GBITS/S VCR for 1250/50 HDTV Signals As Base for a Truly Universal Recording Format Handling Data Signals Of Various HDTV Standards, W. Schiffler, J. Heitmann, and H. Vaanholt, BTS GmbH, Darmstadt, Germany, Presented at the 135 SMPTE Technical Conference –Oct. 29–Nov. 2, 1993, Los Angeles Convention Center, Los Angeles, Calif., pp. 1–14, Pertinent No. 135–15.

(SMPTE) Society of Motion Picture and Television Engineers, The 1994 European SMPTE Conference, Converging of Imaging Media, Sep. 22 to 24, 1994, High Density Recording Techniques in D6 Format HDTV Digital VCR, Chosaku Noda, Naoki Endoh and Shigeo Kizu, Toashiba Corporation, 1, Komukai Toshibacho, Saiwai–ku, Kawasaki 210, Japan, pp. 194–209.

"3–3 D–6" The Journal of the Institute of Television Engineers of Japan, vol. 50, No. 2, pp. 198–201, 1996.

The SMPTE D–1 Format and Possible Scanner Configurations.

*Primary Examiner*—Andrew L. Sniezek
*Attorney, Agent, or Firm*—Oblon, Spivak, McClelland, Maier & Neustadt, P.C.

[57] ABSTRACT

A digital magnetic recording/reproducing apparatus comprising a unit for recording high-definition information including video information and audio information, which is based on a first high-definition television scheme, on a recording medium in accordance with a second high-definition television scheme, the first high-definition television scheme having a first data format of a first amount of information smaller than a second amount of information of a second data format of the second high-definition television scheme, the recording unit including a circuit for allocating a recording area corresponding to a difference between the first amount of information and the second amount of information as a free recording area on which any information is selectively recorded, to match the first amount of information with the second amount of information.

6 Claims, 36 Drawing Sheets

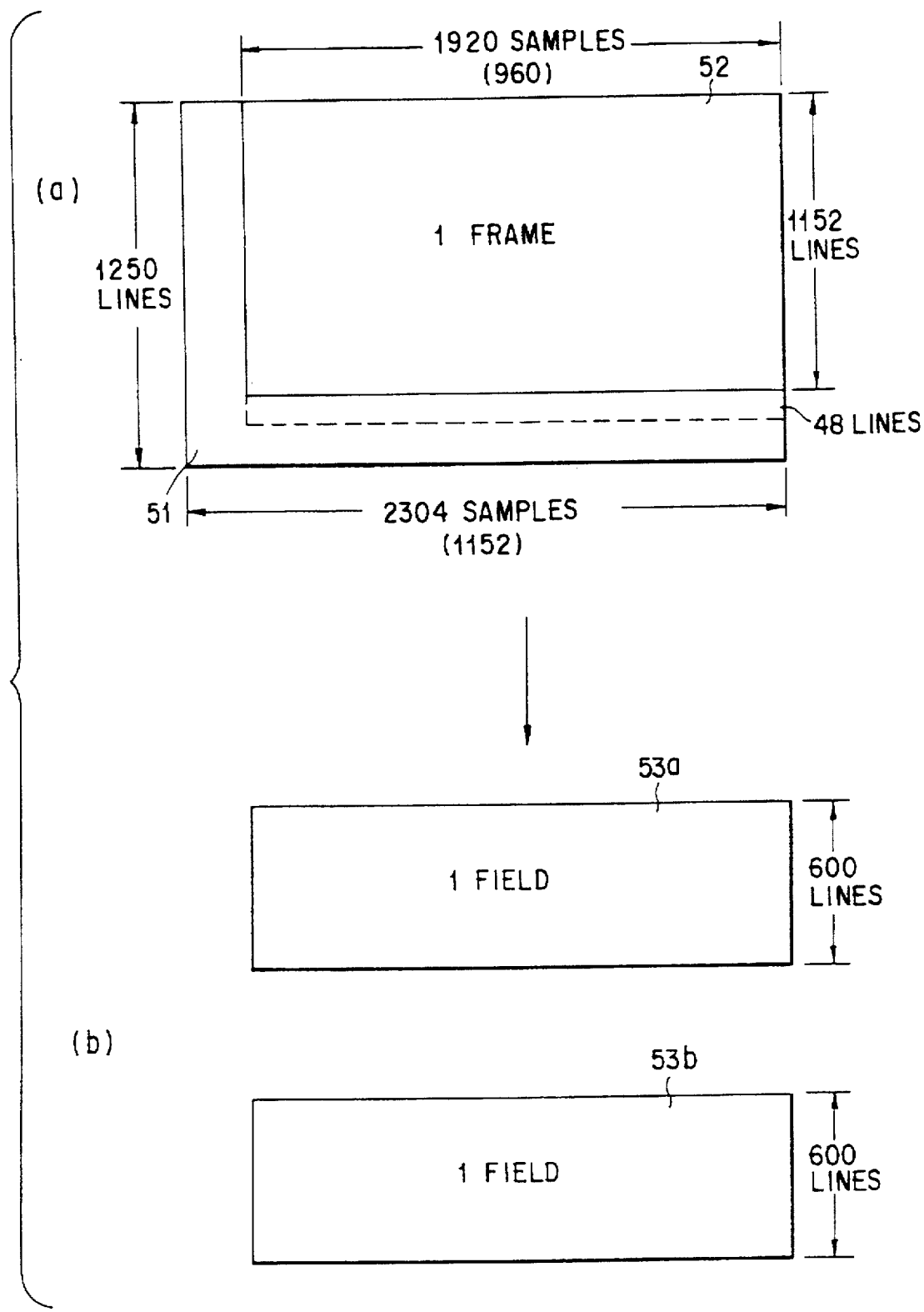
F I G. 5

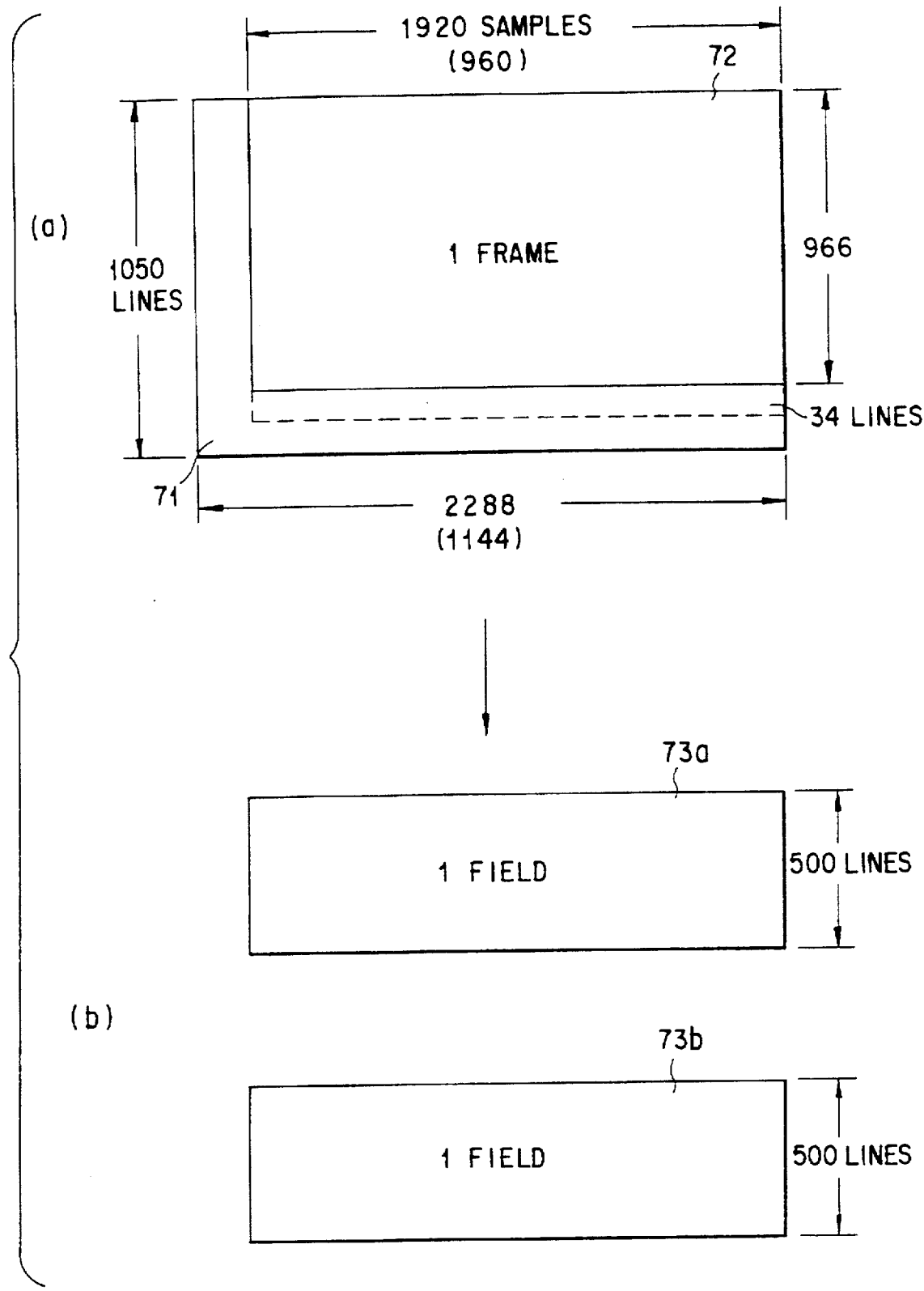
F I G. 7

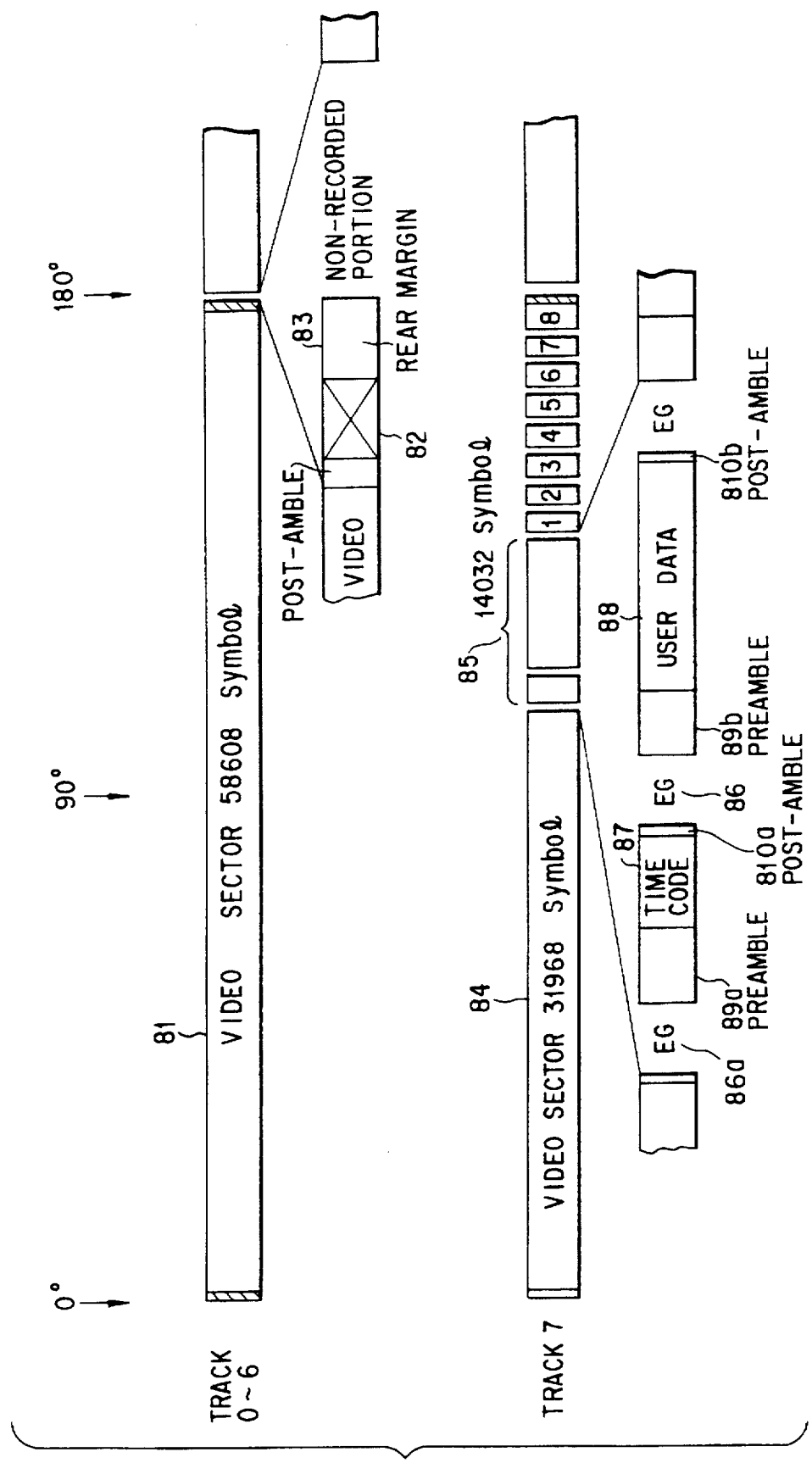
F I G. 8

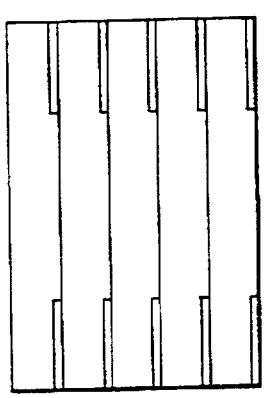 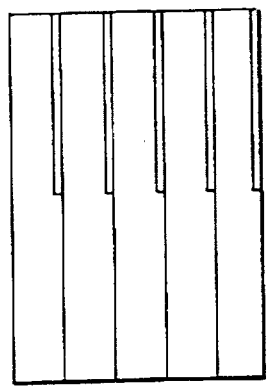 
(4-a)    (4-b)    4 TRACK
F I G. 14
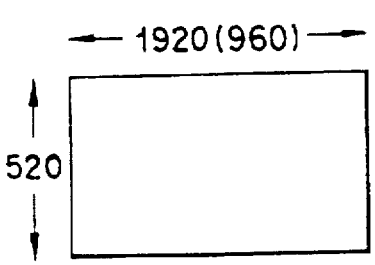 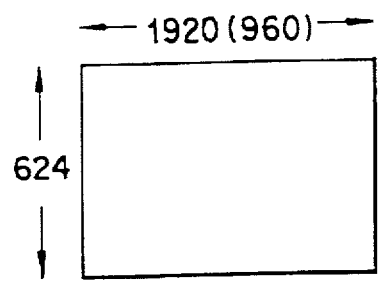
(a)    (b)
F I G. 15
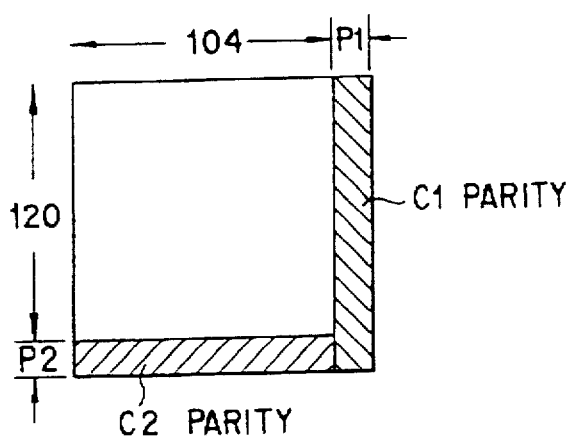
F I G. 16

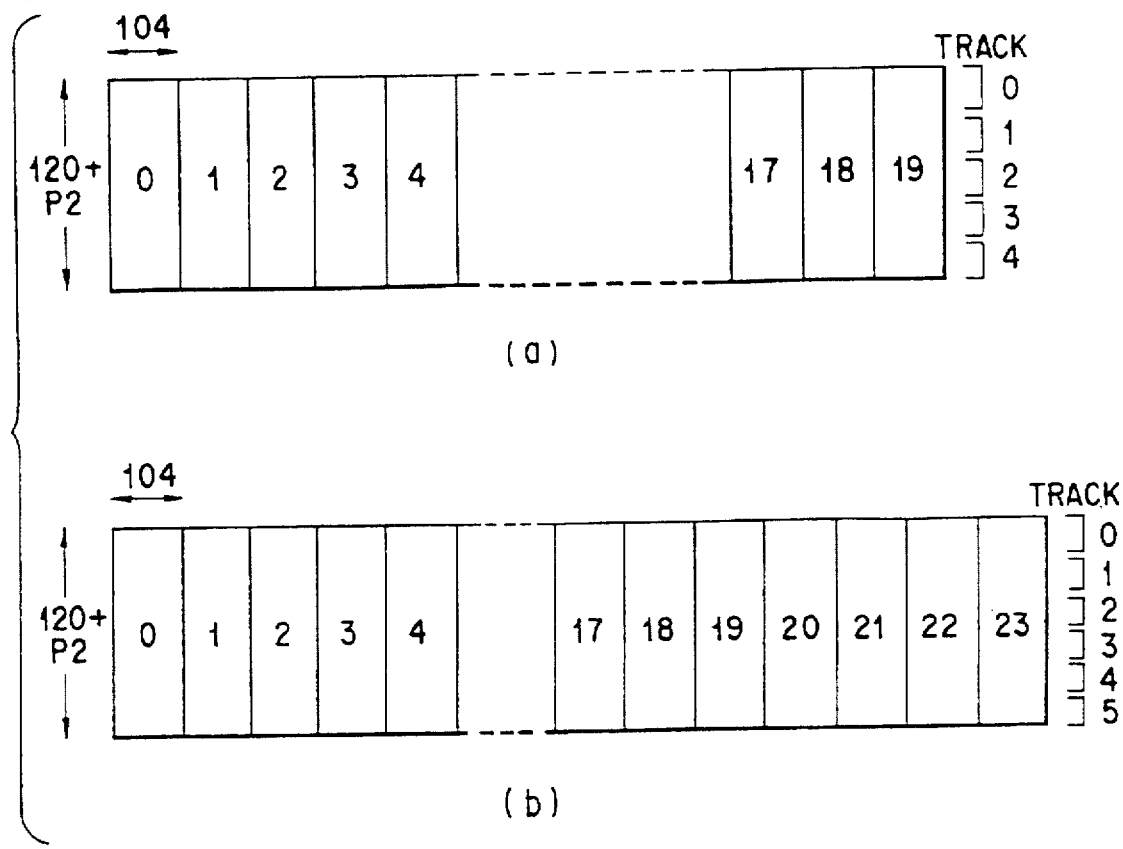
F I G. 17
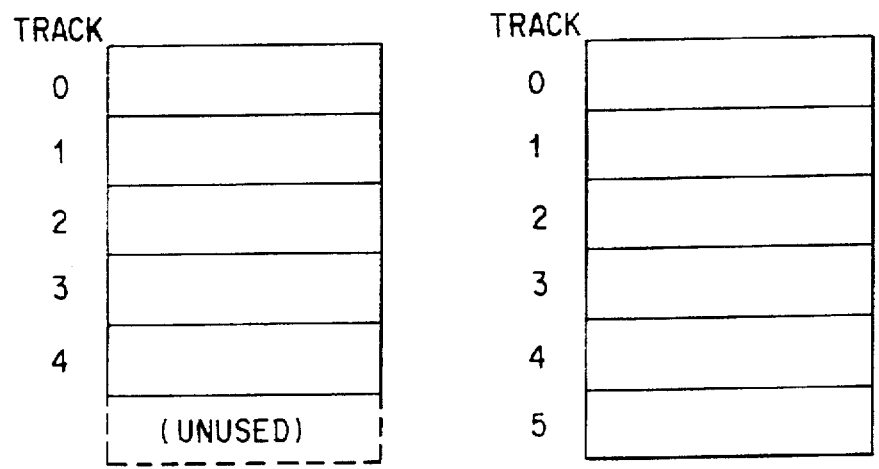
F I G. 18

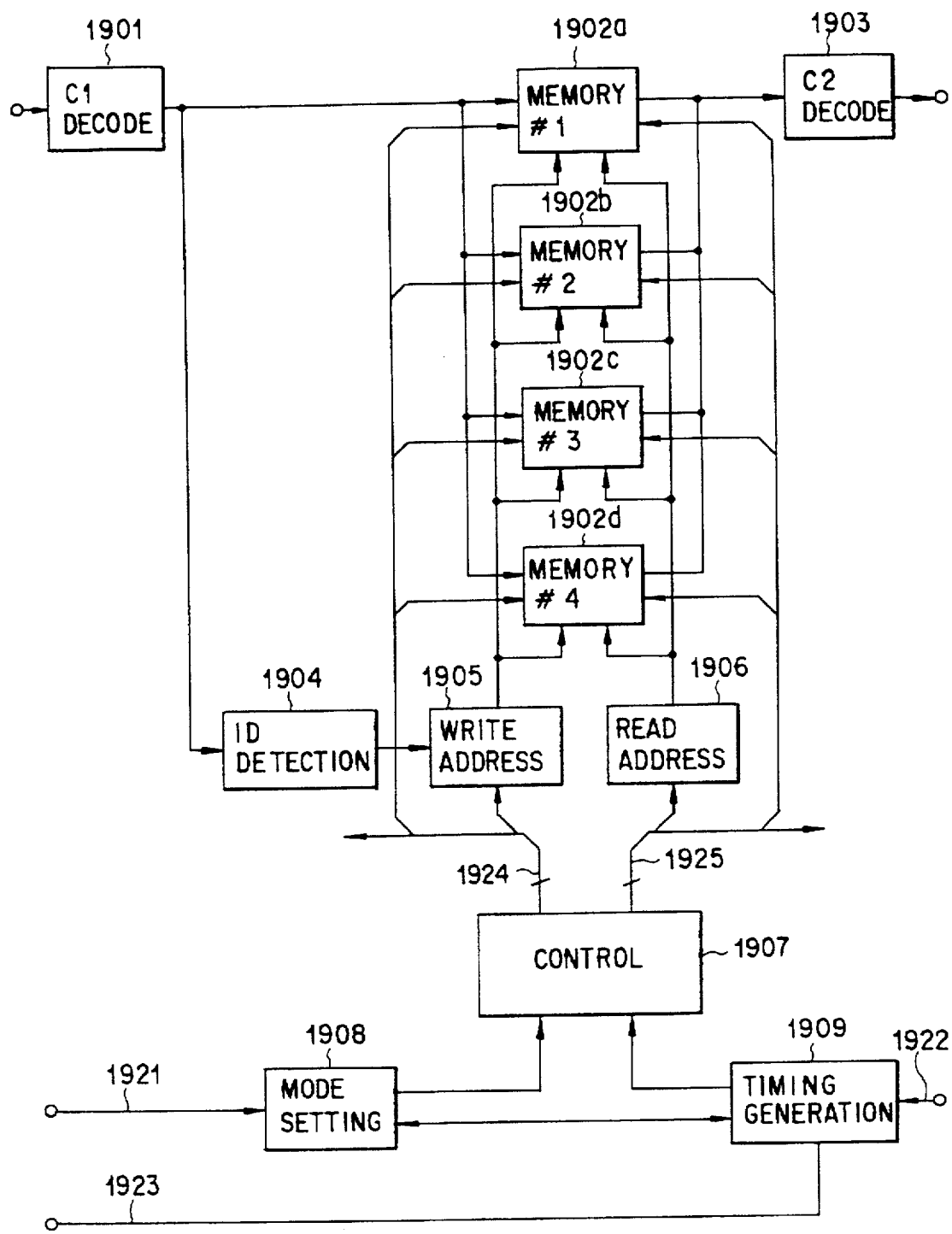
F I G. 19

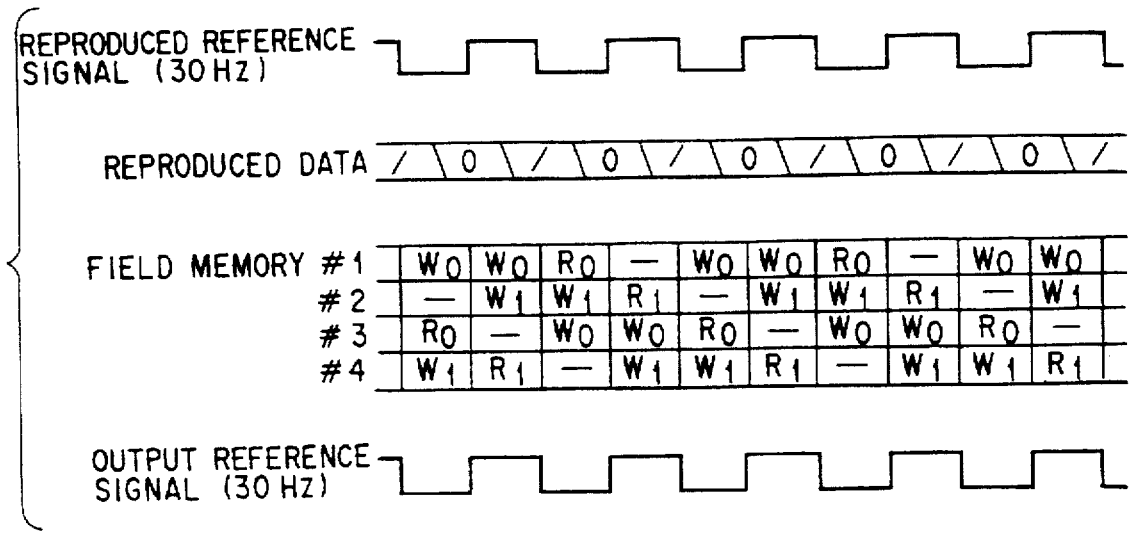
F I G. 20
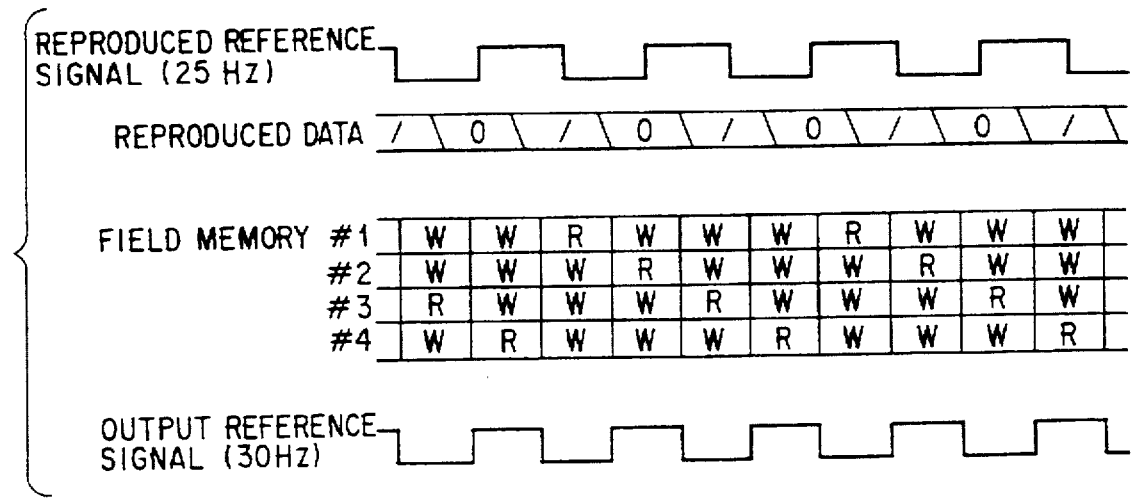
F I G. 21

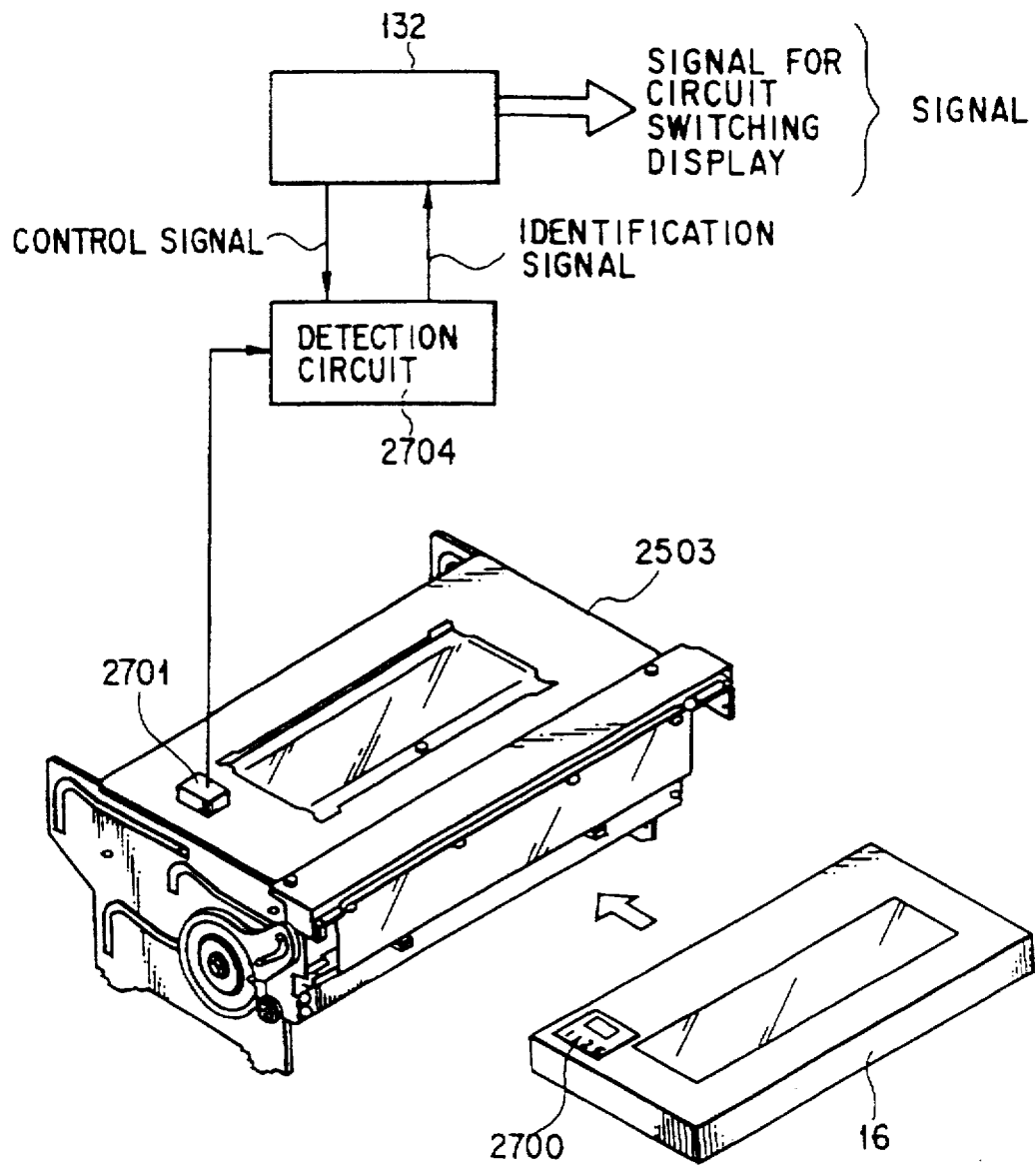
F I G. 27

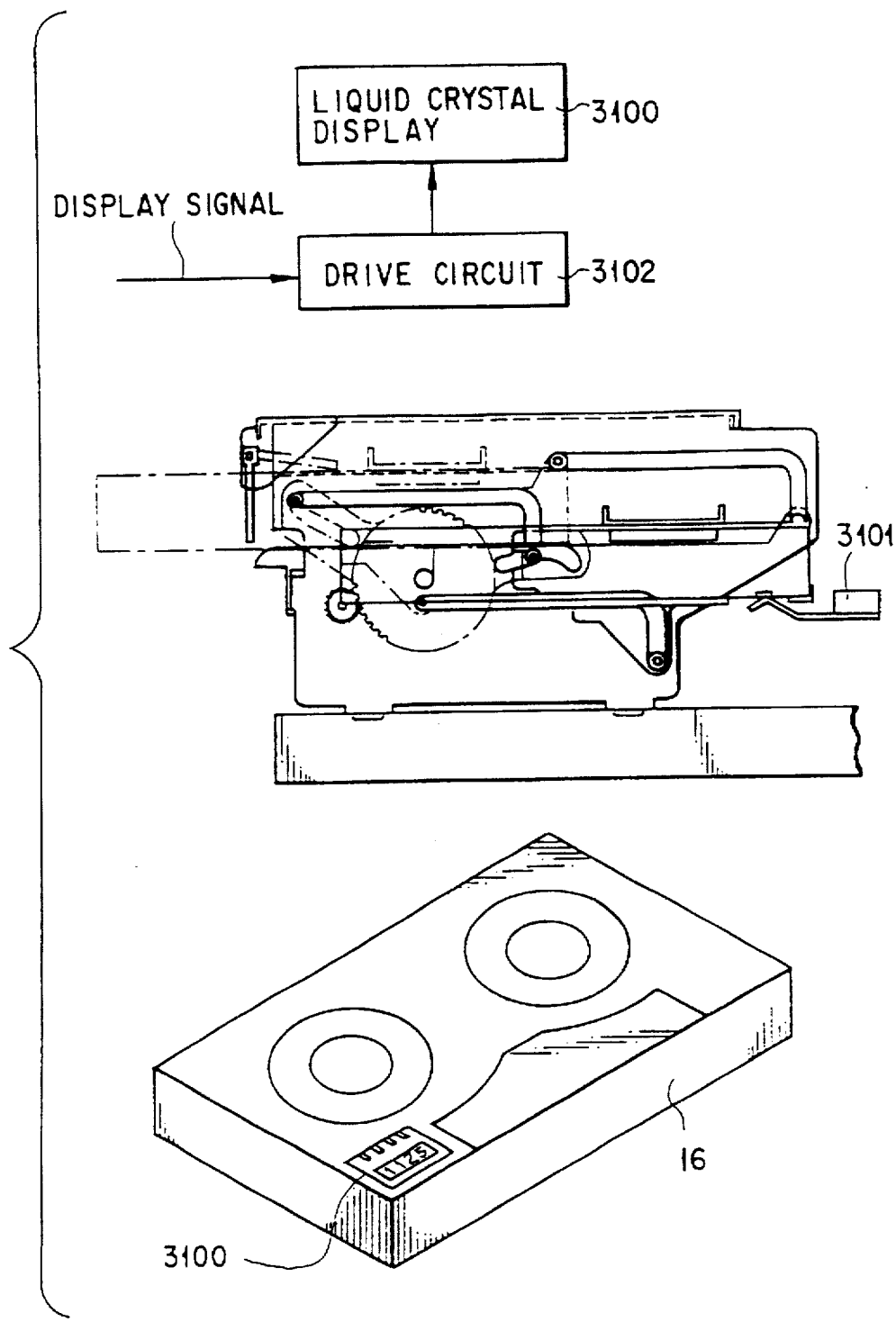
F I G. 31

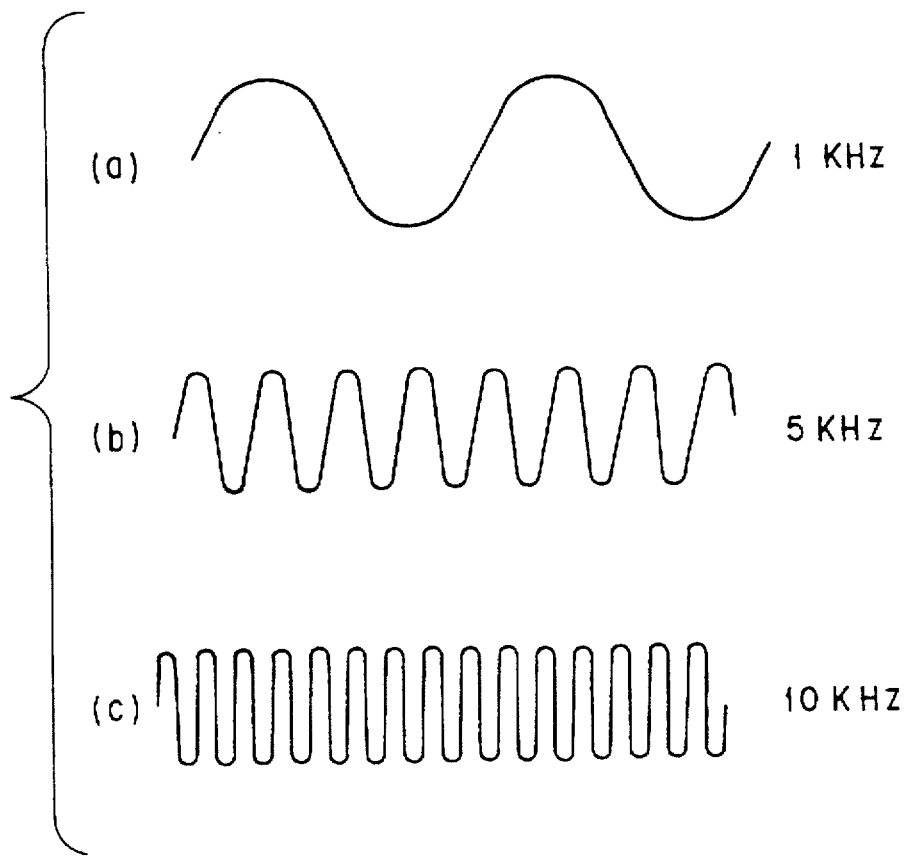
F I G. 34

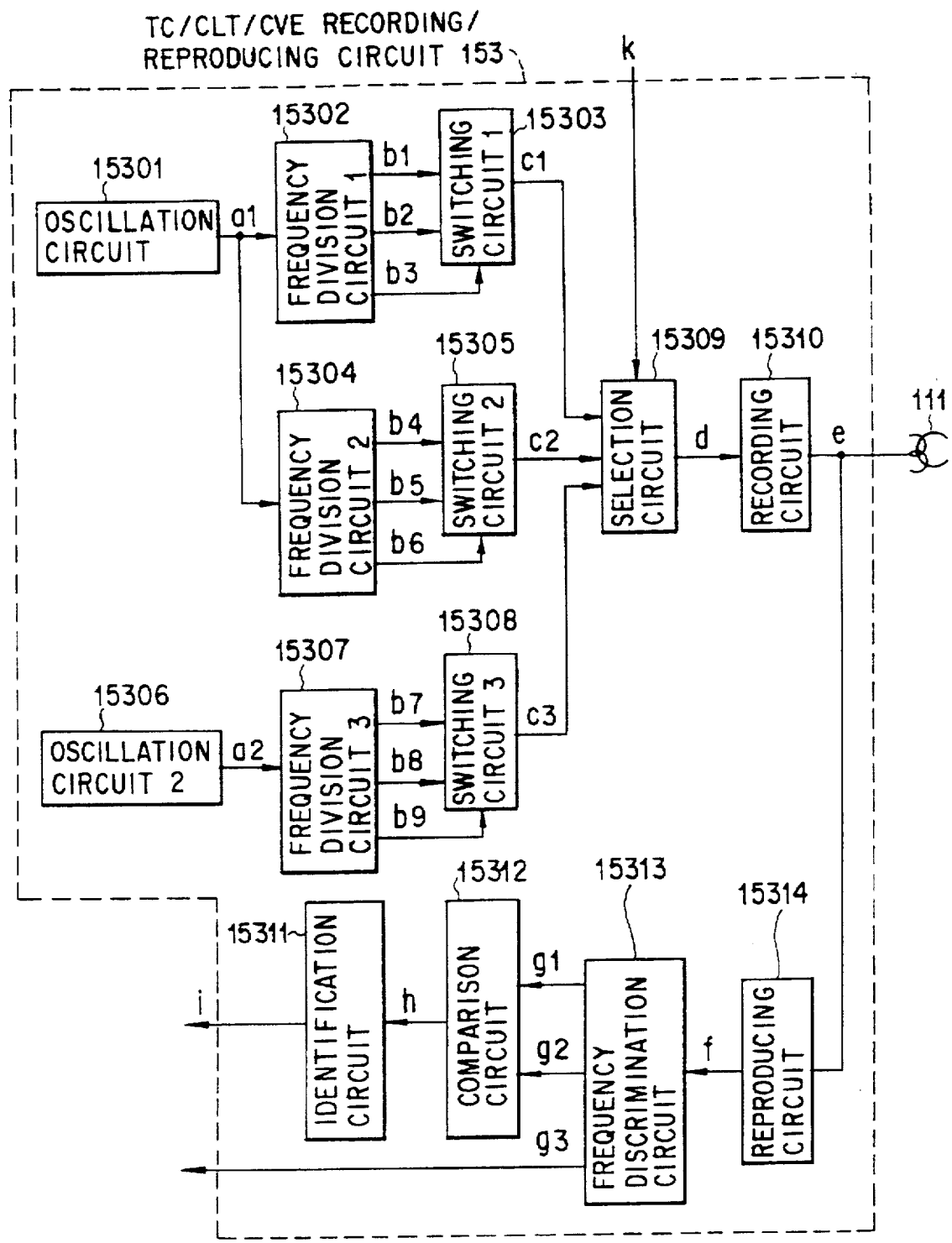
F I G. 35

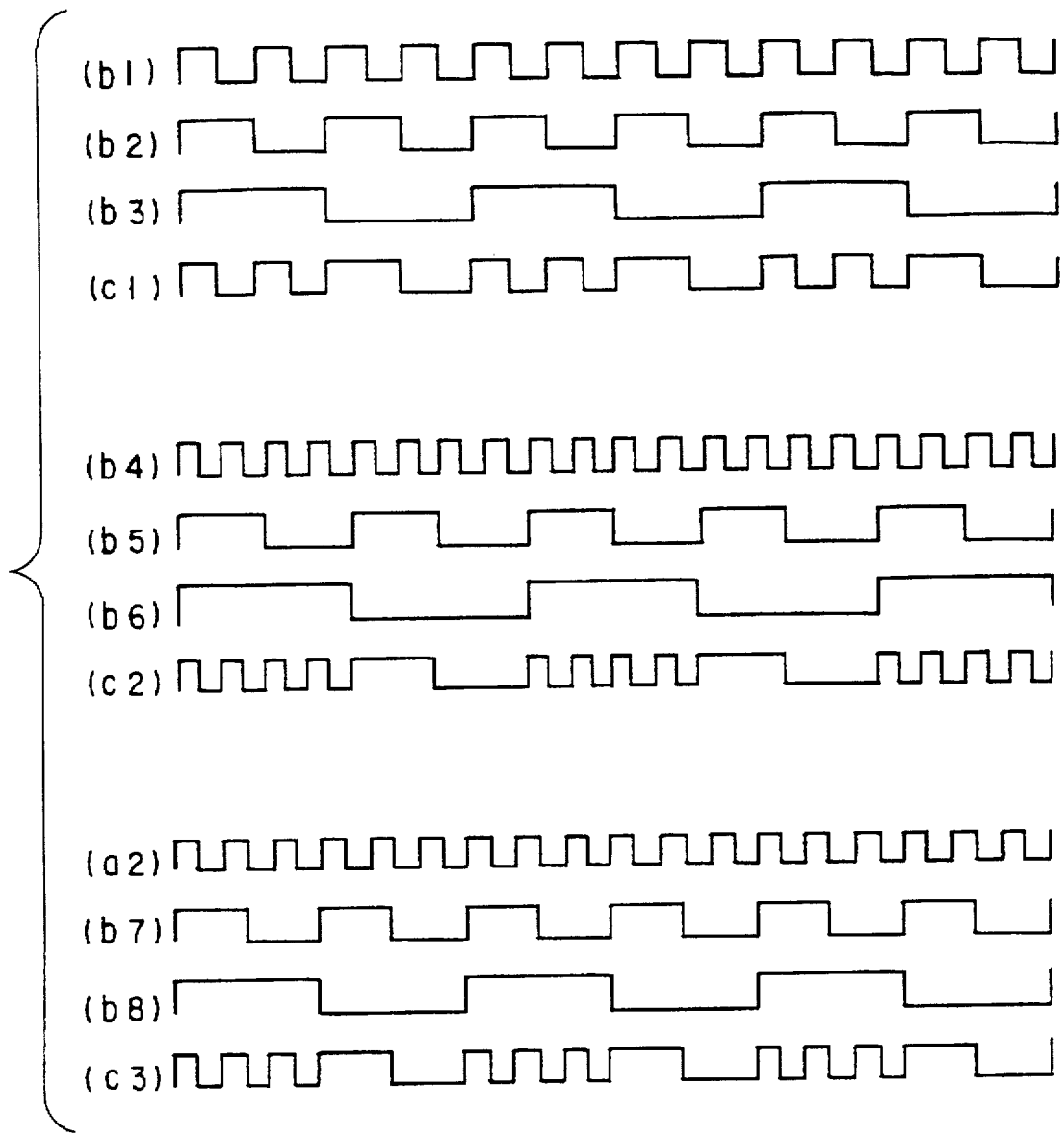
F I G. 36

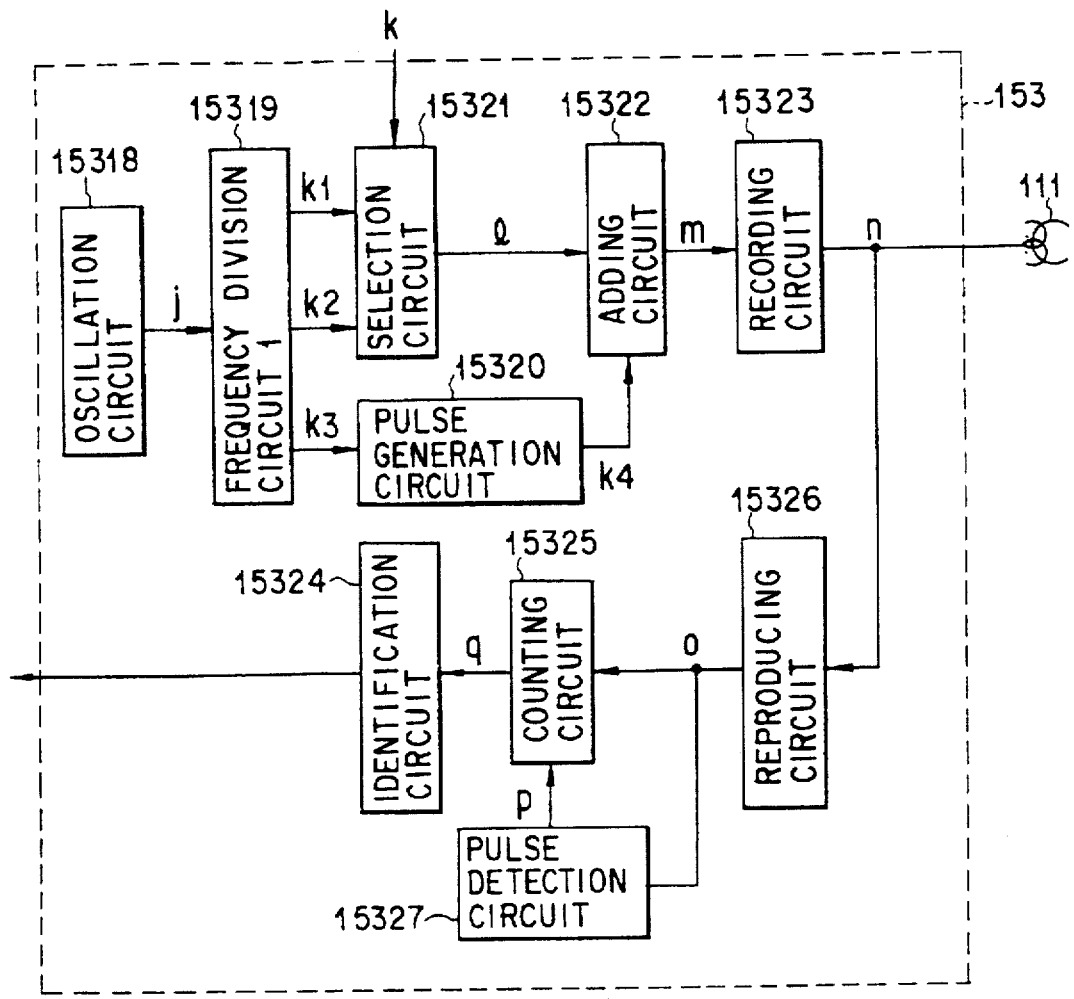
F I G. 37
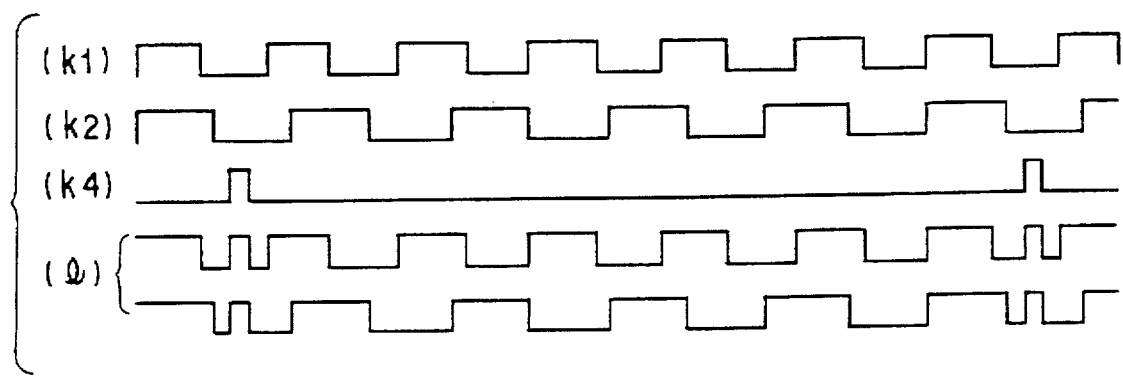
F I G. 38

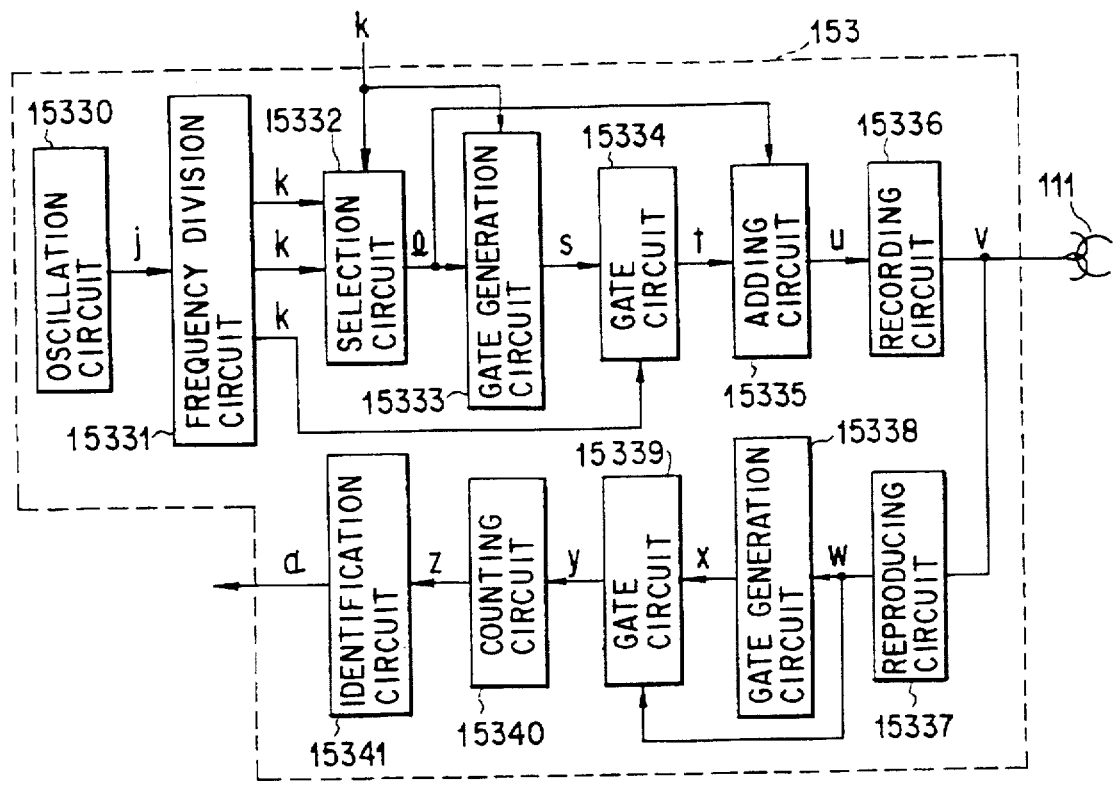
F I G. 39
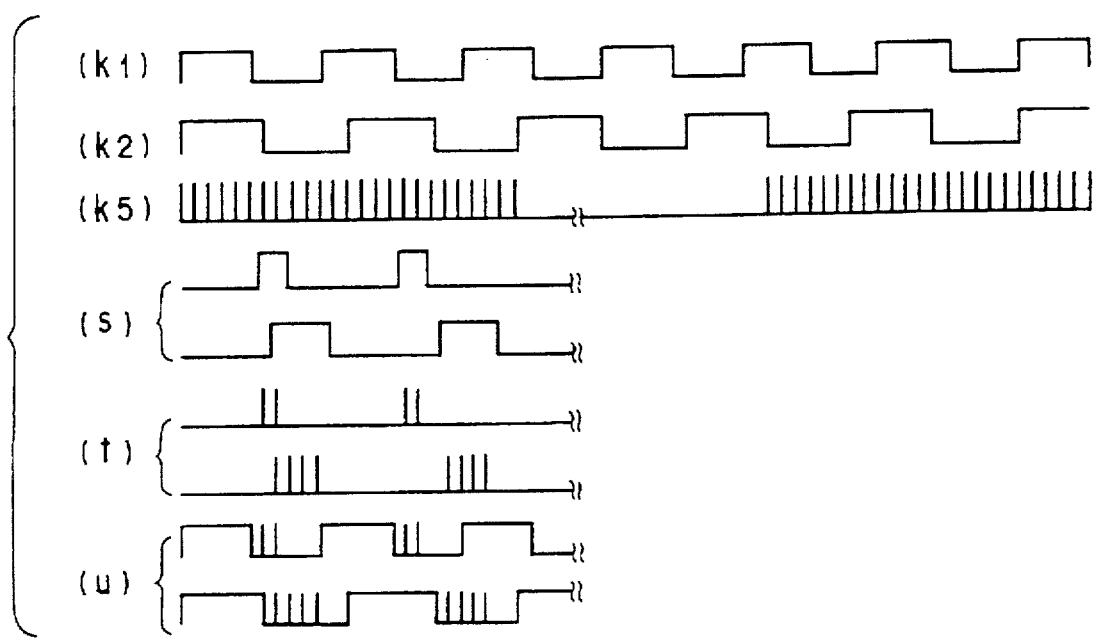
F I G. 40

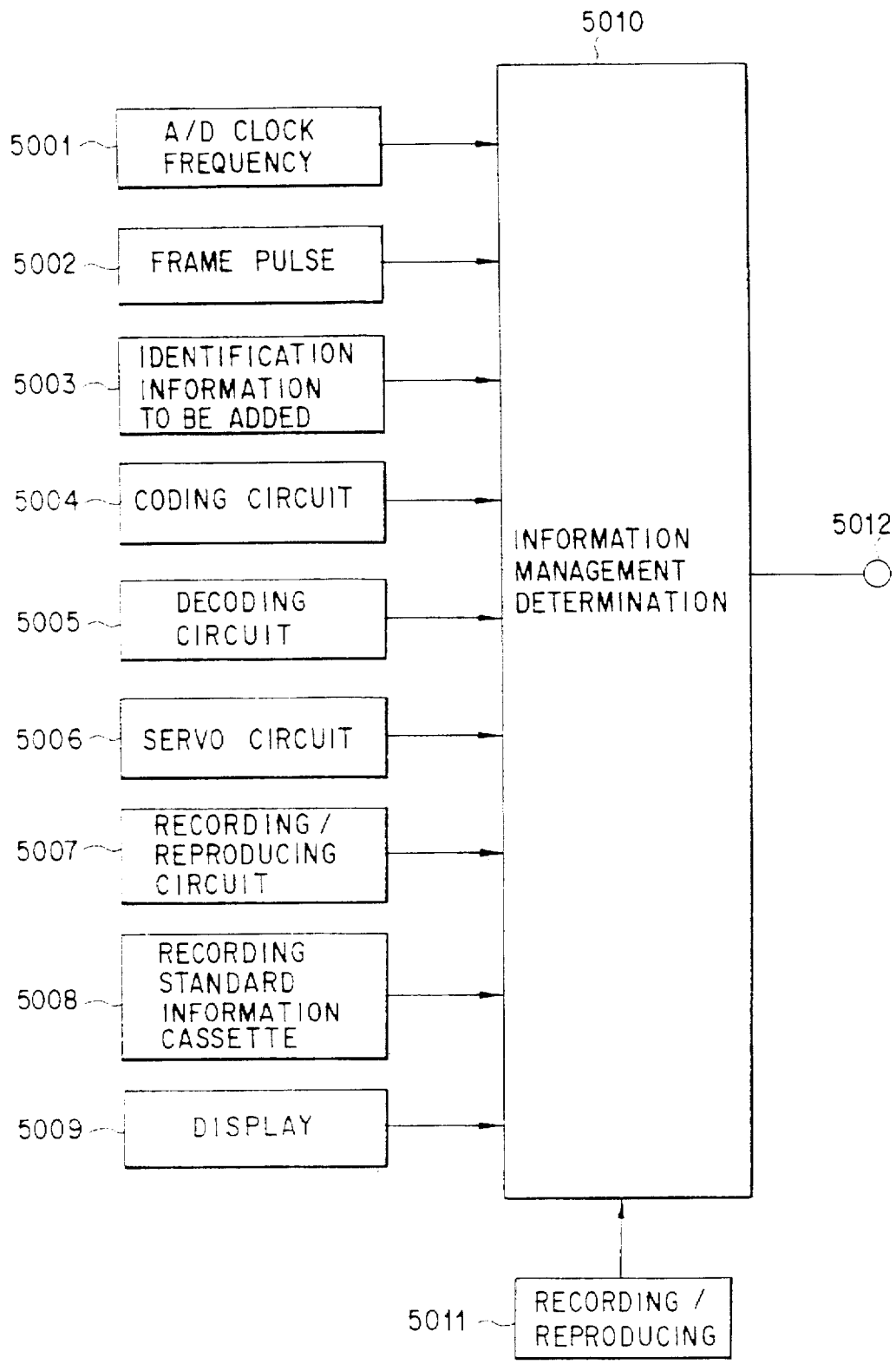
F I G. 50

5,758,013

DIGITAL MAGNETIC RECORDING/REPRODUCING APPARATUS AND CASSETTE DIGITAL MAGNETIC RECORDING/REPRODUCING APPARATUS

This application is a Continuation of application Ser. No. 08/214,768, filed on Mar. 18, 1994, now abandoned.

BACKGROUND OF THE INVENTION

1. Field of the Invention

The present invention relates to a digital magnetic recording/reproducing apparatus for recording/reproducing a plurality of different television standard signals and, more particularly, to a cassette digital magnetic recording/reproducing apparatus capable of coping with the HDTV schemes used in Japan, the United States, and Europe.

2. Description of the Related Art

Japan is a leading country in test broadcasting of an HDTV scheme for providing an image having a definition higher than that of a currently used television scheme.

The Japanese HDTV scheme is called a "high-vision" scheme in Japan. In this HDTV scheme, the number of scanning lines was defined as 1,125, and a field frequency was defined as 60 Hz.

On the other hand, Europe and the United States plan to employ HDTV schemes different from the Japanese HDTV scheme. An HDTV scheme having 1,250 scanning lines and a field frequency of 50 Hz is probably employed in Europe, and an HDTV scheme having 1,050 scanning lines and a field frequency of 59.94 Hz is probably employed in the United States.

As described above, when machines for producing or transmitting programs are different from each other in the television schemes, respectively, machines corresponding to these schemes must be developed and manufactured. For this reason, costs naturally increase. In addition, in a given television scheme, in order to reproduce software produced in a scheme different from the given scheme, a VTR or telecine suitable for the given scheme must be prepared. Signal conversion is performed by a format change apparatus, and then the software is recorded again. For this reason, trouble and costs increase.

A VTR is one of principal machines used when programs are produced or transmitted, and a VTR used for broadcasting is generally expensive. For this reason, if a tape transport, a signal processing circuit, a cassette, and a tape are commonly used in different HDTV schemes, the costs of machines and running costs are reduced, thereby obtaining advantages for users. In addition, if tapes recorded in different schemes can be reproduced in the same VTR, programs can be advantageously, easily exchanged to each other between different countries at a low cost.

However, in a conventional magnetic recording/reproducing apparatus, high-definition images respectively recorded in different HDTV schemes cannot be recorded/reproduced using a common mechanism. Moreover, there is no apparatus for performing digital recording to a cassette tape.

SUMMARY OF THE INVENTION

The present invention has been made in consideration of the above problems, and has as its object to provide a cassette digital magnetic recording/reproducing apparatus for recording/reproducing signals of different HDTV schemes using the same mechanism, the same cassette, and the same tape.

According to the present invention, there is provided a digital magnetic recording/reproducing apparatus comprising:

means for recording high-definition information including video information and audio information, which is based on a first high-definition television scheme, on a recording medium in accordance with a second high-definition television scheme, the first high-definition television scheme having a first data format of a first amount of information smaller than a second amount of information of a second data format of the second high-definition television scheme, said recording means including means for allocating a recording area corresponding to a difference between the first amount of information and the second amount of information as a free recording area on which any information is selectively recorded, to match the first amount of information with the second amount of information; and means for reproducing the high-definition information recorded on the recording medium.

As a means for identifying different schemes when a common cassette is inserted, there is provided a cassette digital magnetic recording/reproducing apparatus in which a cassette is inserted into a casing, high-definition information consisting of video information and audio information is recorded/reproduced on/from a magnetic recording medium in the cassette in accordance with identification information, attached to a casing of the cassette, for identifying a plurality of recording/reproducing methods for the recording medium, comprising identification information reading means for slidably reading the identification information arranged on the casing of the cassette, and recording/reproducing method selection means for selecting one type of recording/reproducing method from the recording/reproducing methods in accordance with identification information read by the identification reading means, wherein a reading operation of the identification information reading means is performed when the cassette is inserted into the casing.

As a means for identifying different schemes in a tape reproducing operation or in a switching operation from a fast-forward operation to a rewinding operation, there is provided a digital magnetic recording/reproducing apparatus for recording/reproducing high-definition information consisting of video information and audio information on/from a magnetic recording medium in accordance with a first recording/reproducing method of recording/reproducing the high-definition information having an information amount of A (A>0) bits and a second recording/reproducing method of recording/reproducing the high-definition information having an information amount of B (B>A) bits, comprising identification information recording means for recording/reproducing method identification information for selecting one of the first recording/reproducing method and the second recording/reproducing method as a method of recording/reproducing the high-definition information, identification information reproducing means for reproducing identification information recorded by the identification information recording means, recording/reproducing means for performing recording/reproducing operations using the first recording/reproducing method or the second recording/reproducing method in accordance with the identification information reproduced by the identification information reproducing means, wherein the identification recording/reproducing means records the recording/reproducing method identification information on the magnetic recording medium.

According to the present invention, the information amount of a Japanese 1125/60 HDTV video signal is larger than that of an European 1250/50 HDTV video signal or a U.S. 1050/59.94 HDTV video signal. For this reason, when data of the 1125/60 scheme is recorded using a single recording/reproducing mechanism and a single format on a tape, the recording area for the data is redundant in the 1250/50 scheme or the 1050/59.94 scheme. For this reason, another effective signal is recorded in this redundant area. In addition, an HDTV signal has a large information amount, a 1-field HDTV signal is divided and recorded on a plurality of tracks. At this time, an audio signal is recorded time-divisionally such that AUDIO information per field can be independently edited later in the tracks in which the 1-field video information is to be recorded.

Although an editing operation is performed in units of frames or fields, tracks located boundary portions between the frames or the fields are easily damaged by an mechanism error, defective tracking, or the like. In particular, degradation of an audio signal is easily detected. Therefore, a normal audio signal is not recorded on only the tracks located at the boundary portions between the frames or fields, blank tracks are formed, or another information signal is recorded on these tracks, thereby preventing problems in the editing operation.

When a common cassette is used in recording/reproducing operations of different schemes, and the cassette is inserted into a VTR, it is preferable to automatically identify the scheme of the cassette. According to the present invention, scheme identification information arranged on the casing of the cassette is read by an identification information reading means when the cassette is inserted, and an appropriate recording/reproducing method can be selected by a recording/reproducing method selection means. In this manner, since the recording/reproducing scheme can be quickly detected, subsequent system settings can be quickly performed.

Signals of different schemes can also be recorded on the same cassette tape. In this case, identification using a cassette is not performed, identification information is recorded on the tape using an identification information recording means. In a reproducing operation, a recording/reproducing means is switched in accordance with identification information from an identification information reproducing means for determining one of the HDTV schemes, thereby appropriately reproducing the signals of the different schemes. In addition, when the identification information arranged on the casing of the cassette is erroneously set, the scheme can be quickly identified in reproducing the tape or in a fast-forward operation or a rewinding operation, by recording identification information on the tape.

BRIEF DESCRIPTION OF THE DRAWINGS

FIG. 5 shows views of a 1-frame European scheme video signal;

FIG. 7 shows views of a 1-frame U.S. scheme video signal;

FIG. 8 is a view showing data arrangements on tracks using the scheme in FIG. 7;

FIG. 14 shows fourth views of various audio recording schemes;

FIG. 15 shows views showing recording data per field according to an embodiment of the present invention;

FIG. 16 is a view showing an error correction matrix according to the embodiment in FIG. 15;

FIG. 17 shows views of 1-field data arrangements according to the embodiment in FIG. 15;

FIG. 18 shows views of assignment of addresses on a field memory according to the embodiment in FIG. 15;

FIG. 19 is a view showing the arrangement of an error correction circuit according to the embodiment in FIG. 15;

FIG. 20 is a view showing control of a normal reproducing field memory according to the embodiment in FIG. 15;

FIG. 21 is a view showing control of a reproducing field memory when a reproducing operation is performed in different schemes according to the embodiment in FIG. 15;

FIG. 27 is a block diagram showing scanning line identification using an optical card according to the embodiment in FIG. 24;

FIG. 31 is a block diagram showing a liquid crystal display according to the embodiment in FIG. 24;

FIG. 34 shows views of signals of an oscillation circuit related to FIG. 33;

FIG. 35 is a block diagram showing a first TC/CTL/CUE recording/reproducing circuit according to the embodiment of the present invention;

FIG. 36 shows signal waveforms of the recording system in FIG. 35;

FIG. 37 is a block diagram showing a second TC/CTL/CUE recording/reproducing circuit according to the embodiment of the present invention;

FIG. 38 shows main waveforms in FIG. 37;

FIG. 39 is a block diagram showing a third TC/CTL/CUE recording/reproducing circuit according the embodiment of the present invention;

FIG. 40 shows main pulse strings in FIG. 39;

FIG. 50 is a block diagram showing an arrangement in which states for coping with standards are managed and determined according to an embodiment of the present invention.

DETAILED DESCRIPTION OF THE PREFERRED EMBODIMENTS

The first embodiment will be described below with reference to FIG. 1.

Figure 1:
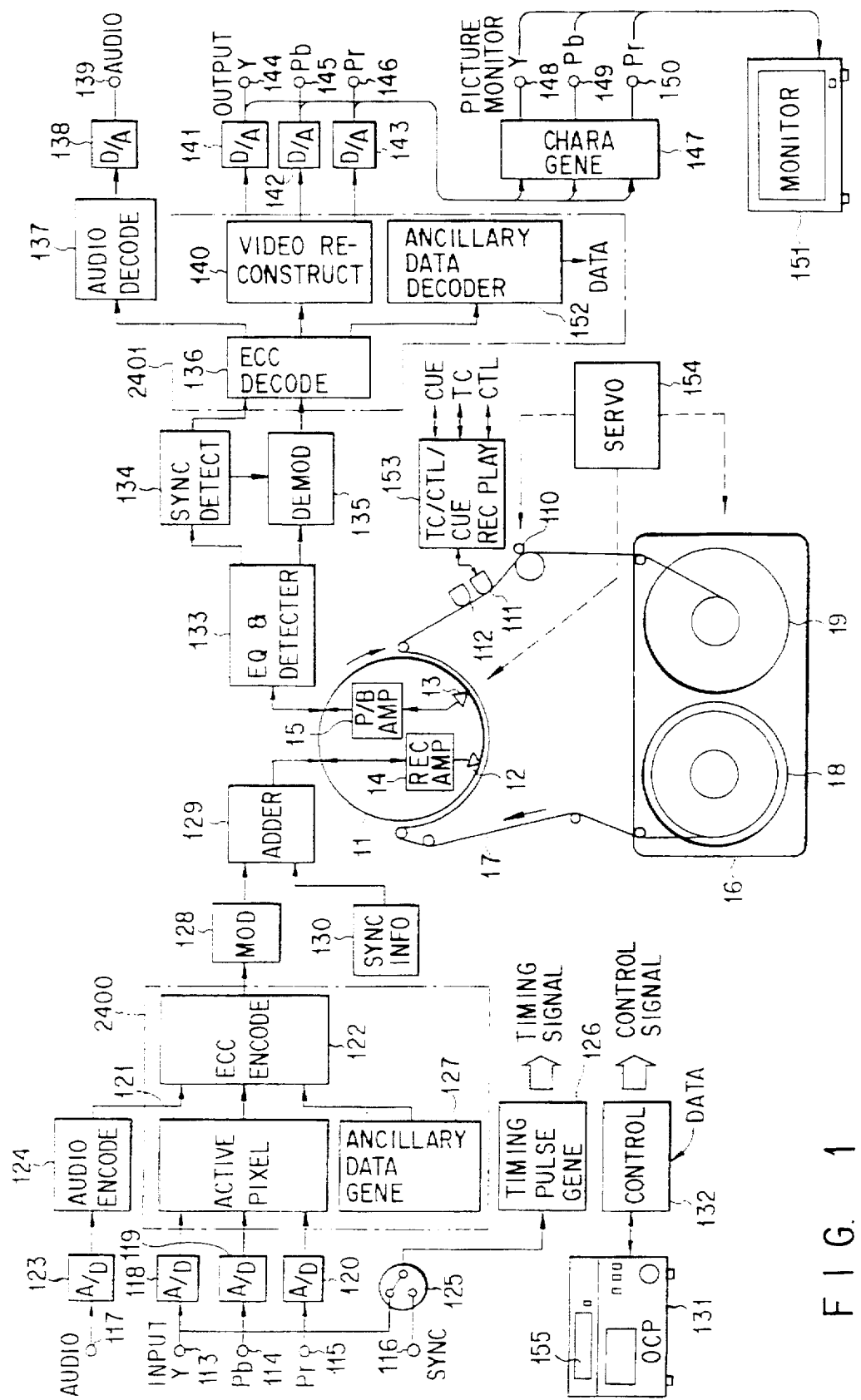
FIG. 1 is a block diagram according to the first embodiment of the present invention.

FIG. 1 is a block diagram showing a digital VTR for recording/reproducing an HDTV signal. Sixteen recording heads 12, sixteen reproducing heads 13, and an erase head (not shown) are arranged on a rotary drum 11. In addition, recording amplifiers 14 for supplying a current to the recording heads and reproducing preamplifiers 15 for amplifying signals from the reproducing heads are arranged on the rotary drum 11.

A tape 17 in a cassette 16 is drawn from a supply reel 18 and wound on the rotary drum 11 within the range of almost 180×, and then wound by a take-up reel 9.

During recording/reproducing operations, the tape 17 is transferred at a predetermined speed by rotation of a capstan 110.

In order to record/reproduce a cue audio signal, a time code signal, a control track signal, an erase head 112 and a recording/reproducing head 111 are arranged on a tape transport.

Analog component HDTV signals from an external circuit are connected to video input terminals 113 to 115 of the VTR. A reference sync signal (SYNC) is connected to an input terminal 116, and an analog audio signal (8 channels) is connected to an input terminal 117. In this case, although analog input and output signals are exemplified, the VTR can be connected to an external machine with digital signals as a matter of course.

An input component video signal is converted into a digital signal by A/D converter 118/120, and an effective image is extracted by an effective image extractor 121 (to be described later) and supplied to an ECC encoder 122. An AUDIO signal 117 is converted into a digital signal by an A/D converter 123, is subjected to encoding unique to an audio signal by an AUDIO encoder 124, and is supplied to the ECC encoder 122. On the other hand, the SyNC signal is supplied to a timing pulse generator 126 through a switch 125, and a timing pulse required for signal processing is generated by the timing pulse generator 126. The SW 125 selects a SYNC signal added to a normal input video signal in a recording or editing operation, and the SW 125 selects an external reference sync signal (SYNC) in a reproducing operation.

The ECC encoder 122 performs error correction coding for correcting a code error occurring in recording/reproducing processes, and performs encoding for recording ancillary data supplied from an ancillary data generator 127 with video or audio data. Data output from the ECC encoder 122 consists of 8-channel data corresponding to the recording heads, and the data is digitally modulated by a modulator 128 into a signal suitable for recording. Thereafter, a sync signal or an address signal generated by a SYNC information generator 130 is added to the modulated signal, and the resultant data is supplied to the recording amplifiers 14 on the rotary drum through a rotary transformer (not shown).

In addition to recording/reproducing operations, operations such as a fast-forward operation and a rewinding operation, an operation for the ancillary data, a setting operation and the like of a time code or the like, can be performed with a control panel 131 arranged on the front surface of the VTR. A control circuit 132 supplies a control signal to a circuit requiring the control signal in accordance with the contents of operations performed by an operator.

On the other hand, when a signal recorded on a tape is to be reproduced, a signal read by the reproducing heads 13 is amplified by the preamplifiers 15 and supplied to an equalizer/detector circuit 133 through a rotary transformer (not shown). After distortion received in the recording/reproducing processes is compensated by the equalizer, binary digital data is detected by the detector. A sync detector 134 detects sync information in the digital data, also supplies the sync information to a demodulator 135, and supplies the sync information to an ECC decoder 136 as a timing reference of a reproduced signal. The demodulator 135 performs an operation reverse to the operation of the modulator 128 to convert the recorded data into an information signal. The ECC decoder 136 corrects an error of the information signal, and separately reconstructs a video information signal, an AUDIO information signal, and ancillary information signal. After the AUDIO signal is decoded by an AUDIO decoder 137 in a manner unique to an AUDIO signal, the AUDIO signal is converted into an analog signal by a D/A converter 138 and output from an output terminal 139.

After sync information or the like is added to the video signal by a video information generator 140, the video signal is converted into analog signals by D/A converters 141 to 143 and externally output through output terminals 144 to 146.

Character information or the like is added to the signals from the D/A converters 141 to 143 through a character generator 147, and the resultant signals are connected to a monitor 151 through monitor output terminals 148 to 150.

On the other hand, ancillary information is decoded by an ancillary information decoder 152, temporarily supplied to the control circuit 132, and used to display its contents on a display of the control panel, to supply the information to the character generator 147 to display the information on a monitor screen, to supply data to an external personal computer, or to control the operation mode of the VTR.

Simultaneously with recording/reproducing operations for the video data and audio data, a CUE audio signal, a time code signal representing time information, and a control track signal serving as a reference for tracking are recorded/reproduced using the fixed head 111. The CUE audio signal is set such that an externally input signal and a signal having an arbitrary number of channels and selected from digital recording audio signals input to the input terminal 117 can be selectively recorded. For this reason, during a variable-speed reproducing operation (a fast-forward operation, a rewinding operation, a slow reproducing operation, or the like), a searching operation by an audio signal, and a cue operation can be performed.

The above signal processing on a linear track is performed in a TC/CTL/CUE recording/reproducing circuit 153.

The rotation of the rotary drum 11, the rotation of the capstan 110, and the rotation of the supply reel 18 for driving a cassette tape are controlled by a servo circuit 154.

Although a time code signal is recorded on a linear track as time information required for editing or searching, when the VTR is stopped or slowly operated, the time code signal cannot be read. Therefore, a time code is also recorded on a helical track, and the time code on the helical track is used when the time code on the linear track cannot be read.

In a conventional VTR, since time code data has been additionally recorded in part of the audio or video sector for a recorded signal, only the time code data has not been able to be independently edited (after-recorded). On the other hand, since a VTR in which an HDTV ("high-vision") signal of the 1125/60 scheme is digitally recorded has a very high data rate, i.e., 1.188 Gbps and requires many high-performance audio channels, a helical track has no margin for forming a time code area which can be independently edited. In this VTR, a European 1250/50 HDTV signal or a U.S. 1050/59.94 HDTV signal is to be recorded with a small number of change portions. In this case, since the European scheme or the U.S. scheme has an image information data rate lower than that of the Japanese 1125/60 scheme, the above time code signal which can be independently edited can be recorded in a redundant recording area, or other information signals can be recorded in the redundant recording area.

In the first embodiment, N tracks are defined as one segment, and a digital VTR capable of recording a signal in a first HDTV scheme in which video data to be recorded per segment has P bits and a signal in a second HDTV scheme in which video data to be recorded per segment has Q bits (P>Q) is one for recording a plurality of HDTV signals, which is characterized in that time code data constituted to be able to be independently erased and rewritten in at least one portion of one segment is recorded when the signal is recorded in the second HDTV scheme.

In this case, the first HDTV scheme is the 1125/60 scheme, and the second HDTV scheme is the 1250/50 scheme.

In addition, the first HDTV scheme is the 1125/60 scheme, and the second HDTV scheme is the 1050/59.94 scheme.

In the first embodiment, a tape is wound on a head drum through almost 180°, and 16 recording heads are arranged on the head drum, thereby performing a recording operation. The drum is rotated 150 times per second, 8 tracks corresponding to ½ revolutions of the drum are defined as one segment, and a 1125/60 "high-vision" signal is recorded for 5 segments per field.

Figure 2:
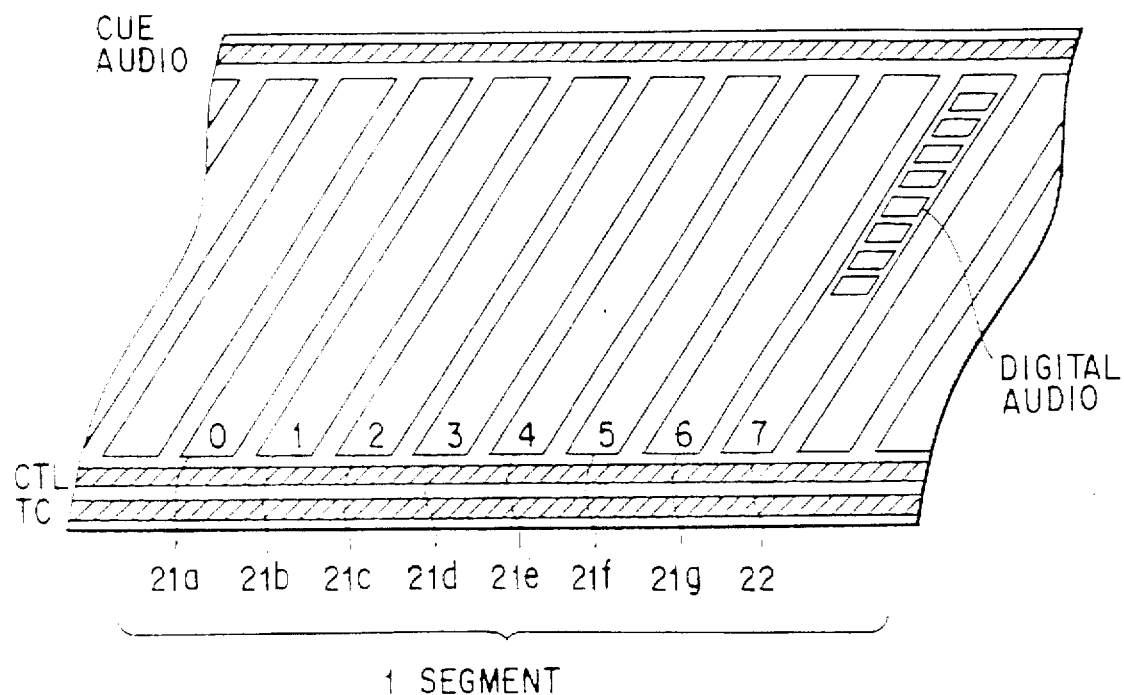
FIG. 2 is a view showing a track arrangement on a tape according to the present invention.

FIG. 2 is a schematic view showing a track arrangement on a tape. Eight tracks are defined as 1 segment. Reference numerals 21a to 21g denote 7 video tracks, and reference numeral 22 denotes a video/audio track. This track 22 has 8-channel audio sectors, and the sectors are partitioned by edit gaps and constituted to be independently edited.

Figure 3:
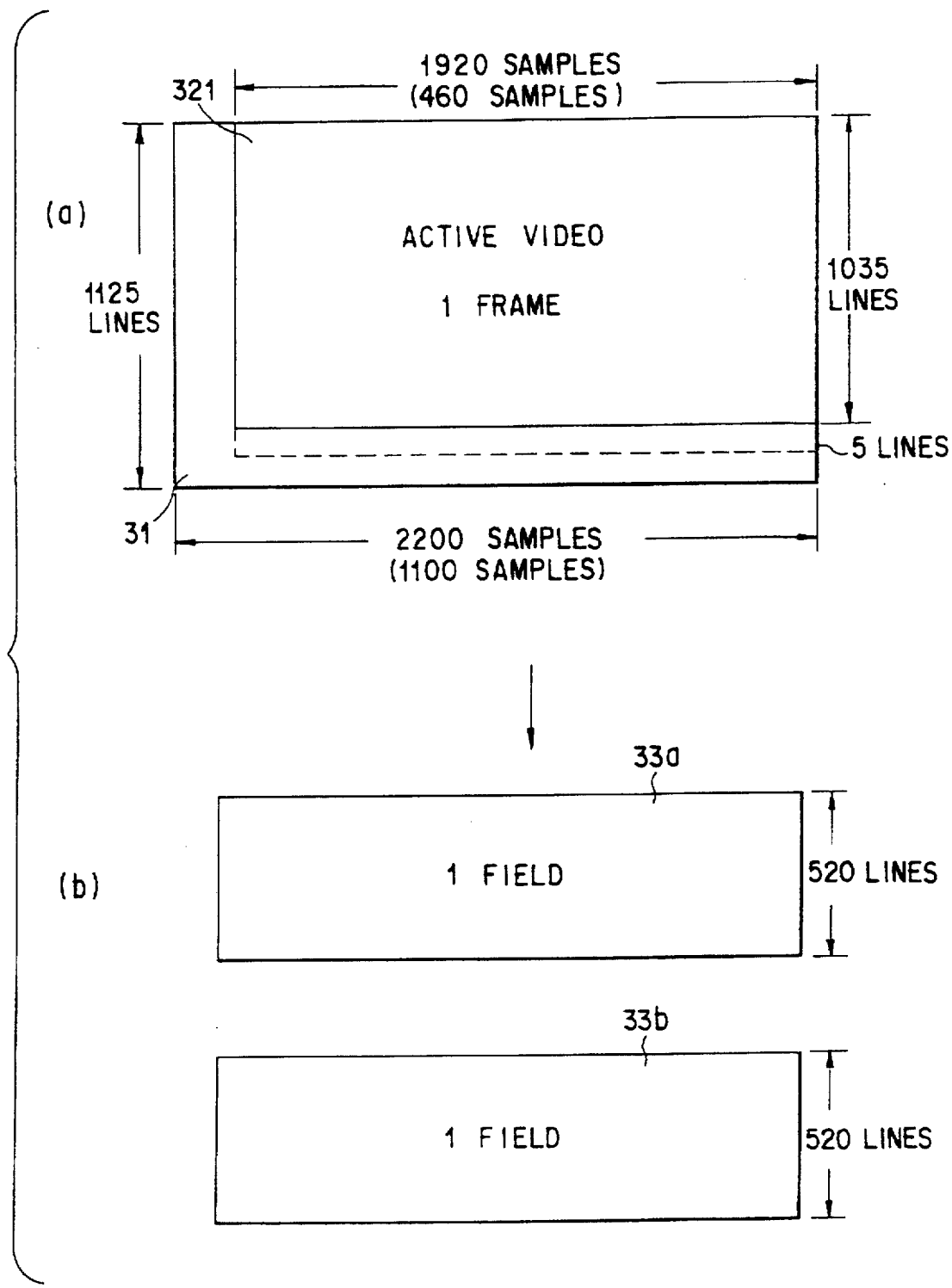
FIG. 3 shows views of a 1-frame Japanese scheme HDTV signal to be recorded.

(a) in FIG. 3 is a view showing a 1-frame HDTV signal to be recorded. A video signal is a component signal consisting of a luminance signal and two chrominance signals, the luminance signal is sampled at 74.25 MHz, and each chrominance signal is sampled at 37.125 MHz (quantization accuracy: 8 bits). The number of horizontal samples of the luminance signal is 2,200, and the number of horizontal samples of each chrominance signal is 1,100. The numbers in the brackets represent the numbers of samples of the chrominance signals. In the vertical direction, 1,125 lines are arranged. In this VTR, only effective pixels 32 except for a blanking period 1 are recorded. 1,920 (960) samples are arranged in the horizontal direction, and 1,035 lines are arranged in the vertical direction. A data area of 5 lines are additionally recorded as a data area which can be freely defined and used by a user. The 1-frame recorded data is divided into field data 33a and 33b each having 520 lines as shown in FIG. 3(b), and 1-field data is recorded within a time corresponding to 2.5 revolutions (5 segments) of the drum.

Figure 4:
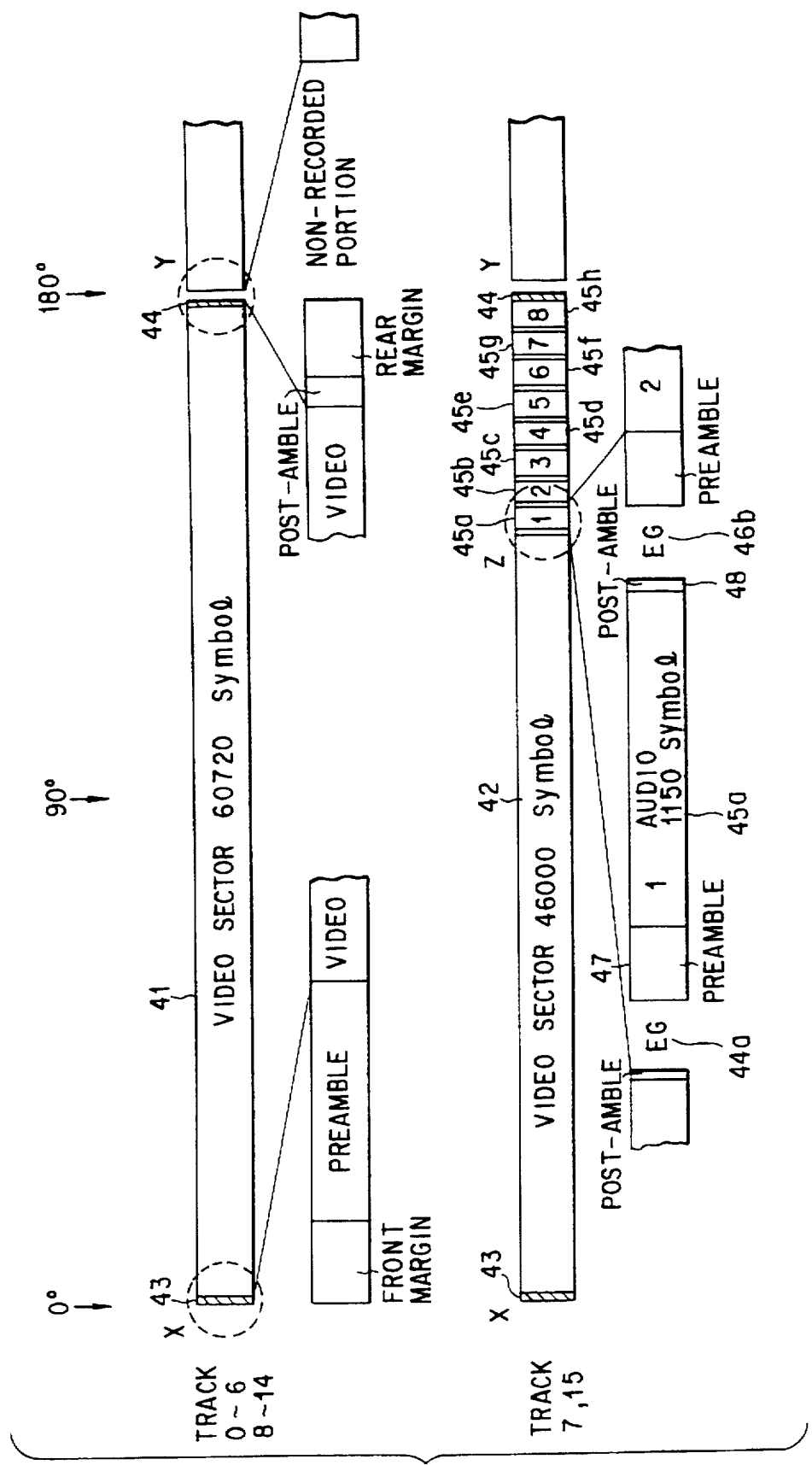
FIG. 4 is a view showing data arrangements on tracks using the scheme in FIG. 3.

After these data are coded by the ECC encoder 122 in FIG. 1 to correct an error, the data are divided into 8-channel data, and the divided data are channel-coded by the modulator 128. Sync information from the sync information generator 130 is added to the channel-coded data, and the resultant data are recorded on the tape through the recording amplifiers 14 using the 16 recording heads 12. Assuming that 8 bits are defined as one symbol, as shown in FIG. 4, video data recorded on a video track 41 has 60,720 symbols, and video data recorded on a video/audio track 42 has 46,000 symbols. The recorded video data includes redundant bits of an error correction code or an address. A preamble 43 and a post-amble 44 are formed after and before each track, and audio sectors 45a to 45h of 8 channels are arranged to be interposed by edit gaps 46a and 46b or the like. Each audio sector has a unique preamble 47 and a unique post-amble 48.

An embodiment in which signals of HDTV schemes proposed in Europe and the United States are recorded in this VTR will be described below.

Figure 6:
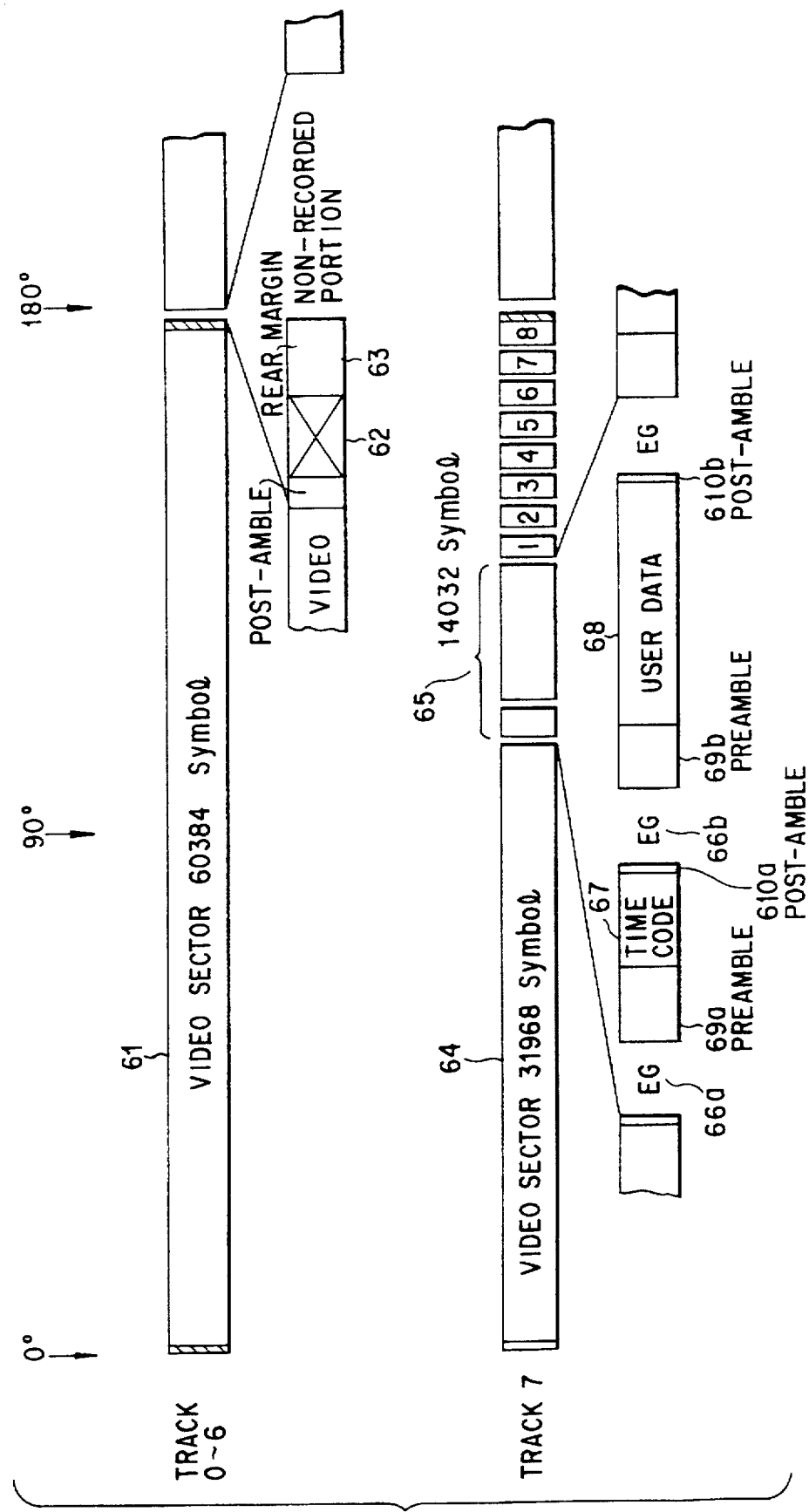
FIG. 6 is data arrangements on tracks using the scheme in FIG. 5.

A 1250/50 scheme is proposed in Europe. That is, in this scheme, the number of lines per frame is 1,250, and a field frequency is 50 Hz. (a) in FIG. 5 shows a 1-frame video signal. In (a) in FIG. 5, the luminance signal is sampled at 72 MHz, and the two chrominance signals are sampled at 36 MHz (quantization accuracy: 8 bits). The number of horizontal samples of the luminance signal is 2,304, and the number of horizontal samples of each chrominance signal is 1,152. The numbers in the brackets represent the number of samples of the chrominance signals. In the vertical direction, 1,250 lines are arranged. In this VTR, only effective pixels 52 except for a blanking period 51 are recorded, 1,920 (960) samples are arranged in the horizontal direction, and 1,152 lines are arranged in the vertical direction. A data area of 48 lines is additionally recorded as a data area which can be freely defined and used by a user. The 1-frame recorded data is divided into field data 53a and 53b each having 600 lines as shown in (a) in FIG. 5, and 1-field data is recorded within a time corresponding to 3 revolutions (6 segments) of the drum. The number of all symbols which can be recorded per recording track is the same as that of the 1125/60 scheme. Data arrangements on tracks in the 1250 scheme are shown in FIG. 6. Although the 60,720 symbols are recorded on the video track of the 1125 scheme, the number of symbols recorded on a video track 1 is 60,384 in the 1250 scheme. Although a difference of 336 symbols 62 between the symbols of the 1125 scheme and the symbols of the 1250 scheme is added to a margin 63, the symbols 62 may be used for another application. On the other hand, although video data to be recorded on a video/audio track has 46,000 symbols in the 1125 scheme, video data to be recorded on a video/audio track has 31,968 symbols in the 1250 scheme, and a blank space 65 corresponding to 14,032 symbols is formed. Time code data 67 between edit gaps 66a and 66b and user data 68 are newly formed in the blank space 65. Preambles 69a and 69b and post-ambles 610a and 610b are added before and after the data 67 and 68, respectively. In a time code data unit, time information having 32 bits per frame as in information recorded on a linear track and error-corrected and coded 32-bit time information having the same code arrangement as in video data or audio data are recorded a plurality of times. The user data is coded like video data and recorded a plurality of times like video data, thereby increasing reliability of information. The identification information of the time code data and the user data are recorded in the preambles 69a and 69b and included in the code arrangements of these data, respectively.

In this embodiment, although the time code data and the user data are arranged as shown in FIG. 6, the time code data or the user data can be separately arranged at several portions of the track within a limit of the total number of symbols of one track. In addition, the user data can be omitted, and the number of channels for audio data can be increased in place of the user data.

An embodiment in which a signal of a 1050/59.94 scheme proposed in the United States is recorded will be described below.

In this scheme, the number of lines per frame is 1,050, and a field frequency is 59.94 Hz. This field frequency is different from a field frequency of 60 Hz by 0.1%. For this reason, in a VTR, when the number of revolutions of a drum, a tape speed, and a recording data rate are decreased by 0.1%, the other can be handled as in the scheme having the field frequency of 60 Hz. (a) in FIG. 7 shows a 1-frame video signal. Referring to (a) in FIG. 7, a luminance signal is sampled at a frequency of 72 MHz, and two chrominance signals are sampled at a frequency of 36 MHz (quantization accuracy: 8 bits). The number of horizontal samples of the luminance signal is 2,288, and the number of horizontal samples of each chrominance signal is 1,144. The numbers in the brackets represent the numbers of samples of the chrominance signals. The video signal has 1,050 lines in the vertical direction. In this VTR, only effective pixels 72 except for a blanking period are recorded, 1,920 (960) samples are arranged in the horizontal direction, and 966 lines are arranged in the vertical direction. A data area of 34 lines is additionally recorded as a data area which can be freely defined and used by a user. As shown in (b) in FIG. 7, 1-frame recorded data is divided into field data 73a and 73b each having 500 lines, and 1-field data is recorded within a time corresponding to 2.5 revolutions of the drum (5 segments). The total number of symbols which can be recorded per recording track is equal to that of the 1125/60 scheme. In the 1050 scheme, data arrangements on tracks are shown in FIG. 8. Although the number of symbols recorded on a video track in the 1125 scheme is 60,720, the number of symbols recorded on a video track 81 is 58,608. Although the difference between the number of symbols in the 1125 scheme and the number of symbols in the 1050 scheme, i.e., 2,112 symbols 82, is added to a margin 83 of the track, and the symbols 82 can be used for another application. In particular, in the 1050 scheme, since the number of excessive symbols is large, time code data having an edit gap can also be recorded on the video track.

On the other hand, although video data to be recorded on a video/audio track of the 1125 scheme has 46,000 symbols, video data to be recorded on a video/audio track of the 1050 scheme has 31,968 symbols, and a blank space 85 corresponding to 14,032 symbols is formed. As in the 1250 scheme, edit gaps 86a and 86b, time code data 87, and user data 88 are formed in this blank space 85. Preambles 89a and 89b and post-ambles 810a and 810b are added before and after the time code data 87 and the user data 88, respectively. In this 1050 scheme, the same time code data and user data as those used in the 1250 scheme can be used.

In this embodiment, although the time code data and the user data are arranged as shown in FIG. 6 or 8, recorded data on the video track may be reduced to form a space, and time code data may be recorded at one portion or several portions. In short, a time code recording area can be freely set within a range of an excessive data area in one segment.

In the above first embodiment, 8 tracks are used as a unit. Although an AUDIO signal is concentrated and recorded on one specific track in one segment, another method of recording the AUDIO signal can be used. The second embodiment in which this method is used as an example will be described below.

Figure 9:
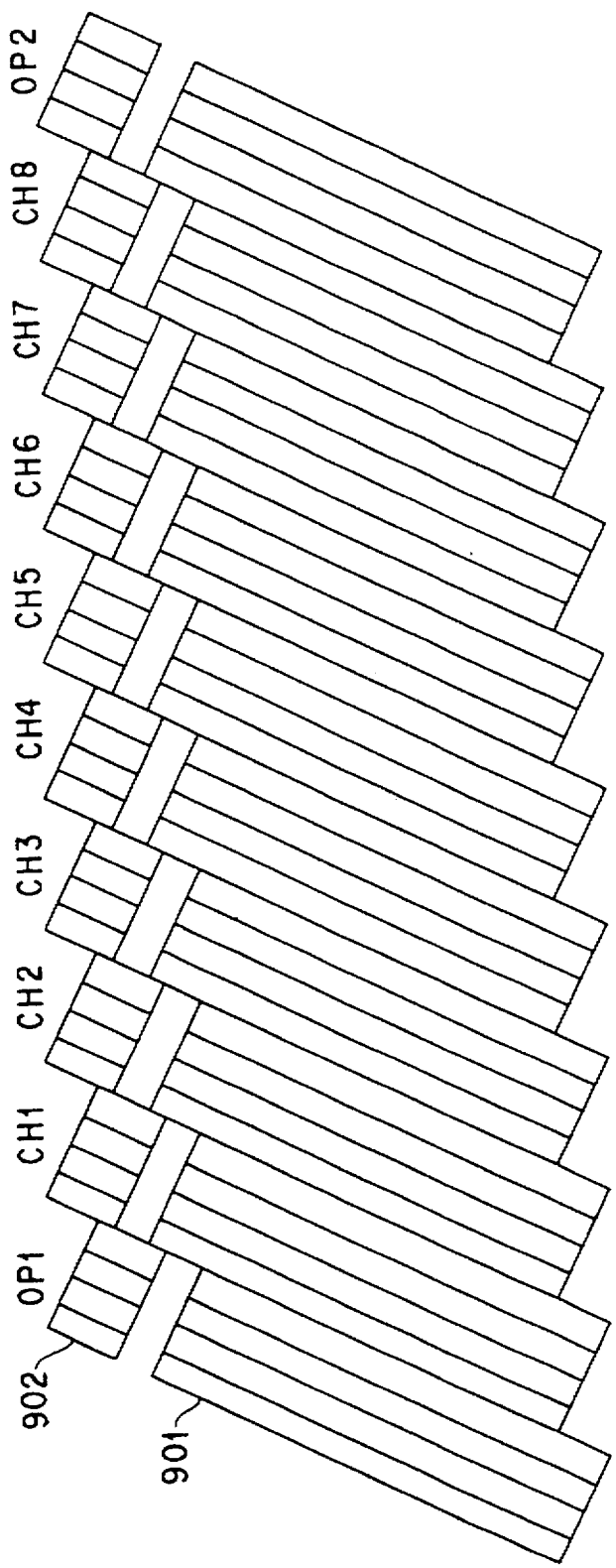
FIG. 9 is a view showing a 1-field track pattern according to the second embodiment of the present invention.

In this embodiment, an audio signal is recorded as shown in FIG. 9. FIG. 9 shows a 1-field track pattern of a 1125/60 scheme. Reference numeral 901 denotes a video recording area, and reference numeral 902 denotes an audio recording area. That is, audio recording areas are formed in all tracks, the 1-field audio signal of the same channel is recorded on adjacent tracks (4 tracks). In the 1125/60 scheme or the 1050/59.94 scheme, an audio signal of 10 channels (8 channels+2 optional channels) can be recorded. In the 1250/50 scheme, an audio signal of 12 channels (8 channels+4 optional channels) can be recorded.

In an editing operation, due to a tracking error in the direction of the track width, tracks are not completely erased, or non-edited tracks are erased. An error rate easily increases in the tracks immediately before and after an edition point. For this reason, when an editing operation is performed in units of fields, a track adjacent to an end portion of a field, i.e., an edition point, is damaged easier than other tracks. Therefore, according to this embodiment, as shown in FIG. 9, the two audio channels arranged at the end portions of the field are assigned as optional channels OP1 and OP2. In each optional channel, data having the same contents as those of an arbitrary audio channel may be recorded as backup data.

Figure 10:
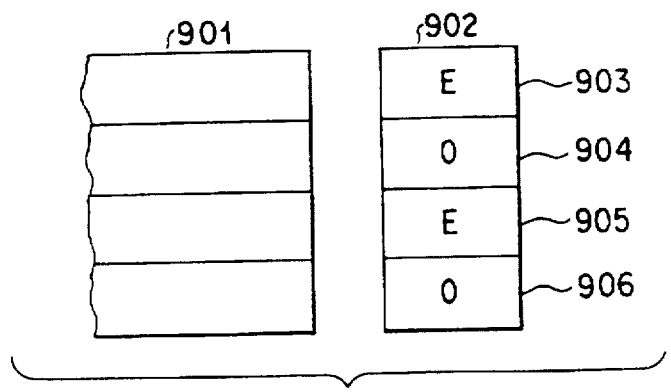
FIG. 10 is an enlarged view showing audio recording areas of a channel in FIG. 9.

FIG. 10 is an enlarged view showing an audio recording area of one channel, i.e., four tracks, in FIG. 9. The audio data are written in the audio recording area twice. Data E or O is recorded twice such that the data E related to even-numbered samples is recorded on tracks 903 and 905 and the data O related to odd-numbered samples is recorded on tracks 904 and 906.

In this recording scheme, audio pre-reproducing heads (used in an audio editing operation) of the same number as the number of reproducing heads are required. However, since the same data is written twice, when only one of the data is reproduced only in a pre-reproducing operation, the number of pre-reproducing heads can be set to be ½ the number of reproducing heads.

At this time, it will be described which one of the two written identical data is reproduced by the pre-reproducing heads. In the recording scheme shown in FIGS. 9 and 10, when an insert editing operation is performed in units of audio channels, the 4 adjacent audio recording areas of the same channel are necessarily rewritten at once. More specifically, since, of the 4 tracks, two tracks (indicated by 903 and 906 in FIG. 10) at the end portions are adjacent to the edition points, the two tracks are easily damaged by an editing operation due to the above reason. The two inner tracks (indicated by 904 and 905) are not easily damaged. For this reason, since each of the two tracks adjacent to the edition points and located at the end portions probably has a high error rate, the two tracks at the end portions are not to be subject to the pre-reproducing operation. Therefore, the pre-reproducing heads are preferably arranged to scan the two inner tracks.

As described above, even when an audio recording area is formed on each of all tracks as shown in FIG. 9, only one of the two written identical data is pre-reproduced. At this time, when tracks adjacent to edition points are not included in tracks to be pre-reproduced, the number of audio pre-reproducing heads can be reduced to ½ the number of reproducing heads, and the number of errors of data to be pre-reproduced can be minimized.

Figure 11:
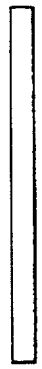
FIG. 11 shows first views of various audio recording schemes.
Figure 12:
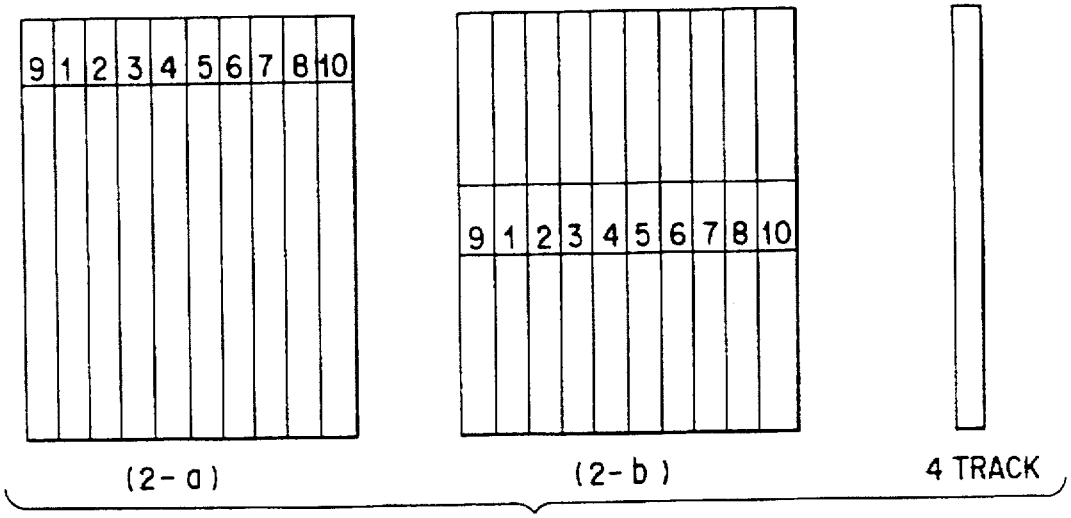
FIG. 12 shows second views of various audio recording schemes.
Figure 13:
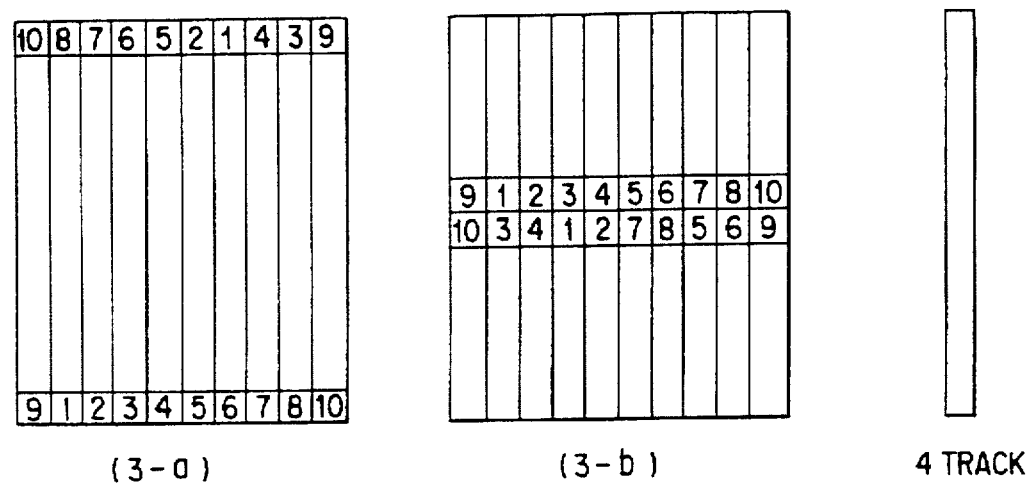
FIG. 13 shows third views of various audio recording schemes.
Figure 13:
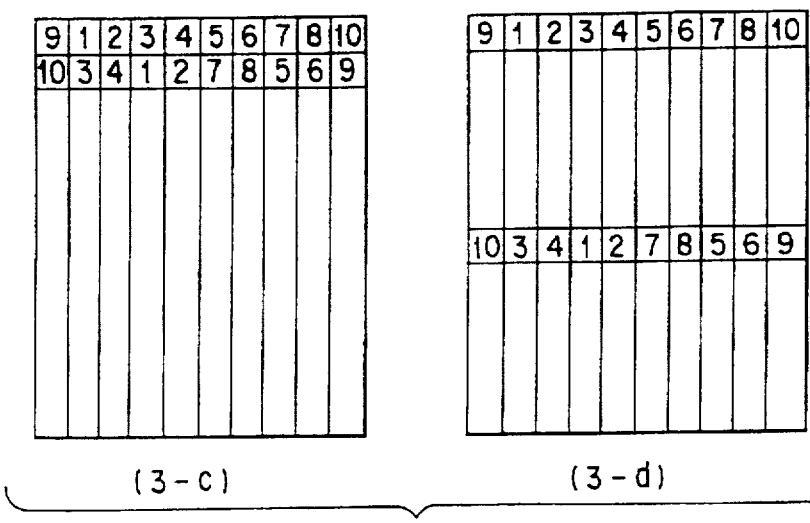

As an audio signal recording scheme, schemes shown in FIGS. 11 to 14 can be considered. Each of FIGS. 11 to 14 shows 40 tracks corresponding to one field used when an audio signal of 10 channels is recorded in the 1125/60 scheme. Reference numerals in FIGS. 11 to 14 denote audio channel numbers, respectively. (1-a) to (1-d) in FIG. 11 show a scheme of recording an audio signal of the same channel on 8 tracks using 8 tracks as one unit, (2-a) and (2-b) in FIG. 12 and (3-a) to (3-d) in FIG. 13 show a scheme of using 4 tracks as one unit, and (4-a) and (4-b) in FIG. 14 show a scheme of forming an audio recording area on a predetermined number of tracks of 8 tracks. The example shown in FIG. 9 corresponds to the example shown in (2-a) in FIG. 12.

An embodiment in which tapes recorded in different schemes are reproduced will be described below.

In a digital VTR coping with a plurality of schemes (the 1125/60 scheme, the 1050/59.94 scheme, and the 1250/50 scheme) having the different numbers of scanning lines and different field frequencies, the plurality types of schemes are set by switching a switch or the like. When a scheme set by this switch, the scheme of an input reference signal, and a scheme identified by a tape are different from each other, video data cannot be reproduced by a conventional VTR. More specifically, when contents are recorded in a given scheme (first scheme) on a tape, video data corresponding to the contents cannot be reproduced and displayed on a monitor in the second scheme.

According to the third embodiment, the contents of video data recorded in different schemes can be confirmed, and video data recorded in different schemes can be reproduced by performing scheme conversion.

More specifically, according to the third embodiment, a digital VTR has modes for reproducing signals recorded in a plurality of schemes having a difference in at least one of the number of scanning lines and the field frequency, and this digital VTR has the following characteristic feature. That is, the digital VTR comprises a memory in a reproducing circuit and has a mode for writing data in the memory in a method corresponding to the first scheme and reading the data from the memory in a method corresponding to the second scheme.

The third embodiment of the present invention will be described below.

According to this embodiment, a digital VTR for separately recording data in 8 channels is considered. The number of tracks per field is determined to be 40 in the 1125/60 scheme or the 1050/59.94 scheme, and the number of tracks per field is determined to be 48 in the 1250/50 scheme. That is, the number of tracks of one channel per field is 5 in the 1125/60 scheme or the 1050/59.94 scheme, and the number of tracks of one channel per field is 6 in the 1250/50 scheme. The arrangement of an error correction code is completed within 5 tracks (or 6 tracks).

One-field data to be actually recorded in this embodiment is shown in FIG. 15. The number of recording lines per field is 520 in the 1125/60 scheme or the 1050/59.94 scheme as shown in (a) in FIG. 15, and the number of recording lines per field is set to be 624 in the 1250/50 scheme as shown in (b) in FIG. 15. The number of samples per line does not depend on the schemes. That is, the number of samples of a luminance signal is 1,920, and the number of samples of a chrominance signal is 960.

The data is divided into 8-channels data. With respect to data of each channel, an error correction matrix shown in FIG. 16 is constituted. That is, C2 parity symbols of P2 symbols are added to symbols representing the number (120) of C2 information symbols, and C1 parity symbols of P1 symbols are added to symbols representing the number (104) of C1 information symbols. (e.g., P1=P2=8 is set). FIG. 17 shows the arrangements of 1-field, 1-channel data. Twenty error correction matrices 0 to 19 shown in FIG. 16 are arranged in the 1125/60 scheme or the 1050/59.94 scheme as shown in (a) in FIG. 17, and 24 error correction matrices 0 to 23 are arranged in the 1250/50 as shown in (b) in FIG. 17. (Note that a C1 parity symbol is omitted in FIG. 4). These error correction matrices are divided into five portions (or 6 portions) in the column direction as shown in the right side of (a) or (b) in FIG. 17. The error correction matrices are divided into five tracks 0 to 4 and recorded in the 1125/60 scheme or the 1050/59.94, and the error correction matrices are divided into six tracks 0 to 5 and recorded in the 1250/50 scheme. As a result, an amount of data per track does not depend on the schemes, and the same amount of data per track can be obtained in each of the different schemes.

A recording operation is performed in units of sync blocks. An ID (identification) code representing a field number, a channel number, a track number, and a sync block number in a track is added to each sync block.

FIG. 18 shows schematic views showing address assignment performed when data is actually stored in a field memory. Addresses are basically assigned in an address recording order, i.e., a sync block ID order. Addresses of 5 tracks are assigned in the 1125/60 scheme or 1050/50.94 scheme as shown in (a) in FIG. 18, and addresses of 6 tracks are assigned in the 1250/50 scheme as shown in (b) in FIG. 18.

A rule (shuffling) used when data on the screens shown in FIG. 15 are arranged as shown in FIG. 17 in one of the two schemes, i.e., the 1125/60 scheme and the 1050/60 scheme is different from that in the 1250/50 scheme due to the difference in number of recording lines and a difference in numbers of error correction matrices. In addition, the relationship between the data arrangement shown in FIG. 17 and the recording order shown in FIG. 18 and determined by the sync block ID in one of the 1125/60 scheme and the 1050/59.94 scheme is different from the relationship between the data arrangement shown in FIG. 17 and the recording order shown in FIG. 18 and determined by the sync block ID due to the difference between the numbers of error correction matrices and the difference between the numbers of recording tracks.

FIG. 19 is a view showing the arrangement of an error correction circuit 136 (and a circuit related to the error correction circuit 136) in the reproducing circuit of the digital VTR in FIG. 1 according to this embodiment. Referring to FIG. 19, a reproduced signal input to the error correction circuit is subjected to decoding of a CI code in a CI decoding circuit 1901, and is written in one field memory or a plurality of field memories of four reproducing field memories 1902a to 1902d. In this writing operation, a write address (real address of field memory) is synthesized in a write address generation circuit 1905 on the basis of an ID detected by an ID detection circuit 1904. The roles of the reproducing field memories 1902a to 1902d are deshuffling (reverse conversion of shuffling) and storing of data in a variable-speed reproducing operation. Data read from any one of the reproducing field memories is subjected to decoding of a C2 code in a C2 decoding circuit 1903, and is output from the error correction circuit. At this time, a read (deshuffling) address is generated by a read address generation circuit 1906. As described above, a method of generating a read address changes depending on the schemes.

A control operation is performed by a control circuit 1907, and the control circuit 1907 generates a channel system (write system) control signal 1924 and a video system (read system) control signal 1925. An output (video system) reference signal 1922 is supplied to a timing signal generation circuit 1909, thereby generating a timing signal. At the same time, a scheme identification result from the output reference signal 1922 is supplied to a mode setting circuit 1908, and a servo reference signal 1923 is generated. In this case, different basic clock frequencies are used in the channel system and the video system, respectively. Although the same clock of the channel system is used regardless of the schemes, the clock of the video system changes depending on the schemes due to the difference in video sampling frequency.

The scheme of data recorded on a tape is identified by a cassette main body or contents recorded on the longitudinal or helical tracks of the tape, and a scheme identification signal 1921 corresponding to the contents of the tape is supplied to the mode setting circuit 1908. In the mode setting circuit 1908, an operation mode of the VTR is determined with reference to the scheme identification result of the scheme identification signal 1921 or the output reference signal 1922 or a setting performed by a switch (not shown). When the setting by the switch conflicts with the reference signal or the scheme identification signal, a correct reproducing operation cannot be performed. For this reason, video data is inhibited from being output. However, in a different scheme reproducing mode, even when the scheme of the contents of a tape is different from the scheme of an output reference signal, the control circuit 1907 is operated to perform recording/reproducing operations. More specifically, if the scheme of the contents of the tape is the first scheme, the channel system control signal 1924 corresponding to the first scheme is generated. If the scheme of the output signal 1922 is the second scheme, a video reference signal 125 corresponding to the second scheme is generated. At this time, the servo reference signal 1923 corresponding to the first scheme is generated by a timing signal generation circuit 109.

An operation performed when a tape recorded in a single scheme is normally reproduced by a VTR will be described below. In this case, an example wherein a tape recorded in the 1125/60 scheme is reproduced will be described below. The output reference signal 1922 having a frequency of 30 Hz and using the 1125/60 scheme is externally supplied to the timing signal generation circuit 1909, thereby generating the servo reference signal 1923 having a frequency of 30 Hz. The control circuit 1907 generates the channel system control signal 1924 and the video system control signal 1925 corresponding to the 1125/60 scheme.

FIG. 20 shows a control operation of the four reproducing field memories 1902a to 1902d (#1 to #4) in a normal reproducing operation. Referring to FIG. 20, the phase of a reproducing reference signal (servo reference signal) and the phase of an output reference signal are locked with each other. At this time, reproduced data are supplied to reproducing field memories at timings shown in FIG. 20. Referring to FIG. 20, "0" denotes reproduced data of an even-numbered field, and "1" denotes reproduced data of an odd-numbered field. Suffixes 0 and 1 represent an even-numbered field and an odd-numbered field, respectively. For example, reference symbol W0 represents that data are written in the field memories of only an even-numbered field.

As shown in FIG. 20, a switching operation between write access and read access is performed in units of fields, and data are sequentially read from the four field memories #1 to #4 using four fields as a period. Write access is performed in two fields before read access. In write access, a write address corresponding to the 1125/60 scheme is generated on the basis of an ID. In addition, a read address corresponding to a deshuffling method of the 1125/60 scheme is generated. As described above, write access and read access to the reproducing field memories are generally performed in accordance with the same scheme.

A case wherein tapes of different schemes are reproduced. In this embodiment, a control scheme is changed into another before and after a reproducing field memory. In this case, the 1125/60 scheme and the 1250/50 scheme will be described.

Assuming that the 1250/50 scheme is used as the first scheme, it is considered that a tape recorded in the first scheme is reproduced in accordance with the 1125/60 scheme (second scheme). Although a 30-Hz output reference signal 122 of the 1125/60 scheme is externally supplied to the timing signal generation circuit 109, a 25-Hz servo reference signal is generated. This 25-Hz reference signal may be generated in asynchronism with the external 30-Hz reference signal. (Depending on a case, a servo reference signal may not be supplied in units of frames, i.e., framing control may not be performed.) In addition, if a process performed before write access to the reproducing field memory is performed partially changes depending on schemes, a channel system control signal 124 is generated in accordance with the 1250/50 scheme. More specifically, if a process for the length of a sync block or a sync pattern, a modulation method, and a process for an ID change depending on schemes, these processes depend on the 1250/50 scheme. A write address is generated in accordance with the 1250/50 scheme. However, in the format of this embodiment, these processes are performed almost independently of the schemes.

A control operation of the reproducing field memories 102a to 102d performed in the above case is shown in FIG. 21. A switching operation between write access and read access is performed in units of fields of the 1125/60 scheme. As in the case shown in FIG. 20, a read field memory is switched in a 4-field period. However, as is apparent from FIG. 21, the field of reproduced data is gradually deviated from the output reference signal along the time axis. Therefore, write access is always performed except for a time when read access is performed, a field ID is not discriminated in write access, and both reproduced data of even- and odd-numbered fields are written. The video system control signal 1925 is generated such that a process after read access to the field memories is performed in accordance with the second scheme, i.e., the 1125/60 scheme.

The above control operation can be considered to be almost the same as a control operation performed during a shuttle reproducing operation (high-speed reproducing operation) in a digital VTR. In this case, however, since a plurality of fields are mixed with each other and displayed, image quality (resolution) is degraded. Note that a switching operation between write access and read access to the reproducing field memories may be performed by a method of performing a time-divisional operation in units of clocks in place of units of a time-divisional method using fields.

Figure 22:
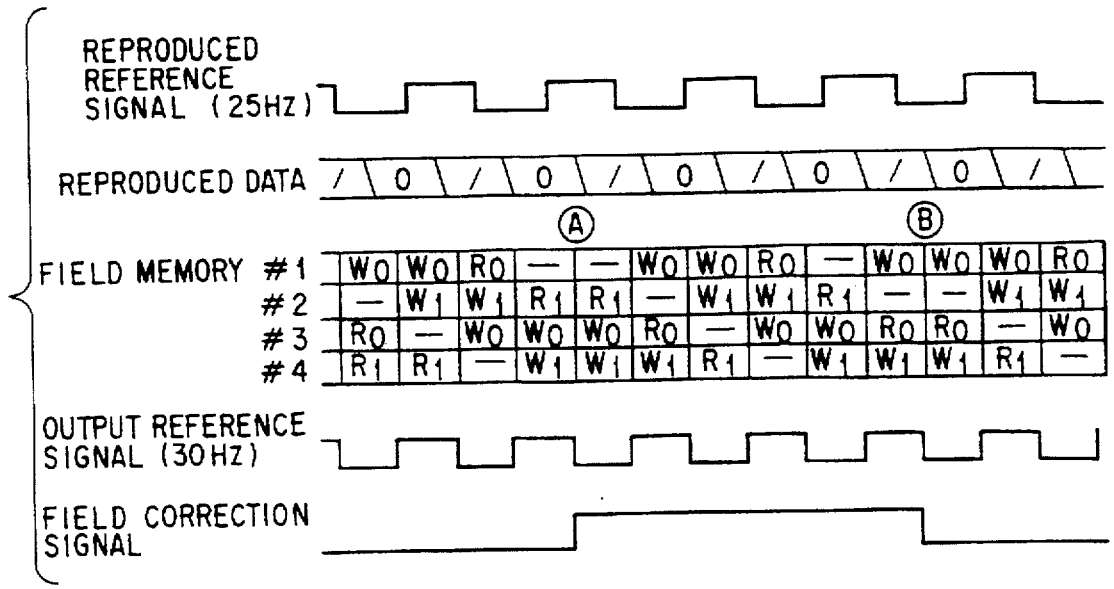
FIG. 22 is a view showing control of a reproducing field memory when a reproducing operation is performed in different schemes according to the embodiment in FIG. 15.

Another control operation of the reproducing field memories 1902a to 1902d is shown in FIG. 22. In this operation, the same field is repetitively reproduced. It is determined by the value of a field ID detected in the ID detection circuit 104 whether an input operation of a field is completed, and a reproducing field memory to which read access is performed is determined in the next field. For example, in a field next to a point A in FIG. 22, although read access is to be performed to a field memory #3, since an input operation of reproduced data of the field memory #3 is not completed, read access to the field memory #3 is not performed, and read access to the field memory #2 is performed again. Similarly, in the field next to a point B, although read access is to be performed to a field memory #4, since an input operation of reproduced data of the field memory $4 is not completed, read access is not performed to the field memory #4, and read access to the field memory #3 is performed. That is, read access to the same field is repeated once for six fields.

In this case, when the parity of the field of an output reference signal does not coincide with that of a read field, a height error in a vertical direction is preferably corrected. Since the parity of the read field is inverted in the interval between the point A and the point B in FIG. 22, a field correction signal goes to high level, and the height error of the field in the vertical direction is performed. The above control operation may be considered to be almost the same as an operation performed during a slow-motion reproducing operation in a digital VTR.

Figure 23:
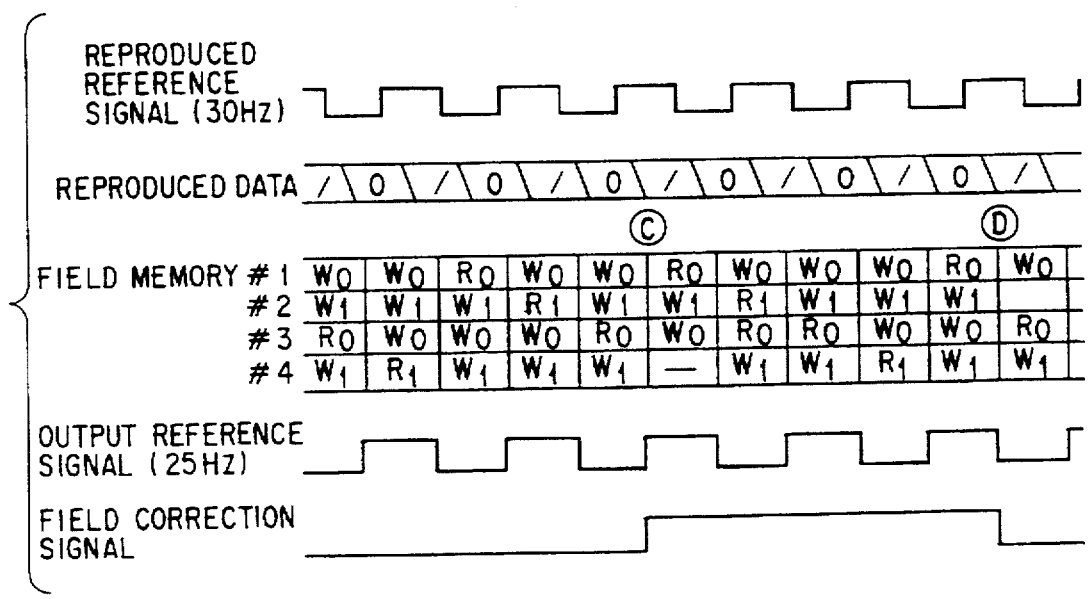
FIG. 23 is a view showing control of a reproducing field memory when a reproducing operation is performed in different schemes according to the embodiment in FIG. 15.

Assuming that the 1125/60 scheme is used as the first scheme, it is considered that a tape recorded in the first scheme is reproduced in accordance with the 1250/50 scheme (second scheme). A control signal and the like are inverted to those of the above operation. In this case, in contrast to the case shown in FIG. 22, an example wherein fields are interleaved will be described. A control operation of the reproducing field memories 1902a to 1902d performed at this time is shown in FIG. 23. It is determined by the value of a field ID detected by the ID detection circuit 1904 whether an input operation of a field is completed, and a reproducing field memory to which read access is performed is determined in the next field. For example, in the field next to a point C in FIG. 23, although read access is to be performed to a field memory #4, since an input operation of reproduced data of a field memory #1 next to the field memory #4 is completed, read access is not performed to the field memory #4, but read access to the field memory #1 is performed. Similarly, in the field next to a point D, although read access is to be performed to a field memory #2, since an input operation of reproduced data of a field memory #3 next to the field memory #2 is completed, read access is not performed to the field memory #2, and read access is performed to the field memory #3. That is, interleaving for field read access is performed once for five fields.

Since the parity of a read field is inverted in the interval between the point C and the point D in FIG. 23, a field correction signal goes to H level, and the height error of the fields in the vertical direction is performed. Note that, when a reproducing operation is performed by converting the 1125/60 scheme into the 1250/50 scheme, as in the case in FIG. 21, a control operation according to a shuttle reproducing operation may be performed.

Although the reference signals of the two schemes are asynchronized with each other or have indefinite phases in each of the examples described above, the reference signals may be synchronized with each other using a PLL circuit or the like. When the reference signals are synchronized with each other, interleaving for regular fields can be easily repeated without a circuit for determining whether an input operation of a reproducing field is completed.

In the above embodiments in FIGS. 22 and 23, simple scheme conversion such as field interleaving or field repetition is described. However, when more advanced scheme conversion such as field interpolation is performed, artificial motions can be eliminated, and the quality of a reproduced image is improved as a matter of course. That is, an interpolated signal is obtained by calculation (linear interpolation or the like) of data read from two or more field memories. In this case, however, the number of field memories must be generally increased.

A control operation performed when read access is performed to a reproducing field memory in accordance with the second scheme will be described below in detail. In addition, since the number of effective samples in the lateral direction is constant independently of schemes, read access within one line can be performed without causing any problem. However, as described above, a plurality of schemes have the different numbers of effective lines, respectively. Therefore, when a signal of the first scheme is displayed on a monitor using the second scheme, the lower portion of a screen is cut when the number of lines of the second scheme is smaller than the number of lines of the first scheme, and indistinct noise data may be displayed on the lower portion of the screen when the number of lines of the second scheme is larger than the number of lines of the first scheme.

For this reason, when the number of lines of a monitor (second scheme) is large, a start line of read access to a reproducing field memory is offset (i.e., a start of read access to effective lines is delayed) such that an area in which an image is displayed is located at the almost central portion of the screen, and the upper and lower portions of the screen are converted into portions represented by black level or gray level to prevent indistinct noise data from being displayed, so that so-called letter box display may be performed. In contrast to this, when the number of lines of the monitor (second scheme) is small, a start line of read access may be offset such that the upper and lower portions are uniformly cut (i.e., the start of read access to effective lines is advanced).

At this time, however, the screen on the monitor may display a picture which is entirely compressed or expanded in all directions. In order to prevent a picture from being compressed or expanded due to the excessiveness or shortage of the number of lines, read access to the same line may be repeated, or interleaving of read lines may be performed. In addition, line interpolation (e.g., linear interpolation) may be performed using data of two or more lines.

In the above description, although the 1125/69 scheme and the 1250/50 scheme are used as the first and second schemes, respectively, even when the 1050/59.94 scheme or other schemes are used as the first and second schemes, the same effect as described above can be obtained. However, conversion between the 1125/60 scheme and the 1050/59.94 scheme can be realized easier than the conversion described above, if the difference (0.1%) between the display speeds of these schemes is allowed.

As described above, when a control operation similar to a shuttle reproducing operation or a slow reproducing operation is performed, the contents of tapes recorded in different schemes can be satisfactorily confirmed without adding any hardware. In addition, in order to obtain satisfactory quality of an image of a tape by a VTR using a scheme different from that of the tape, reference signals are synchronized with each other, and professional scheme conversion may be performed by performing field interpolation or line interpolation.

The present invention is not limited to the above embodiment, and the present invention can be used in various applications. For example, by using a shuffling field memory on a recording side, a recording operation may be performed while scheme conversion is performed during the recording operation.

In the above embodiment, the number of lines per field and the number of C1 information symbols per field are set to be 520 and 104 in the 1125/60 scheme, respectively; 500 and 100 in the 1050/59.94 scheme, respectively; and 600 and 100 in the 1250/50 scheme, respectively. In accordance with this, a sync block length or a recording wavelength may be changed depending on the systems.

A method of identifying different schemes in use of the same cassette will be described below.

This embodiment in which a bar-code label obtained by describing representing identification information for identifying a plurality of pieces of scanning line information on a cassette case, a magnetic card, a memory card, a selection switch are attached, comprises a pickup means for obtaining scanning line identification information when a cassette is inserted or set or when a tape runs from the start position, a function of switching a recording/reproducing signal processing circuit in accordance with the obtained scanning line identification information to display scanning line information, a means for storing the obtained scanning line identification information, and a means for supplying and for rewriting the stored identification information to the scanning line information identification storage means when the cassette is ejected.

In this manner, since the identification information storage means for a plurality of scanning line schemes is arranged on the cassette case or a magnetic tape, a recording/ reproducing operation can be automatically performed in a desired scanning line scheme by identifying and storing this information. In addition, since the identification information for a scanning line scheme is stored, the identification information for the scanning line scheme can be displayed by the pickup and display functions at any time, and the identification information stored when the cassette is ejected is supplied to the identification information storage means for the scanning line scheme and the display means on the cassette case for displaying the above information and rewritten. For this reason, the identification information for the scanning line scheme on the cassette case can have redundancy.

The fourth embodiment will be described below with reference to the accompanying drawings.

When scanning line schemes are different from each other in FIG. 15, recording system signal processing units 121, 122, and 127, reproducing system signal processing units 136, 140, and 152, and a circuit (timing pulse generator 126) for generating a control timing of a cassette digital VTR with a reference signal are switched to a circuit operation corresponding to each scanning line scheme using a control signal from a control circuit 132 by a method of identifying a scanning line scheme (to be described below).

Figure 24:
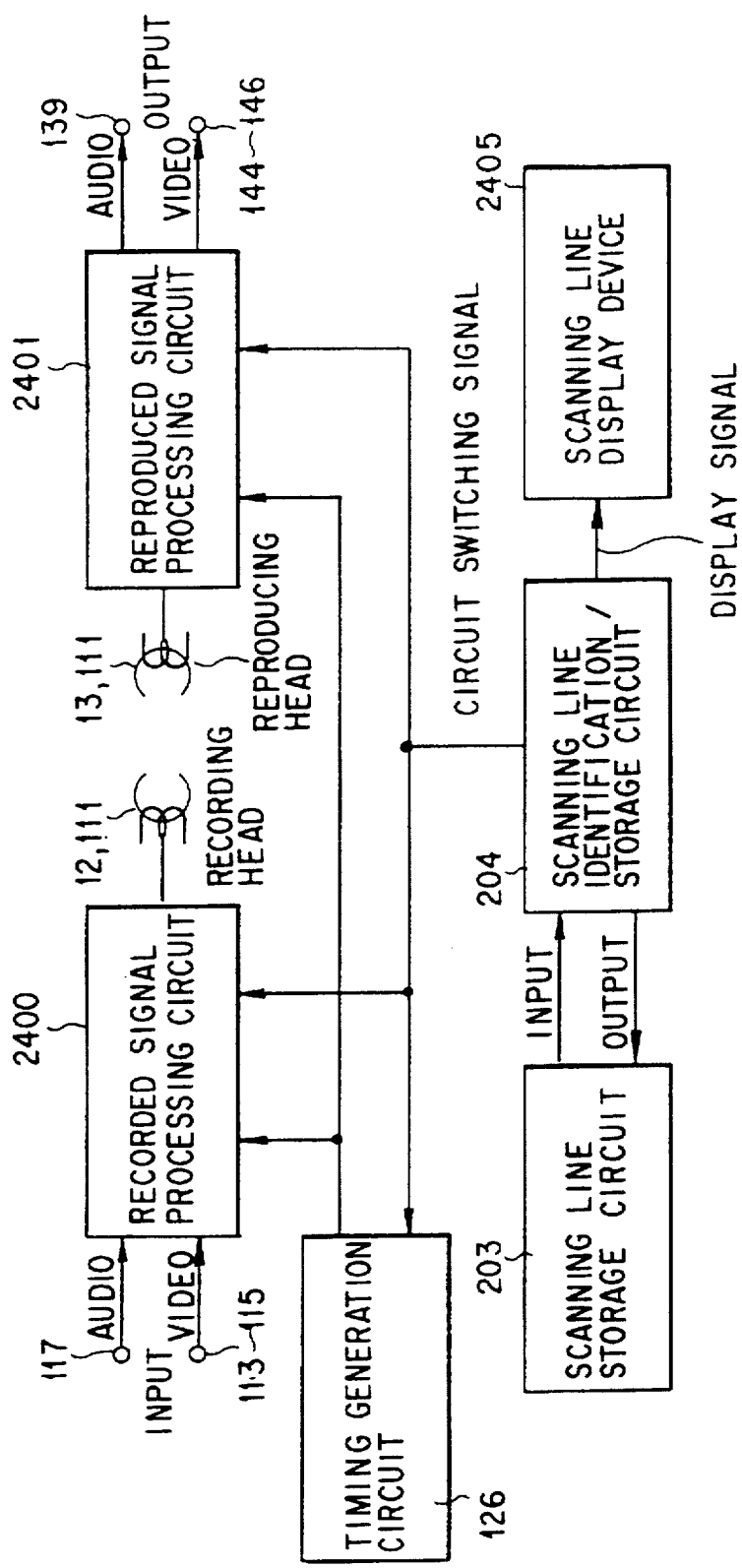
FIG. 24 is a block diagram showing scanning line identification according to the fourth embodiment of the present invention.
Figure 25:
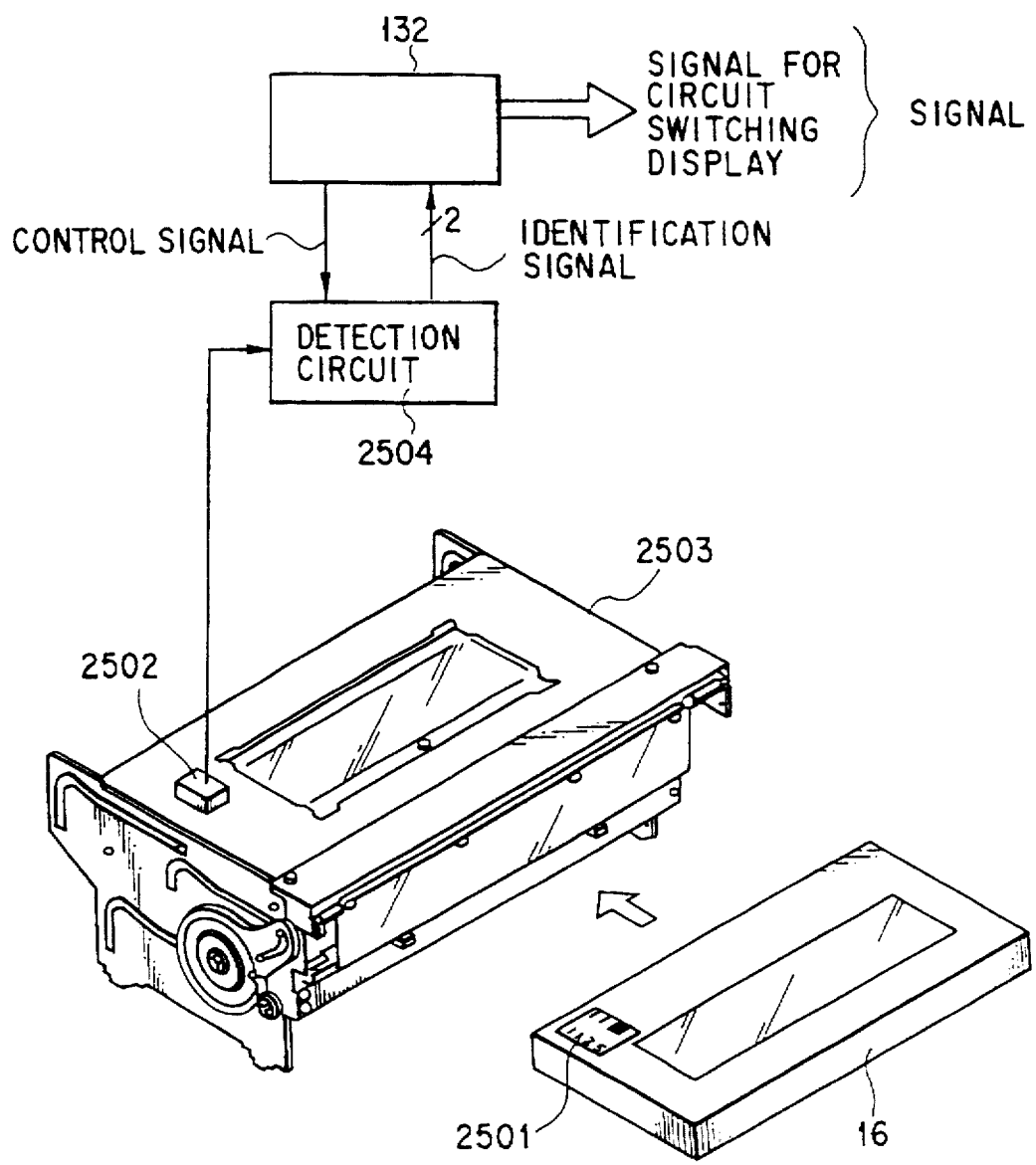
FIG. 25 is a block diagram showing scanning line identification using a bar-code label according to the embodiment in FIG. 24.
Figure 26:
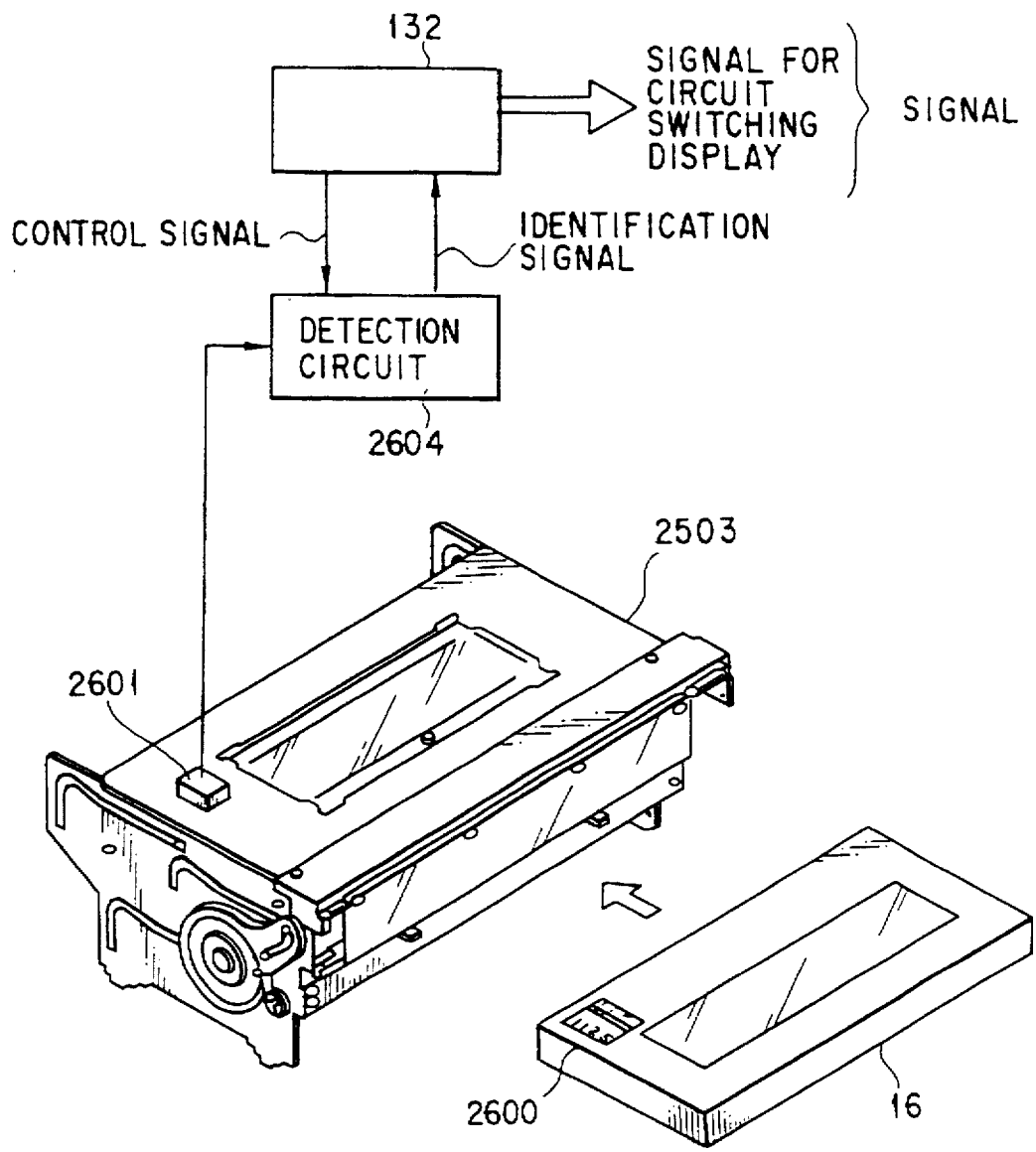
FIG. 26 is a block diagram showing scanning line identification using a magnetic card according to the embodiment in FIG. 24.

FIG. 24 is a block diagram showing a portion related to identification of scanning line schemes in FIG. 1. An embodiment of a method of identifying a scanning line scheme and an embodiment of a method of displaying the scanning line scheme will be sequentially described below. An embodiment of a method of identifying a scanning line scheme using a bar-code label is described first. FIG. 25 is a view showing an embodiment wherein, when a cassette 16 to which a bar-code label 2501 adheres is inserted into a cassette insertion port 155 in FIG. 1, scanning line identification information obtained by printing and describing a scanning line scheme on a bar-code label 2501 in advance is read by a laser detector 2502 arranged on a bucket 2503. Referring to FIG. 25, when the cassette is inserted, a detection circuit 2504 is activated to read bar-code information by a control signal from the control circuit 132 only when the cassette 16 is inserted. The identification information detected by the detection circuit 2504 is supplied to the control circuit 132, and becomes a circuit switching signal corresponding to the circuit operation of each scanning line scheme of a recording signal processing circuit 2400, a reproducing signal processing circuit 2401, the timing pulse generation circuit 126, and a scanning line display circuit 2405. Since this identification information is stored until the cassette is ejected or the cassette is replaced with another, each scanning line scheme is confirmed by a display function (to be described later) at any time. As the identification information, a simple 2-bit bar-code may be used because only three types of scanning line schemes, i.e., the Japanese 1125/60 scheme, the U.S. 1050/59.94 scheme, and the European 1250/50 scheme need be identified. In addition, since the bar-code of the bar-code label 2501 is hard to be read by the human eye, character information which can be immediately understood by man is printed on the bar-code label 2501, and positions at which the bar-code label 2501 and the laser detector 2502 on the cassette 16 are arranged are not restricted as a matter of course. In this manner, as an embodiment of another means for identifying a scanning line scheme when a cassette is inserted, a method using a magnetic card 2600 in place of the bar-code label 2501 is shown in FIG. 26, and a method using an optical card 2700 is shown in FIG. 27. In the two cases, since identification information is stored by different means, only the detector and detection circuit as hardware circuits are different from those of the embodiment using the bar-code label 2501 in FIG. 25. For this reason, a detailed description of the two cases will be omitted.

Figure 28:
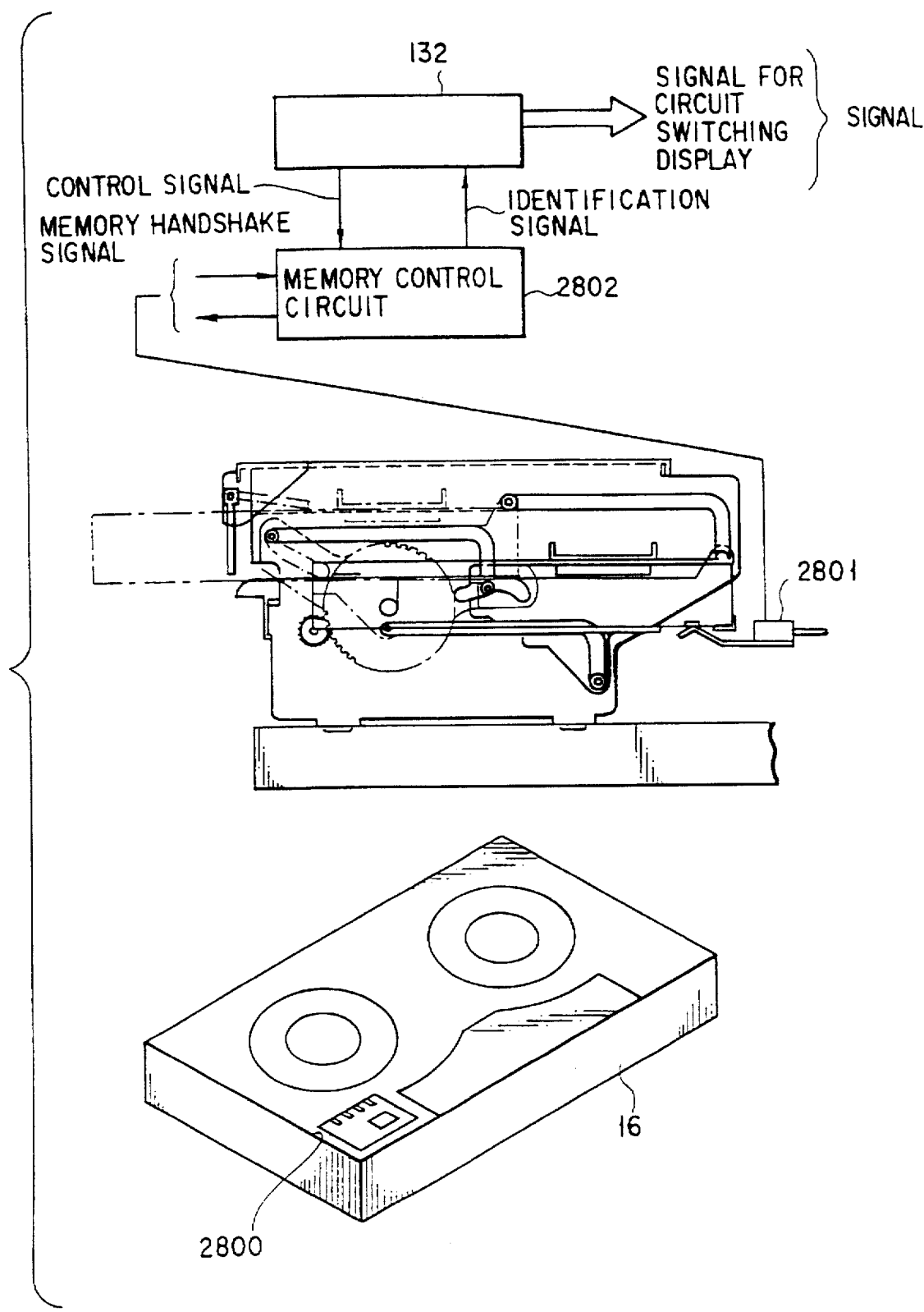
FIG. 28 is a block diagram showing scanning line identification using a memory card according to the embodiment in FIG. 24.

In each of the embodiments described above, identification is performed when a cassette is inserted. However, a method of an embodiment (to be described next) is a method of identifying a scanning line scheme after a cassette is set. FIG. 28 shows an embodiment using a memory card 600 as a storage means of identification information. When insertion of the cassette 16 is completed, and the cassette 16 is set in a cassette frame, the tangent portion of the memory card 2800 arranged on the bottom surface of the cassette 16 is brought into contact with a memory card contact 2801 arranged on the cassette frame, and a memory control circuit 2802 is started by a control signal from the control circuit 132, so that scanning line identification information is received by a control circuit 132 by a memory handshake signal. As a memory chip mounted in the memory card, a PROM, an EEPROM, or a CMOS ROM having a backup function may be used. Since processes performed after scanning line identification information is received by the control circuit 132 are the same as those of the above description, a description thereof will be omitted.

Figure 29:
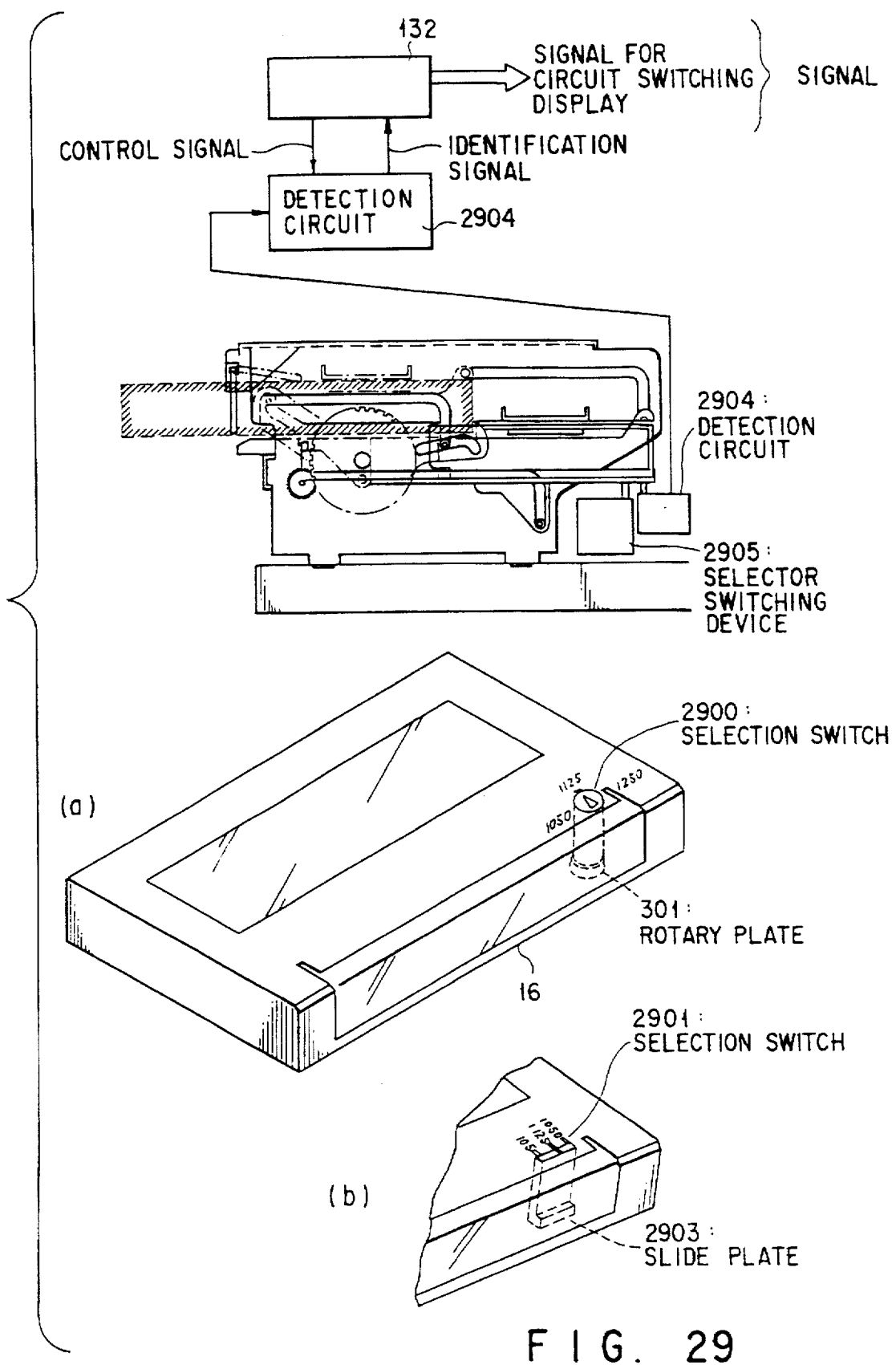
FIG. 29 shows block diagrams of scanning line identification using a selection switch according to the embodiment in FIG. 24.
Figure 30:
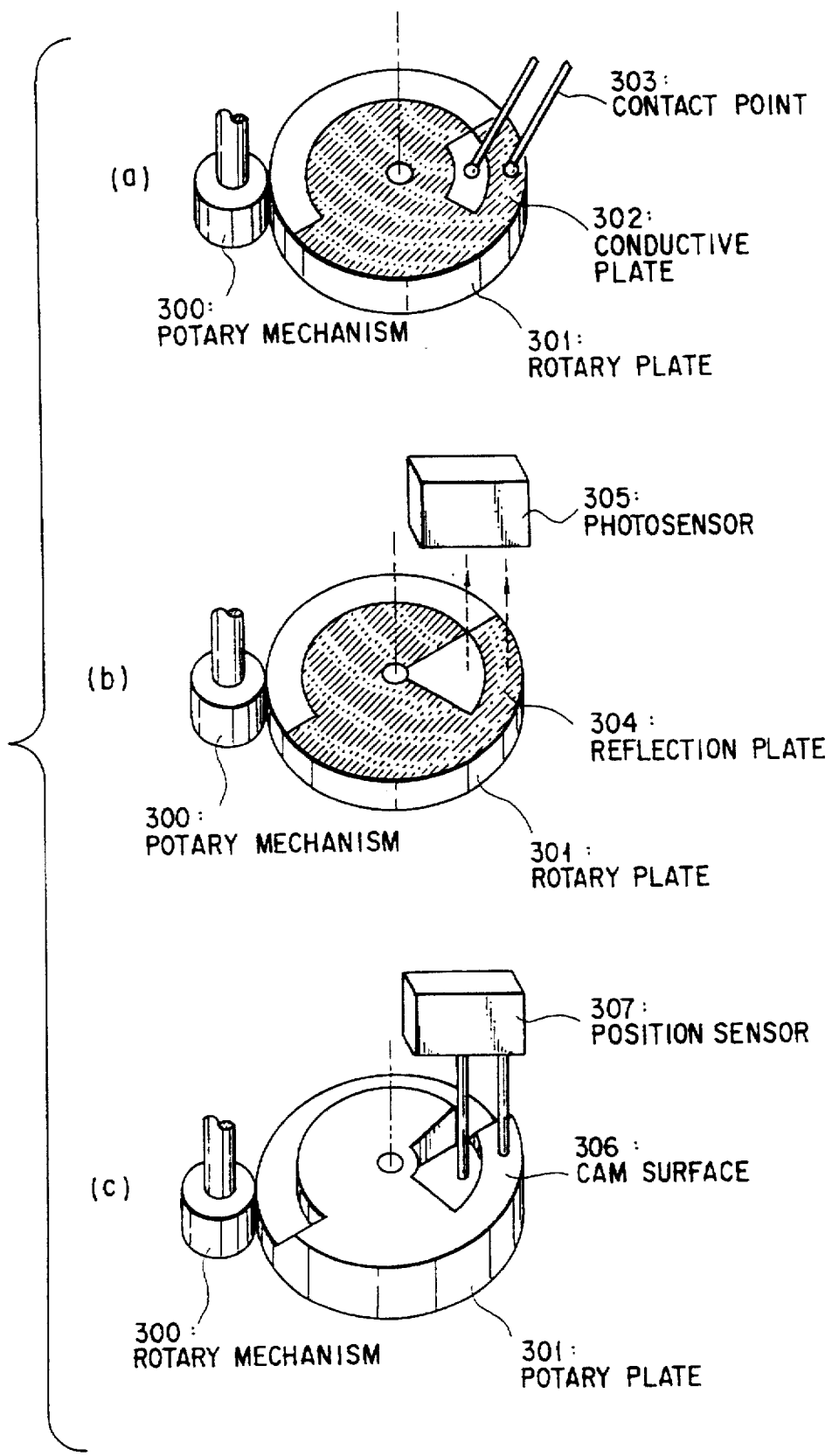
FIG. 30 shows views of the structures of selection switches according to the embodiment in FIG. 24.

An identification method (to be described below) different from the above electrical identification method is an embodiment using a mechanical identification means as another means for identifying a scanning line scheme after a cassette is set. FIG. 29 is a view showing an embodiment wherein a scanning line scheme is identified by a rotary selection switch 2900 arranged on the cassette 16 or a slide type selection switch 2901 constituted by a slide plate 2903. Although a switch position is identified by a detection device 2904, as shown in FIG. 30, a means which uses a method using a conductive plate 302 shown in (a) in FIG. 30 by the rotary structure of the bottom surface portion of the rotation-type selection switch 2900 to detect whether a contact point 303 of a pickup is in contact with a conductive portion (hatched portion) of the conductive plate 302, a means for performing detection using a reflecting plate 304 and a photosensor 305 which are shown in (b) in FIG. 30, and a means for detecting the depth of a groove by a position sensor 307 using a cam 306 shown in (c) in FIG. 30 to identify a scanning line scheme are used. In each of the above three methods, identification information is extracted by a mechanical detection means and converted into an electrical signal, and scanning line identification information is received by the control circuit 132 through the detection device 2904. Since processes performed after the identification information is received are the same as those of the above description, a description thereof will be omitted. Since the slide type selection switch 2901 is obtained by only replacing a rotary plate 301 shown in FIG. 30 with a slide plate, a description thereof will be omitted. Note that the selection switches 2900 and 2901 can also be switched in accordance with an externally supplied control signal.

In each of the embodiments described above, a method of permanently identifying one of three types of scanning line schemes has been described. However, there is the second method which does not permanently identify one of three types of scanning line schemes. This method can be achieved by switching the scanning line scheme of a recording/reproducing operation at an arbitrary position of a cassette tape or by adding the fourth free scanning line scheme information to scanning line identification information by a method of performing a recording/reproducing operation in an arbitrary scanning line scheme. Designation of a scanning line scheme performed when the free scanning line scheme is selected is switchably changed to a circuit operation corresponding to the scanning line scheme of a recording/reproducing operation by a switch on the operator control panel 131 in FIG. 1 or a switch (not shown) arranged in the cassette VTR. In addition, when setting of the cassette is completed, before a recording/reproducing operation is started, a scanning line scheme can be switchably changed to another corresponding to the received scanning line identification information as a matter of course.

Figure 32:
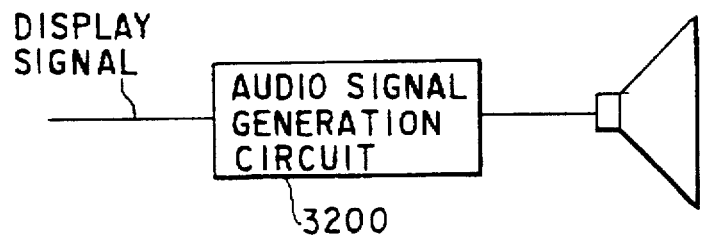
FIG. 32 is a block diagram showing audio display according to the embodiment in FIG. 24.

An embodiment of a function of displaying a specific scanning line scheme in which a cassette set in a VTR perform s a recording/reproducing operation will be described below. A first means serving as a scanning line display device 2405 for causing an operator to recognize scanning line scheme information stored in a scanning line storage circuit 2404 in FIG. 24 displays the scanning line scheme information on a display, an indicator, or a Pix Monitor 151 on an operator control panel 131 (in FIG. 1) as character information or lamp ON information which can be immediately recognized with the human eye. An embodiment shown in FIG. 31 as the second means is an embodiment wherein a liquid crystal display (LCD display) 3100 is arranged on a cassette case 16 to arrange a display means on the cassette itself, thereby performing a display operation. As a power supply for a drive circuit 3102 of the liquid crystal display 3100, a very small battery or a solar battery may be used. In addition, the embodiment shown in FIG. 32 is an embodiment wherein an audio signal output from a loudspeaker 3201 by an audio signal generation circuit 3200 as the third means causes an operator to recognize a scanning line scheme. For example, when as a generated audio language, Japanese, American, and German or French are used in the Japanese 1125/60 scheme, the U.S. 1050/59.94 scheme, and the Europe 1250/50 scheme, respectively, a scanning line scheme can be clearly discriminated from the remaining scanning line schemes. Note that an audio switching operation between the audio languages may be automatically performed between the schemes, or the audio language may be designated by a user. In any scheme, designation can be performed such that an audio signal is output in a language which is designated in advance, or a translated sentence can be displayed on a screen as a superimposition without converting the language.

Although the embodiments described above are related to display of a scanning line scheme, an embodiment (to be described next) is related to a function of rewriting scanning line identification information attached to a cassette case. When a scanning line scheme is switchably selected by the above second method using a switch on the operator control panel 131 in FIG. 1 or a switch arranged in a cassette VTR, and the cassette is ejected, scanning line identification information is rewritten in the magnetic card in FIG. 26, the optical card in FIG. 27, and the memory card in FIG. 28, when the cassette is ejected. When the selection switch shown in FIG. 29 is used, a scanning line identification information position is changed by the rotary mechanism shown in FIG. 30. The liquid crystal display (LCD display) in FIG. 31 is also rewritten as a matter of course. However, since the scanning line identification information of the bar-code label in FIG. 25 cannot be automatically rewritten, a message for replacing the bar-code label with a new one is displayed on the display on the control panel 131 or the Pix Monitor 151 shown in FIG. 1, the scanning line identification information is manually rewritten. In addition, since a magnetic card, an optical card, or memory card has a large memory capacity, not only scanning line identification information but also ancillary information such as a recording date or a title can be stored in the magnetic card, optical card, or memory card.

An embodiment wherein identification information is recorded on a tape and read during a tape reproducing operation at variable speeds will be described below.

As one method, the following method can be considered. That is, a scheme identification code is recorded in a sub-code area of a helical track as in a VTR, and the code is read during a reproducing operation to determine a recording mode. However, although the recording mode can be correctly determined at a normal reproducing speed, the identification code recorded on the helical track cannot be necessarily and correctly read during a slow reproducing operation or a high-speed reproducing operation (shuttle reproducing operation) which is an indispensable mode in a VTR because the recording heads diagonally cross the recording tracks.

Information for determining a recorded signal is important information having the highest rank in the operation modes of the VTR, and the recorded signal must be always correctly determined because of the following reason. If the determination is erroneously performed, not only quality of reproduced video data is degraded, but also the video data fails to be strongly damaged. Depending on a case, a mechanism/control system fails to damage the VTR main body and the cassette tape, and expensive HDTV software may be broken.

This embodiment has an object to stably, correctly determine a recording mode in the above special reproducing operations and to provide stable reproduced video data in any operation mode.

Figure 33:
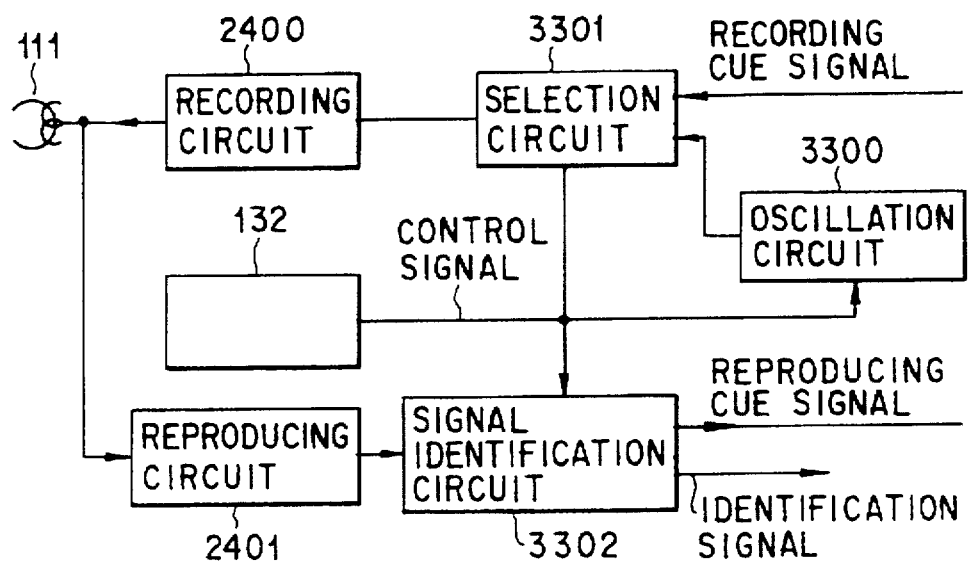
FIG. 33 is a block diagram showing scanning line identification using a cue track according to the fifth embodiment of the present invention.

The first embodiment is an embodiment for recording/reproducing scanning line identification information on a cue track of longitudinal tracks on a magnetic tape shown in FIG. 2. In an industrial VTR, the test signals for video data and audio data and a title are necessarily recorded at the start position of a tape. An identification signal is recorded on a cue track of this position, and a recording/reproducing operation is performed. FIG. 33 is a view showing this embodiment. In a recording operation, as shown in FIG. 34, three types of signals respectively having frequencies of, e.g., 1 kHz ((a) in FIG. 34), 5 kHz ((b) in FIG. 34), and 10 kHz ((c) in FIG. 34) are output from an oscillation circuit 3300. One of these signals is selected by a selection circuit 3301 using a control signal output from a control circuit 32 only when a recording operation of the start position of the tape is performed, and scanning line identification information is recorded on the cue track. In a reproducing operation, on the basis of the scanning line identification information recorded on the cue track, a scanning line identification signal is obtained by a signal identification circuit 1202 using a control signal output from the control circuit 32 only when data recorded at the start position of the tape is reproduced. In this embodiment, although sine waves respectively having frequencies of 1 kHz, 5 kHz, and 10 kHz are used as the scanning line identification information, any combination of waves having waveforms which can be discriminated from each other may be used.

In this manner, according to the present invention, scanning line identification information recorded on a cassette case or scanning line identification information on a cue track is read so that a circuit operation corresponding to the read scanning line identification information can be automatically performed.

In the next embodiment, an identification signal is recorded on a control track in FIG. 2.

More specifically, an identification signal representing the type of the input video signal is superposed on a control track signal having the frame frequency of a video signal or a frequency as an integer multiple of the frame frequency and recorded on a longitudinal track in a tape running direction.

At this time, the frame frequency signal and the identification signal representing the type of the input video signal are alternately multiplexed. The ratio of a frame frequency to the identification signal frequency is represented by an integer. In addition, the frequency of the identification signal to be multiplexed is set to be the greatest common measure 1/N (N: integer) of different frame frequencies corresponding to different video signals.

As another method, the number of pulses of an identification signal to be multiplexed is changed in accordance with different video signals, and the identification signal is recorded.

In this embodiment, in order to identify three types of video signals respectively having frame frequencies of 30 Hz, 25 Hz, and 59.94/2 Hz, identification signals having different frequencies in correspondence with the video signals are intermittently multiplexed with a control track signal which is conventionally recorded in a longitudinal tape direction. FIG. 35 is a block diagram showing a TC/CTL/CUE recording/reproducing circuit 153 according to this embodiment. The oscillation frequency of an oscillation circuit 1 (15301) is 600 Hz, and an output a1 from the oscillation circuit 1 is input to a frequency division circuit 1 (15302) and a frequency division circuit 2 (15304). The frequency division circuit 1 outputs a 120-Hz pulse signal b1 obtained by frequency-dividing the oscillation circuit output a1 by 5, a 60-Hz pulse signal b2 obtained by frequency-diving the signal b1 by 2, and a pulse signal b3 obtained by frequency-dividing the signal b2 by 2. The 120-Hz pulse signal b1 and the 60-Hz pulse signal are switched by the first 30-Hz frame pulse signal b3 in a switching circuit 1 (15303) to generate a control signal c1 corresponding to the first video signal. The frequency division circuit 2 (15304) outputs a 200-Hz pulse signal b4 obtained by frequency-dividing the oscillation circuit output a1 by 3, a 50-Hz pulse signal b5 obtained by frequency-dividing the pulse signal b4 by 4, and a 25-Hz pulse signal b6 obtained by frequency-diving the pulse signal b5 by 4. A switching circuit 2 (15305) switches the 200-Hz pulse signal b4 and the 50-Hz pulse signal b5 by the second frame pulse signal b6 to output a control signal c2 corresponding to the second video signal. The oscillation frequency of an oscillation circuit 2 (15306) is 6~59.95 Hz, and an output signal a2 from the oscillation circuit 2 is input to a frequency division circuit 3 (15307). The frequency division circuit 3 (15307) outputs a pulse signal b7 having a frequency of about 180 Hz obtained by frequency-dividing the oscillation circuit output a2 by 2, a 59.95-Hz pulse signal b8 obtained by frequency-dividing the pulse signal b7 by 3, and a pulse signal b9 obtained by frequency-dividing the pulse signal b8 by 2. The pulse signal b7 having a frequency of about 180 Hz and the 59.94-Hz pulse signal are switched by the third 59.94/2-Hz frame pulse signal b9 in a switching circuit 3 (15308) to generate a control signal c3 corresponding to the third video signal. A selection circuit (15309) selects one of the three types of control signals c1, c2, and c3 corresponding to the three types of video signals in response to a recording mode selection signal k, supplies the selected one to a recording head (111) through a recording circuit (15310), and records the signal on a longitudinal track on a magnetic tape. FIG. 36 shows the waveform of a signal of a recording system according to the first embodiment of the present invention. The waveform of a signal e read from the magnetic tape by a reproducing head (11) is shaped by a reproducing circuit (15314) and converted into a pulse signal f. In a frequency discrimination circuit (15313), a plurality of frequency component pulse signals g1 and g2 included in a reproduced control signal are discriminated and output, and a frame pulse signal g3 is generated and output. The frequencies of the signals g1 and g2 frequency-discriminated at a normal tape speed are 120 Hz and 60 Hz, respectively with respect to the first video signal, 200 Hz and 50 Hz, respectively, with respect to the second video signal, and about 180 Hz (3 times 59.94 Hz) and 59.94 Hz, respectively, with respect to the third video signal. In a comparison circuit (15312), the ratio of the frequency of the signal g1 to the frequency of the signal g2 is calculated. More specifically, in a normal-speed reproducing mode, 120/60=2 is obtained with respect to the first video signal, 200/50=4 is obtained with respect to the second video signal, and 59.94×3/59.94=3 is obtained with respect to the third video signal. These ratios of frequencies are constant even in a special reproducing mode. For example, in a double-speed reproducing mode, since a tape speed is twice the normal speed, the frequency of a signal included in a control signal recorded on a longitudinal track uniformly becomes twice. The frequencies of the signals g1 and g2 frequency-discriminated with respect to the first video signal become 240 Hz and 120 Hz, respectively. Therefore, an output h from the comparison circuit (15312) becomes 240/120=2, and this value coincides with the value obtained at a normal tape speed. Similarly, with respect to each of the second and third video signals, even when a tape speed in a reproducing operation changes, the output h from the comparison circuit (15312) coincides with the value obtained at a normal tape speed. The output from the comparison circuit (15312) is input to an identification circuit (15311), so that a recorded video signal standard can be determined by checking whether the input signal is 2, 3, or 4. A discrimination signal i from the identification circuit (15311) is transferred to a system control circuit (not shown) as a recording mode signal of the system, and a mechanism/control system and a signal processing circuit are set in an operation mode matched with a predetermined video signal.

FIG. 37 shows the second embodiment of a TC/CTL/CUE recording/reproducing circuit according to the present invention. In this embodiment, with respect to two types of video signals, an identification pulse having a frequency which is the greatest common measure of the frame frequencies of the video signals is superposed on a frame pulse and recorded on a control track, and a recorded video signal is determined in a reproducing operation on the basis of the superposed identification pulse and a frame pulse. FIG. 38 shows the waveforms of the main pulses in FIG. 37. This embodiment will be described below with reference to FIGS. 37 and 38. An output signal j from an oscillation circuit (15318) is frequency-divided by a frequency division circuit (15319) into a signal k1 having a frame frequency of 30 Hz of the first video signal, a signal k2 having a frame frequency of 25 Hz of the second video signal, and a signal k3 having a frequency of 5 Hz for generating a mode identification signal having a frequency which is the greatest common measure of these frame frequencies. One of the two frame signals k1 and k2 is selected by a mode selection signal k in a selection circuit (15321) as the frame signal of a recorded video signal. On the other hand, the signal k3 is converted by a pulse generation circuit (15320) into a mode identification pulse signal shown in (k4) in FIG. 38. The selected frame signal 1 and the mode identification pulse k4 are added to each other by an adding circuit (15322) to generate a control signal m. The control signal m is recorded on a longitudinal control track on a magnetic tape through a recording circuit (5323) and a magnetic head 11. (e) in FIG. 38 shows a control signal corresponding to two video signals. Due to the relative phase relationship between a frame frequency and a mode identification pulse, a video mode can be identified even when a tape speed changes. A reproduced signal read from the magnetic head 11 is subjected to waveshaping and identification by a reproducing circuit (15326) and converted into a control pulse signal o. The control pulse signal o is input to a counting circuit (15327) and a pulse detection circuit (5327), the leading edge of the control pulse signal o is counted, and the mode identification pulse signal k4 in FIG. 38 is extracted, thereby resetting the counting circuit (15327). A count value q obtained at a normal reproducing speed becomes 5 and 6 with respect to the two video signals, and the video signals are identified by an identification circuit (15323). In a special reproducing operation, the count value of the counting circuit also becomes 5 and 6 with respect to the video signals, and the video signals can be identified.

FIG. 39 shows the third embodiment of a TC/CTL/CUE recording/reproducing circuit 153 according to the present invention. In this embodiment, the following method is employed. That is, pulse strings having the different numbers of pulses are superposed on frame signals having different frequencies, respectively, and the mode of a video signal is identified on the basis of the number of pulses. FIG. 40 shows main pulse strings in FIG. 39. This embodiment will be described below with reference to FIGS. 39 and 40. An output signal j from an oscillation circuit (15330) is input to a frequency division circuit (15331) to generate a first video frame signal k1 having a frequency of 30 Hz, a second video frame signal k2 having a frequency of 25 Hz, and a multiplexed pulse signal k5 having a frequency of 60 Hz. One of the two frame signals k1 and k2 is selected by a mode selection signal k in a selection circuit (15332) as a frame signal 1 of a recorded video signal.

The frame signal 1 is caused by a gate generation circuit (15333) to generate a gate pulse shown in (s) in FIG. 40 and corresponding to the first and second frame signals selected by the mode selection signal k, using the trailing edge of the frame signal as a reference. The pulse width of a gate pulse s corresponds to the two pulses and four pulses of the multiplexed pulse k5 with respect second frame and second frame signals. The multiplexed pulse k5 is intermittently selected by the gate pulse S in the gate circuit (15334) to generate a mode identification pulse string t. In addition, the frame signal 1 and the mode identification pulse string t are multiplexed with each other by an adding circuit (15335) to a t control signal u. The t control signal u is recorded on a tape longitudinal control track through a recording circuit (15336) and a magnetic head 11. As is apparent from the control signal waveform in (u) in FIG. 40, when the pulses of the mode identification pulse string multiplexed with the frame signal are counted, a reproduced video signal can be specified by the count value regardless of a tape speed. A reproduced signal v read from the magnetic head 11 is subjected to waveshaping and identification by a reproducing circuit (15337) to reproduce a control pulse w. As in a recording system, a gate pulse x used for extracting a multiplexed pulse from the control pulse w is generated by a gate generation circuit (15338), and a multiplexed pulse y is extracted from the control pulse w by a gate circuit (15339). Multiplexed pulses are counted by a counting circuit. If a count value z is 2, the first video signal is determined by an identification circuit 15341; if the count value z is 4, the second video signal is determined. In addition, an identification signal is transferred to a system control circuit (not shown).

In this manner, according to the present invention, as a recording mode identification scheme for different video signal schemes, a recording mode identification signal is recorded on a longitudinal track in a tape running direction. For this reason, in special reproducing operation mode such as a slow reproducing operation or a high-speed reproducing operation performed, erroneous determination due to omissions of signals caused by recording data on helical tracks is not performed, and an unstable operation is not performed. In addition, since a control signal obtained by superposing a frame signal on an identification signal having a relatively simple frequency or a phase relationship with the frame signal is recorded, not only the recording mode identification scheme can be realized by a simple circuit arrangement, but also an identification signal can be easily determined. For this reason, even if a recording/reproducing state is degraded by damaging or wearing a tape, a recording mode can be stably determined. Therefore, a serious accident such as damage to the VTR main body or destruction of software caused by an erroneous recording mode determination operation can be prevented, and stable recording/reproducing operations of video and audio signals can be realized. In addition, since a scheme for performing a recording operation on a control track on the basis of a frame signal is used, continuity between a VTR using this scheme and a conventional VTR is ensured, and the VTR using the scheme can be properly matched with conventional VTR peripheral equipment such as an editing machine or a camera.

A method of identifying a recording mode by properly processing an information signal in a video signal track or an AUDIO signal track will be described below. More specifically, according to this embodiment, signals based on different standards are recorded on a recording medium such that the recording rates of the signals are set to be equal to each other, and segment signals constituted by sync blocks to which sync signals for obtaining timing synchronization in a signal reproducing operation are added are used. The plurality of sync signals are present in a predetermined period immediately before the start sync block of each segment signal, and the number of sync signals present in the predetermined period immediately before each start sync block is changed in accordance with different standards.

As another embodiment, the phase of a sync signal present in the predetermined period immediately before the start sync block of each of the above segment signals is changed in accordance with different standards within the predetermined period.

As another method, the following method is used. That is, a pattern having a predetermined frequency in a reproducing operation is present in a predetermined period immediately before the start sync block of each segment signal, and the frequency of the pattern is changed in accordance with different standards. As another embodiment, the following embodiment will be described. That is, signals based on different standards are recorded on a medium at recording rates respectively inherent in the standards, and segment signals constituted by a plurality of sync blocks to which sync signals for obtaining timing synchronization in a signal reproducing operation are added are used. A pattern which has a predetermined frequency in the reproducing operation is formed in a predetermined period immediately before the start sync block of each segment signal, and different standards are identified by a frequency component obtained by reproducing the pattern portion.

At this time, the pattern which has a predetermined frequency in a reproducing operation and is formed in the predetermined period immediately before the start sync block of each segment signal is a pattern for bit synchronization or part thereof.

The following method is also used. In a recording/reproducing apparatus which can cope with multi-standards, segment signals constituted by a plurality of sync blocks to which sync signals for obtaining timing synchronization in a signal reproducing operation are added are used, and the sync signal pattern is changed in accordance with the standards.

As still another embodiment, identification can be performed by changing a channel coding scheme in accordance with the standards.

When each of the identification methods is used, only when all the plurality of changes or setting elements of the recording/reproducing apparatus which are required for causing the recording/reproducing to cope with standards are performed in accurate states with respect to the standards, it is determined that the recording/reproducing is set to cope with the standards.

The plurality of changes or setting elements are characterized by including at least information representing the state of a switch for changing a signal processing circuit, the type of a reference signal required for recording/reproducing a signal, and physical deformation added to a recording medium itself or the case of the recording medium or recorded standards given by an information recording medium added to the recording medium.

In the plurality of HDTV standards, the different numbers of active lines, different frame frequencies, different sampling rates, and the like are respectively set. For this reason, in order to prevent a recording/reproducing system from being complicated, a countermeasure for performing a recording/reproducing operation using the same recording rate and the same format by implementing a signal processing unit is considered. In such a case, when a signal is reproduced, data can be identified in any standard. The following embodiment is related to a scheme for reproducing signals of different standards recorded in the same format at the same recording rate to identify the standards.

Figure 41:
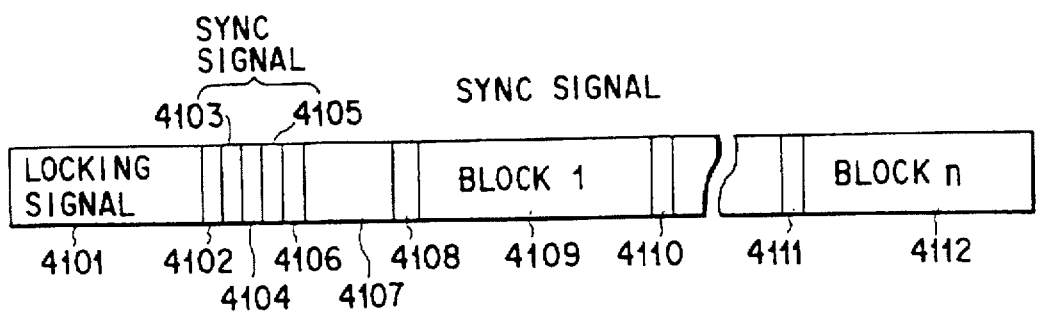
FIG. 41 is an arrangement of a first segment signal according to an embodiment of the present invention.

FIG. 41 shows the arrangement of a segment signal according to this embodiment. As shown in FIG. 41, in this segment signal, before a first block 4109 of a digital information signal, a portion is arranged in which 5 sync signals 4102 to 4106 (=M) are continuously concentrated and arranged not to continue a sync signal 4108 (n bits) added to the start portion of the first block 4109. Note that the sync signals 4102 to 4106 need not be necessarily continued, and the sync signals 4102 to 4106 may be arranged with intervals. Before the portion in which the sync signals 4102 to 4106 are concentrated and arranged, a locking signal 4101 for reproducing a bit clock is arranged. Although any signal except for a sync signal may be used as a signal 4107 arranged between the sync signal group and the first block 4109, the same signal as the locking signal 4101 for reproducing a bit clock is preferably used as the signal 4107 in consideration of synchronization of the bit clock.

Figure 42:
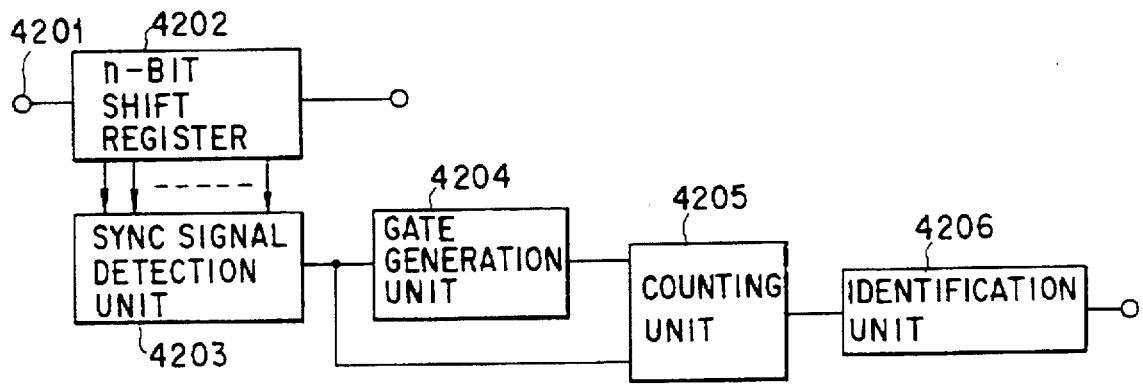
FIG. 42 is a block diagram showing a first standard identification circuit according to an embodiment of the present invention.

FIG. 42 is a block diagram showing the arrangement of a standard identification circuit according to this embodiment.

Although each element is operated with reference to a bit clock reproduced from, e.g., a reproduced signal, by a PLL circuit or the like, a bit clock reproducing system and a bit clock supply system are omitted in FIG. 42.

Referring to FIG. 42, the segment signal shown in FIG. 41 is input to an input terminal 4201. This segment signal is serially received by an n-bit shift register 4203. The n bits of an output from the n-bit shift register 4202 are compared with corresponding bits of an n-bit sync signal pattern prestored in a sync signal detection unit 4203. When all the n bits coincide with the corresponding bits, a sync signal detection pulse is output. The sync signal detection pulse is supplied to a gate generation unit 4204 and a counting unit 4205.

When the gate generator 4204 receives the sync signal detection pulse, the gate generator 4204 generates a gate pulse having a predetermined width to supply it to the counting unit 4205. The counting unit 4205 counts sync signal detection pulses input while the gate pulse is supplied, thereby outputting a count value. An identification unit 4206 outputs an identification pulse when the count value satisfies a condition with respect to a set value N. This set value N is set to be different values in accordance with the standards. For example, when three types of standards are used, three values N1, N2, and N3 are prepared for the standard 1, 2, and 3, respectively. The number M of sync signals in the concentrated and arranged sync signal group satisfies a condition N≦M with respect to the set value N, and is recorded to have different values corresponding to the standards. For example, when three types of standards are used, three values M1, M2, and M3 are prepared for the standards 1, 2, and 3, respectively. For example, assuming that these values are set to satisfy a condition 2 s N1 s M1<N2 s M2<N3 s M3, if a count value C of the counting unit satisfies a condition N1 s C s M1, an identification pulse representing the standard 1 is output; if the count value C satisfies a condition N2 s C s M2, an identification pulse representing the standard 2 is output; and if the count value C satisfies a condition N3 s C s M3, an identification pulse representing the standard 3 is output. In this manner, the three types of standards can be identified. In this case, the set value N of the count value is set to be smaller than the number M of concentrated and arranged sync signals because all the concentrated and arranged sync signals are not always detected due to an error. The number M of the concentrated and arranged sync signals and the set value N of the count value are preferably selected from optimal values in accordance with systems.

Figure 43:
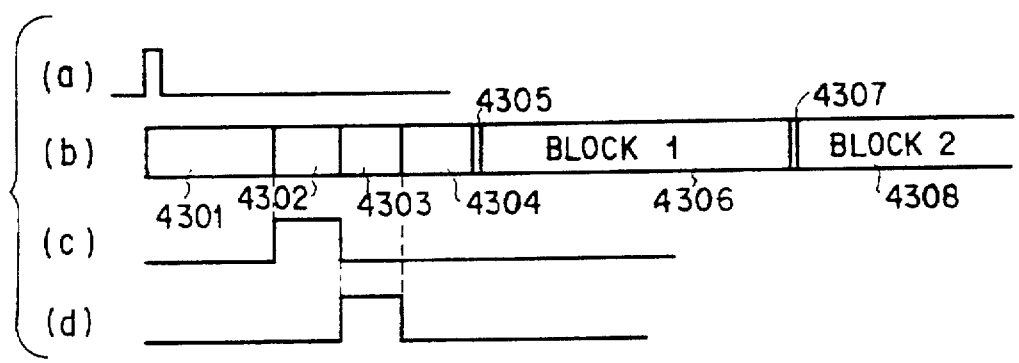
FIG. 43 shows arrangements of second segment signals according to an embodiment of the present invention.

FIG. 43 shows an embodiment of another segment signal. (a) in FIG. 43 shows a segment pulse representing a start portion of the segment signal, and (b) in FIG. 43 shows the start portion of the segment signal. Before a first block 4306 of a digital information signal, two areas 4302 and 4303 in which a sync signal group is arranged not to continue a sync signal 4305 (consisting of n bits) added to the start portion of the first block 4306 are continuously arranged. Note that the areas 4302 and 4303 need not be necessarily continued, and the areas 4302 and 4303 may be arranged with an interval. A locking signal 4301 for reproducing a bit clock is arranged before the areas 4302 and 4303. Although any signal except for a sync signal may be used as a signal 4304 arranged between the area in which the sync signal group is arranged and the first block 9, when synchronization of the bit clock is considered, the same signal as the locking signal 4301 for reproducing a bit clock is preferably used as the signal 4304. (c) and (d) in FIG. 43 show gate pulses for respectively detecting the two areas 4302 and 4303 in which the sync signal group is arranged, and the gate pulses are formed with reference of the segment pulse in (a) in FIG. 43.

Standards are identified in accordance with a specific area of the areas 4302 and 4303 in which the sync signal group is arranged. In this embodiment, since two areas are arranged in each of the areas 4302 and 4303, a maximum of four types of standards can be identified. The number of types of standards which can be identified can be increased/decreased in accordance with the number of areas arranged in the areas 4302 and 4303.

Figure 44:
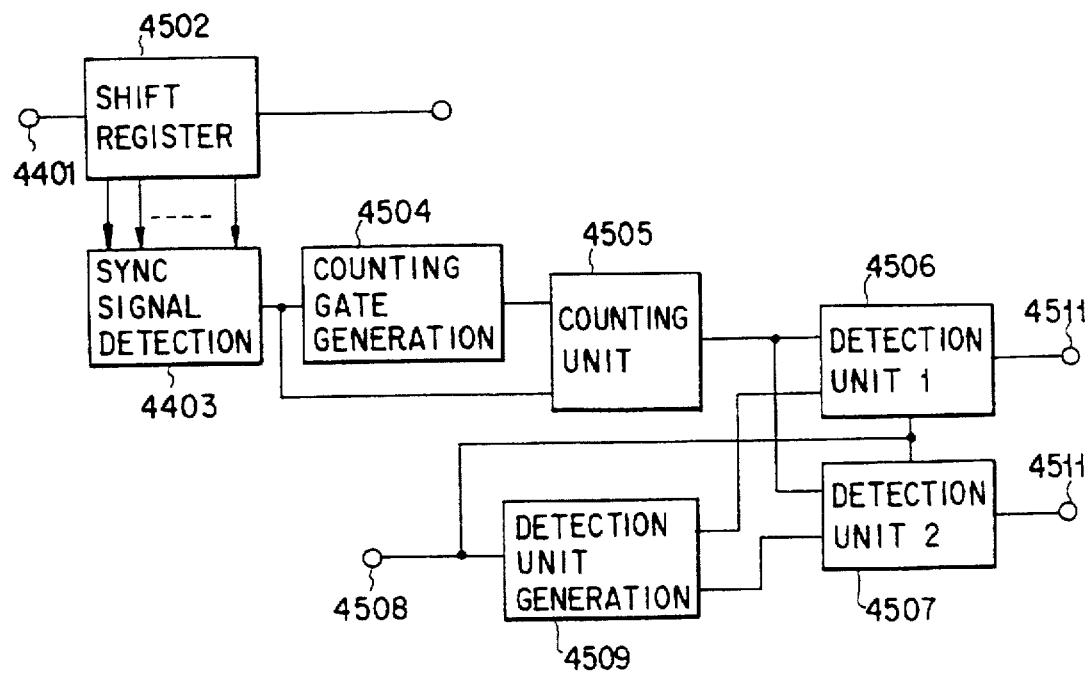
FIG. 44 is a block diagram showing a second standard identification circuit according to an embodiment of the present invention.

FIG. 44 is a block diagram showing the arrangement of the second standard identification circuit according to this embodiment. Although each element is operated with reference to a bit clock reproduced by, e.g., a reproduced signal PLL circuit, a bit clock reproducing system and a bit clock supply system are omitted in FIG. 44.

Referring to FIG. 44, the segment signal shown in FIG. 43 is input to an input terminal 4501. This segment signal is serially received by an n-bit shift register 4402. The n bits of an output from the n-bit shift register 4402 are compared with corresponding bits of an n-bit sync signal pattern prestored in a sync signal detection unit 4403. When all the n bits coincide with the corresponding bits, a sync signal detection pulse is output. The sync signal detection pulse is supplied to a gate generation unit 4404 and a counting unit 4405. When the gate generator 4404 receives the sync signal detection pulse, the gate generator 4404 generates a gate pulse having a predetermined width to supply it to the counting unit 4405. The counting unit 4405 counts sync signal detection pulses input while the gate pulse is supplied, and the counting unit 4405 outputs a detection pulse of the sync signal group when the count value satisfies a condition with respect to a set value N. Assuming that the number of sync signals included in the sync signal group is represented by M, when the value N is set to satisfy a condition N<M, e.g., when the count value satisfies a condition N s C s M, an identification pulse is output. In this case, the set value N of the count value is set to be smaller than the number M of sync signals included in the sync signal group because all the sync signals included in the sync signal group are not always detected due to an error. The number M of sync signals included in the sync signal group and the set value N of the count value are preferably selected from optimal values in accordance with systems. A detection pulse of the sync signal group is supplied to a detection unit 1 (4506) and a detection unit 2 (4407). Detection gates respectively representing the areas 4302 and 4033 for detecting the presence of the sync signal group are generated by a detection gate generation unit 4409 with reference to a segment pulse input from an input terminal 4408, and the detection gates are supplied to the detection unit 1 (4406) and the detection unit 2 (4407), respectively. Each of the detection unit 1 (4406) and the detection unit 2 (4407) checks whether the sync signal group is present in a corresponding one of the areas, and each of the detection unit 1 (4406) and the detection unit 2 (4407) outputs "1" representing that the sync signal group is present or "0" representing that the sync signal group is absent to a corresponding one of output terminals 4410 and 4411. A corresponding standard can be identified by decoding the 2-bit output.

In each of the above two embodiments, although a case wherein a sync signal is used as an identification signal has been described, an identification signal having a pattern different from a sync signal can be used without any problem when a detection unit capable of detecting an identification signal pattern is arranged in place of a sync signal detection unit in the above arrangement.

Figure 45:
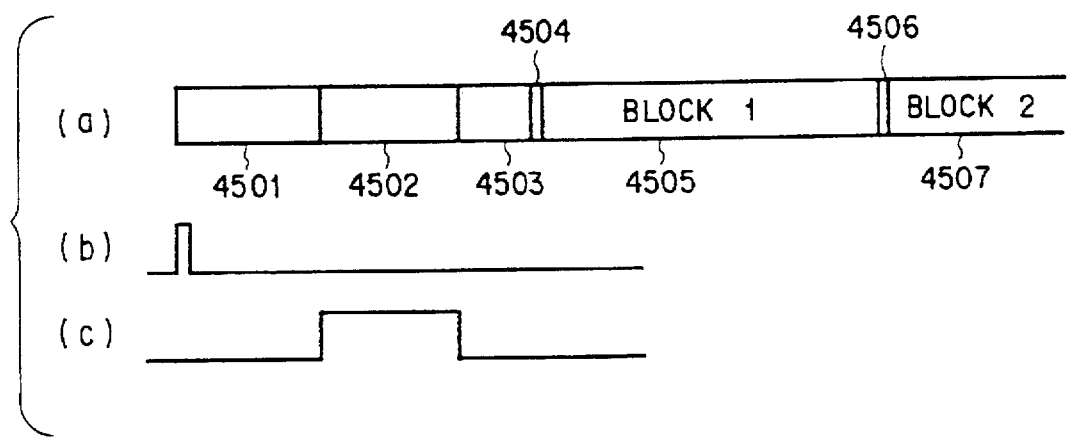
FIG. 45 shows arrangements of a third segment signal according to an embodiment of the present invention.

FIG. 45 shows an embodiment of another segment signal. (a) in FIG. 45 shows the start portion of the segment signal. Before a first block 4505 of a digital information signal, an area 4502 is formed in which a pattern having a predetermined frequency in a reproducing operation is to be recorded. A locking signal 4501 for reproducing a bit clock is arranged before the area 4502. A signal 4503 arranged between the area in which the pattern which has a predetermined frequency in a reproducing operation is recorded and the first block 4505 need not be necessarily arranged. Alternatively, when synchronization of the bit clock is considered, the same signal as the locking signal 4501 for reproducing a bit clock may be used as the signal 4503. (b) in FIG. 45 shows a segment pulse representing the start portion of the segment signal. (c) in FIG. 45 shows a gate pulse for detecting the area 4502 in which the pattern having a predetermined frequency in a reproducing operation is recorded, and the gate pulse is generated with reference of the segment pulse in (a) in FIG. 45. In the area 602 in which the pattern having a predetermined frequency in a reproducing operation is recorded, the frequency is changed in accordance with standards, thereby identifying the standards. For example, a repetition pattern "10" is set for a standard 1, a repetition pattern "1100" is set for a standard 2, and a repetition pattern "11110000" is set for a standard 3. In this case, when a frequency obtained when the repetition pattern "10" of the standard 1 is reproduced is represented by f, a frequency f/2 is obtained in the standard 2, and a frequency f/4 is obtained in the standard 3. Therefore, the standards can be identified in accordance with a reproduced frequency.

Figure 46:
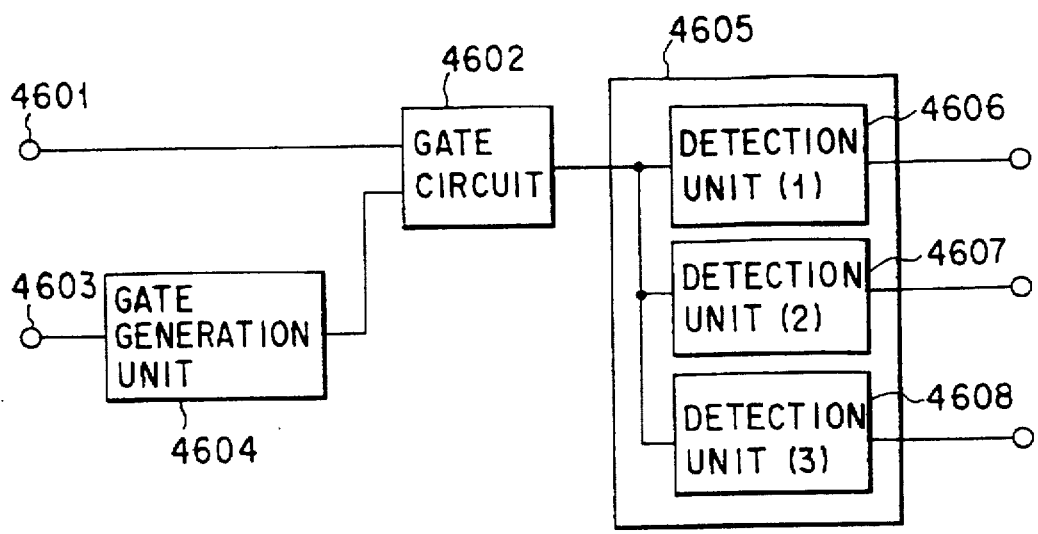
FIG. 46 is a block diagram showing a third standard identification circuit according to an embodiment of the present invention.

FIG. 46 is a block diagram showing the arrangement of the third standard identification circuit according to this embodiment. A reproduced signal of a segment having the arrangement shown in (a) in FIG. 45 is input to an input terminal 4601. This reproduced signal is supplied to a gate circuit 4602. Only identification pattern portion is extracted by the gate shown in (c) in FIG. 45 and generated by a gate generation unit 4604 with reference to a segment pulse input from an input terminal 4603, and the extracted identification pattern portion is supplied to an identification unit 4605. The identification 4605 is constituted by frequency detection units. In this case, in order to identify the above three types of standards, the identification unit 4605 is constituted by a detection unit (1) 4606 for detecting the frequency f, a detection unit (2) 4607 for detecting the frequency f/2, and a detection unit (3) 4608 for detecting the frequency f/4. When a detection unit which outputs a detection pulse is detected, the standards can be identified. Each detection unit may be constituted by, e.g., a band-pass filter and a level detection circuit.

Figure 47:
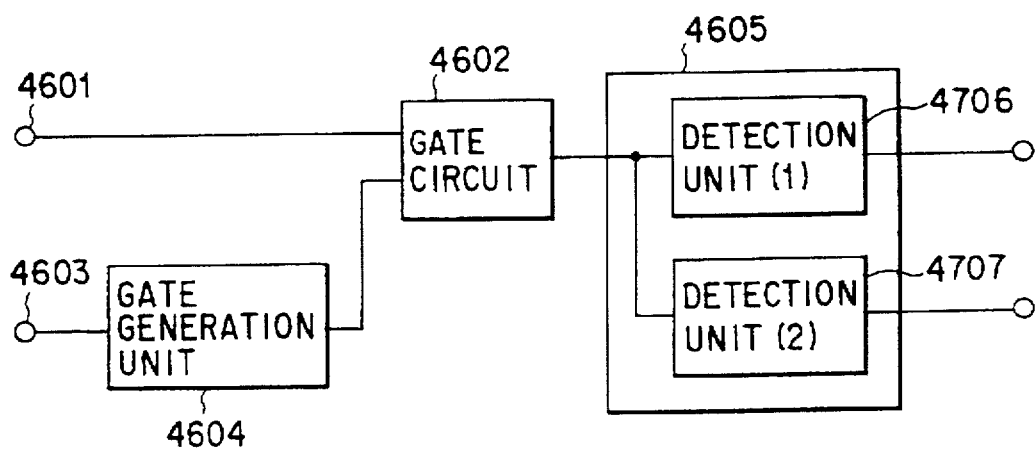
FIG. 47 is a block diagram showing a modification of the third standard identification circuit in FIG. 46.

A plurality of patterns which have different frequencies in a reproducing operation are prepared. Referring to (a) in FIG. 45, when combinations of patterns recorded in the area 4502 in which patterns are to be recorded correspond to the standards, the standards can be identified in accordance with a combination of frequencies detected in a reproducing operation. FIG. 47 is a block diagram showing the arrangement of an identification circuit used in this case. This identification circuit has the same basic arrangement as that in FIG. 46. FIG. 47 shows a case wherein two types of patterns, e.g., the above repetition patterns "10" and "1100", are prepared. When a frequency obtained when the repetition pattern "10" is reproduced is represented by f, the identification unit 4605 is constituted by a detection unit (1) 4706 for detecting the frequency f and a detection unit (2) 4707 for detecting a frequency f/2. For example, in the area 4502 (in (a) in FIG. 45) in which patterns are to be recorded, only the repetition pattern "10" is recorded for the standard 1, only the repetition pattern "11100" is recorded for the standard 2, and both the repetition patterns "10" and "1100" are recorded for the standard 3. In this manner, when it is checked whether a detection pulse or detection pulses are output from only the detection unit (1) 4706 for detecting the frequency f, only the detection unit (2) 4707 for detecting the frequency f/2, or both the detection unit (1) 4706 and the detection unit (2) 4707, the three types of standards can be identified. That is, when a combination of the presence/absence of detection pulses from the frequency detection units is decoded, the standards can be identified.

When a recording rate changes in accordance with standards, even when the same pattern is used, different frequencies are obtained in a reproducing operation. For this reason, different patterns need not be prepared for the standards, respectively. When a detection unit for detecting frequencies corresponding to the standards and exhibited by, e.g., a repetition pattern "10", in a representing operation due to the differences between the recording rates is arranged, the standards can be identified. Since a pattern which has a single frequency in a reproducing operation is generally used as a bit synchronization pattern, a bit synchronization pattern portion or part thereof can also be used as a pattern for identifying the standards.

According to the present invention, when a tape is reproduced, a recorded standard is automatically identified. For this reason, a change in standard of a DVTR can be automatically performed. Since identification is always performed at the start portion of a segment, even when a reproducing operation is started from the midway of the tape, and a standard of recorded data changes in the midway of the tape, the standard can be automatically identified. In addition, since a sync signal or a pattern having a single frequency is used as an identification signal, a signal arrangement and the arrangement of an identification circuit are not complicated.

Figure 48:
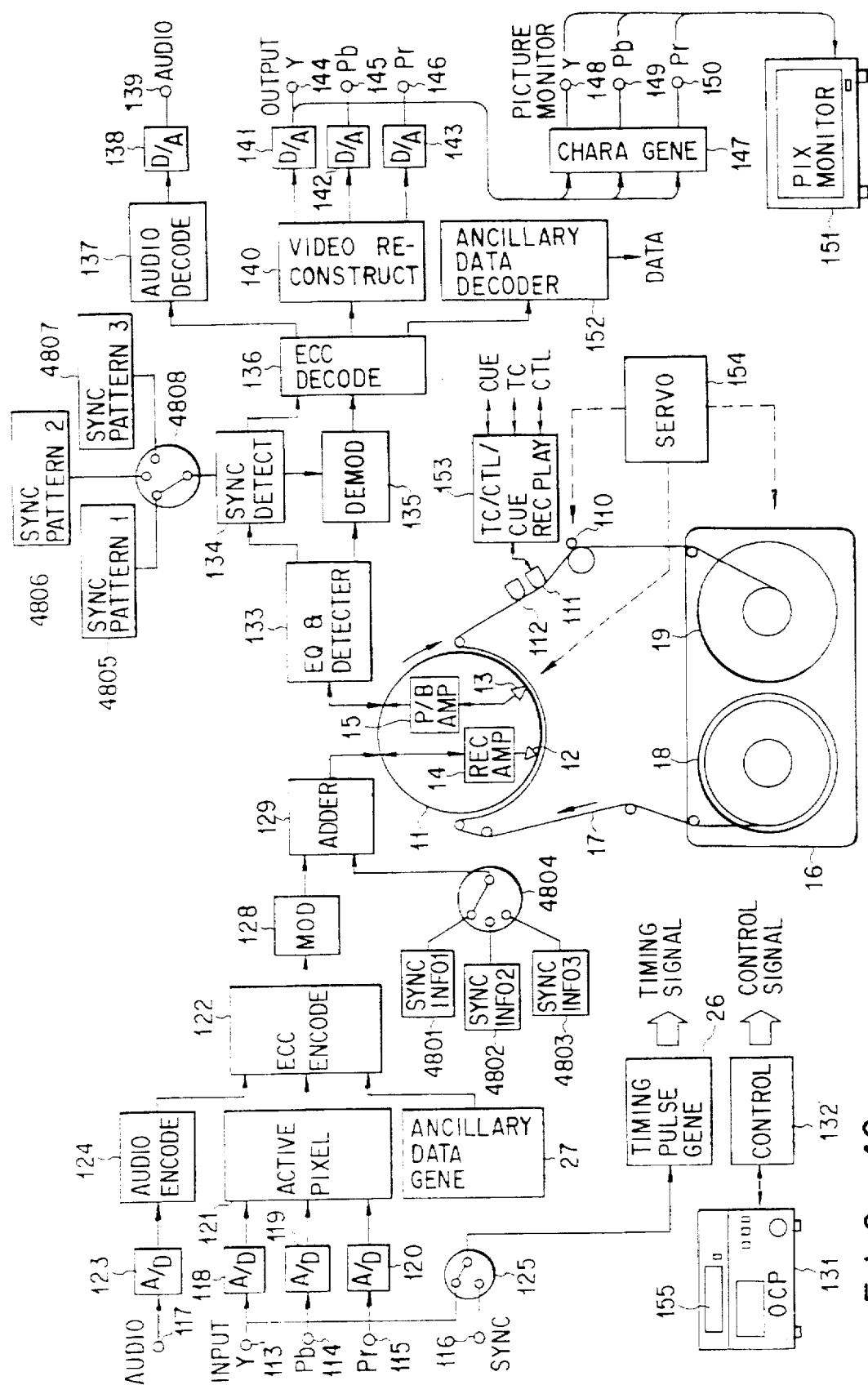
FIG. 48 is a first block diagram showing an arrangement in which a reproduced image and a reproduced sound are not output when tapes recorded in different standards are reproduced according to an embodiment of the present invention.

FIG. 48 is a block diagram for explaining an embodiment in which, when a sync signal for obtaining block synchronization is changed in accordance with standards, and a tape recorded in a standard different from a standard set in a DVTR is reproduced, a reproduced image signal and a reproduced audio signal are not output. In this case, a case wherein three types of standards are used will be described. Note that only an arrangement different from that in FIG. 1 will be described in this case. When data is to be recorded on a tape, a sync signal 4801, 4802, or 4803 determined in correspondence with each standard is selected by a switch 4804. When data is to be reproduced, a sync signal pattern 4805, 4806, or 4807 is selected by a switch 4808 in accordance with the corresponding standard which is originally recorded, so that a sync signal can be detected. However, when a tape recorded in a standard different from the standards set in the DVTR is reproduced, a sync signal cannot be detected by a sync detection unit 134 because the sync signal pattern selected by the switch 4808 is different from a recorded sync signal pattern. Therefore, since block synchronization is not obtained, data processing cannot be performed by a demodulation unit 135 and a decode unit 136, no signal is supplied to video/audio output units, and a reproduced image signal and a reproduced audio signal are not output.

It is checked that no sync signal is detected and no block synchronization is obtained regardless of inputting a reproduced signal to a sync signal detection unit, thereby causing an operator to know that a standard is erroneously set.

Figure 49:
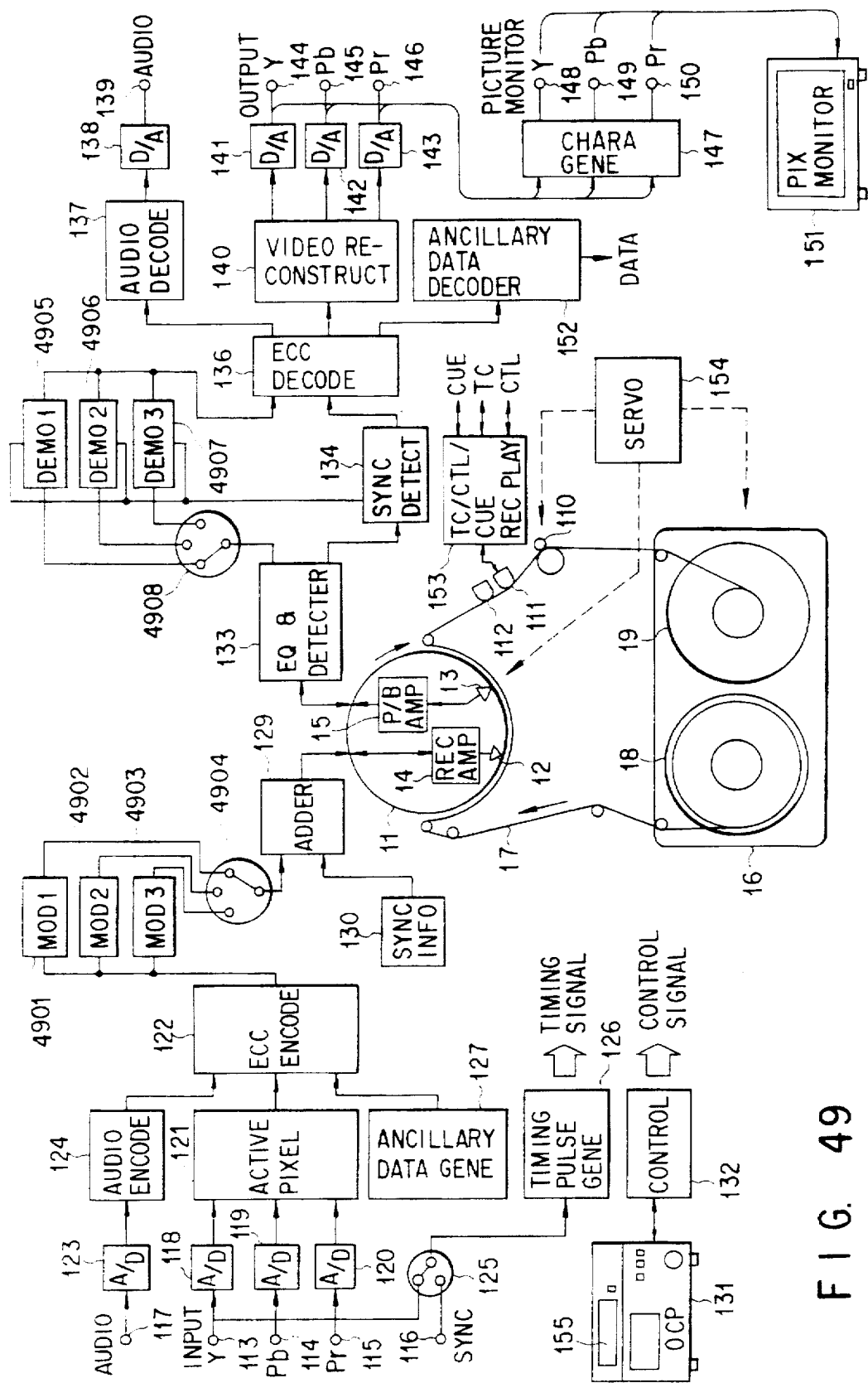
FIG. 49 is a second block diagram showing an arrangement in which a reproduced image and a reproduced sound are not output when tapes recorded in different standards are reproduced according to an embodiment of the present invention.

FIG. 49 is a block diagram for explaining an embodiment in which, when a channel coding is changed in accordance with standards, and a tape recorded in a standard different from a standard set in a DVTR is reproduced, a reproduced image signal and a reproduced audio signal are not output. In this case, a case wherein three types of standards are used will be described. Note that, as in FIG. 48, only an arrangement different from that in FIG. 1 will be described in this case. When data is to be recorded on a tape, a modulation circuit 4901, 4902, or 4903 of channel coding determined in correspondence with each standard is selected by a switch 4904. When data is to be reproduced, a demodulation circuit 4905, 4906, or 4907 is selected by a switch 4808 in accordance with the corresponding standard which is originally recorded, so that demodulation can be correctly performed. However, when a tape recorded in a standard different from the standards set in the DVTR is reproduced, demodulation is not correctly performed because the demodulation circuit selected by the switch 4908 is different from the demodulation circuit of recorded channel coding. Therefore, decoding cannot be started from data supplied to a decoder 136, and no signal is supplied to video/audio output units, and a reproduced image signal and a reproduced audio signal are not output.

It is checked that decoding cannot be performed from the data supplied to the decoder 136 regardless of inputting a reproduced signal to a demodulation unit, thereby causing an operator to know that a standard is erroneously set.

According each of the above embodiments, when a tape recorded in a standard different from the standards set in a DVTR is reproduced, a disturbed image can be prevented from being output to a monitor, or an uncomfortable sound can be prevented from being output. In particular, while a program is transmitted, the disturbed image or uncomfortable sound are not directly transmitted. In addition, non-detection of a sync signal or the state of decode addition is checked, thereby causing an operator to know that the standard of the tape is different from the standards set in the DVTR.

FIG. 50 is a block diagram showing an arrangement in which changes or the states of setting elements required for causing a DVTR to correspond to each standard are managed and determined. Note that the arrangement in FIG. 50 can also be applied to the controller 132.

In this case, as the changes or setting elements, an A/D clock frequency, the type of a frame pulse, identification information to be added, switching of coding circuit, switching of decoding circuit, switching of a servo circuit, switching of a recording/reproducing circuit, recorded standard information (cassette), and display are used.

Referring to FIG. 50, reference numerals 5001 to 5009 denote units for detecting the changes or the states of setting elements and outputting the information of the states. An information management determination unit 5010 receives pieces of information output from the state information output units 5001 to 5009, selects required information in accordance with mode information from a recording/reproducing mode output unit 5011, and outputs determination information representing whether the overall DVTR can cope with a desired standard. As a determination method, a method of determining that the overall DVTR can cope with the desired standard when all the pieces of state information are correct with respect to the desired standard.

Determination information can be used for alarming, or checking/resetting the changes or the states of setting elements.

According to the above embodiments, all the changes or the states of setting elements are managed, and it is determined that the overall DVTR can cope with a desired standard when all the pieces of state information are correct with respect to the desired standard. For this reason, a tape recorded in a scheme which does not correspond to any standard can be prevented from being formed. In addition, since processing is correctly performed in a reproducing operation, a reproduced image can be prevented from being disturbed, or an uncomfortable sound can be prevented from being generated.

As further detailed contents of user data, e.g., the followings are known. That is, recorded video data, the INDEX information of audio data, a recording date, and a title are used. These information data are effective in a retrieval operation. When data representing the type of a language, e.g., data CH1 representing English or data CH2 representing French, is recorded in each channel of an audio signal, this information data is effective for CH selection. Information data representing the type of a source of recorded video/audio signals, e.g., signals directly obtained from a camera, signals dubbed by another VTR, signals obtained from telecine, or up-converted signals are effective to know the quality of the signals. In an editing operation, the history of used video/audio signals, e.g., a specific video signal in each library, date of a news source, or the like are used. These information data can record production processes. These information data can be easily input by keys belonging to a VTR or an external personal computer using a communication port.

A compressed image can be added to user data. For example, when the representative video data of recorded video data is added to the user data, this video data is effective for a retrieval operation. In this case, 1-frame or 1-field data of input video data is received by a memory, and the data is compressed by a compression encoder to have a data amount suitable for a recording area. In addition, image data which is externally compressed can be supplied through a port.

When not only data uniquely formed by a user but also data included in a machine itself for maintenance are directly and simultaneously written in a recording operation, these data is effective to form an optimal environment in a reproducing operation. As these data, e.g., the manufacture numbers, recording dates, and recording times of a VTR in use, a scanner, and an external connector are used. In a VTR, since these data are managed by a microcomputer, the data are directly read. In external machines, data managed by the microcomputer of each machine may be received by a communication port and written. When these data are automatically written, efficiency increases.

When data representing a use state of a tape is written in advance, the data is effective to know damage to the tape. As this data, the number of times of use of the tape is used. When this data is read by a pre-reproducing head, and the value of the data is updated and recorded, the number of times of partial pass of the tape can be known.

An adjusting signal can be recorded in place of user data. For example, when a signal for obtaining tracking information is recorded in advance, tracking can be accurately performed without using a CTL. In addition, when signals having different frequencies are arranged and recorded, and the amplitude of a reproduced signal in a reproducing operation is examined, a change in frequency characteristic can be known. This is effective to estimate the wear of a head. When an automatic equalization function is added, and a test pulse for the automatic equalization function is recorded, more accurate equalization can be performed. These signals are effectively added to the start portion of each track. Note that the above adjusting signal is added to an adder 129 in parallel to a SYNC information generator 130, thereby recording the adjusting signal.

As described above, in a cassette digital magnetic recording/reproducing apparatus according to the present invention, when image signals of different HDTV schemes are recorded/reproduced, and the mechanism, circuit, cassette tape, and the like of a VTR are commonly used, programs can be easily exchanged between Japan, the United States, Europe, and costs of machines or running costs can be reduced.

What is claimed is:

1. A digital magnetic recording/reproducing apparatus for recording and reproducing digitally a high definition television (HDTV) signal in accordance with a first mode for recording and reproducing a 1125/60-scheme HDTV signal representing a HDTV signal of 1125 lines per frame and 60 fields per second and a second mode for recording and reproducing a 1250/50-scheme HDTV signal representing a HDTV signal of 1250 lines per frame and 50 fields per second, comprising:

a rotary drum on which 16 recording heads and 16 reproducing heads are mounted;

a rotary machine for rotating, in both the first mode and the second mode, the rotary drum at a rotation speed of 150 revolutions per second in a recording operation, to record video data on a magnetic tape while forming eight helical tracks thereon every half-revolution of the rotary drum, and rotating the rotary drum at a rotation speed of 150 revolutions per second in a reproducing operation, to reproduce the video data by reading the eight helical tracks on the magnetic tape every half-revolution of the rotary drum; and a recording head control unit for controlling the recording heads to form, in the recording operation according to the first mode, 40 helical tracks on the magnetic tape every 2.5 revolutions of the rotary drum and record video data of one field thereon, the recording head control unit controlling the recording heads to form, in the recording operation according to the second mode, 48 helical tracks on the magnetic tape every 3 revolutions of the rotary drum to record video data of one field thereon;

wherein the recording head control unit includes a controller for controlling the recording heads to record video data on the magnetic tape by dividing a video data signal into 8 channels in the recording operation according to each of the first mode and the second mode, recording error correction code blocks of video data within 5 tracks corresponding to one channel and one field in the recording operation according to the first mode, and recording correction code blocks of video data within 6 tracks corresponding to one channel and one field in the recording operation according to the second mode.

2. The apparatus according to claim 1, wherein the recording head control unit includes a controller for controlling the recording heads to record, on the magnetic tape, identification information representing that one of the first mode and the second mode has been used in the recording operation, and the reproducing head control unit includes a controller for controlling the reproducing heads to reproduce the identification information recorded on the magnetic tape.

3. The apparatus according to claim 1, wherein the recording head control unit includes a controller for controlling the recording heads to record audio signals of 10 channels on the magnetic tape in the recording operation according to the first mode, and audio signals of 12 channels in the recording operation according to the second mode.

4. A method of recording and reproducing digitally a high definition television (HDTV) signal in accordance with a first mode for recording and reproducing a 1125/60 scheme HDTV signal representing a HDTV signal of 1125 lines per frame and 60 fields per second and a second mode for recording and reproducing a 1250/50-scheme HDTV signal representing a HDTV signal representing a HDTV signal of 1250 lines per frame and 50 fields per second, comprising the steps of:

in both the first mode and the second mode, rotating a rotary drum on which 16 recording heads are mounted at a rotation speed of 150 revolutions per second in a recording operation, to record video data on a magnetic tape while forming eight helical tracks thereon every half-revolution of the rotary drum, and rotating a rotary drum on which 16 reproducing heads are mounted at a rotation speed of 150 revolutions per second in a reproducing operation, to reproduce the video data by reading the eight helical tracks on the magnetic tape every half-revolution of the rotary drum;

in the recording operation according to the first mode, forming 40 helical tracks on the magnetic tape every 2.5 revolutions of the rotary drum to record video data of one field thereon;

in the recording operation according to the second mode, forming 48 helical tracks on the magnetic tape every 3 revolutions of the rotary drum to record video data of one field thereon;

in the recording operation according to the second mode, adding recording data to make an amount of information per 8 helical tracks in the second mode coincide with that per 8 helical tracks in the first mode; and recording video data on the magnetic tape by dividing a video data signal into 8 channels in the recording operation according to each of the first mode and the second mode, recording error correction code blocks of video data within 5 tracks corresponding to one channel and one field in the recording operation according to the first mode and recording error correction code blocks of video data within 6 tracks corresponding to one channel and one field in the recording operation according to the second mode.

5. The method according to claim 4, further including the steps of recording, on the magnetic tape, identification information representing that one of the first mode and the second mode has been used in the recording operation, and reproducing the identification information recorded on the magnetic tape.

6. The method according to claim 4, further including the steps of recording audio signals of 10 channels on the magnetic tape in the recording operation according to the first mode, and audio signals of 12 channels in the recording operation according to the second mode.

* * * * *